US 12,443,013 B2

(12) United States Patent
Kao et al.

(10) Patent No.: US 12,443,013 B2
(45) Date of Patent: Oct. 14, 2025

(54) OPTICAL IMAGING LENS

(71) Applicant: GENIUS ELECTRONIC OPTICAL (XIAMEN) CO., LTD., Fujian (CN)

(72) Inventors: Wei-Jeh Kao, Fujian (CN); Qingzhi Zhu, Fujian (CN); Songchao Huang, Fujian (CN); Hung-Chien Hsieh, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 699 days.

(21) Appl. No.: 17/835,972

(22) Filed: Jun. 9, 2022

(65) Prior Publication Data

US 2023/0204918 A1 Jun. 29, 2023

(30) Foreign Application Priority Data

Dec. 28, 2021 (CN) .......................... 202111626486.6

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .... G02B 13/0045; G02B 9/64; G02B 13/006; G02B 13/18
See application file for complete search history.

(56) References Cited

U.S. PATENT DOCUMENTS

2019/0204556 A1* 7/2019 Jhang ................. G02B 13/0045
2020/0386971 A1* 12/2020 Jhang ..................... G02B 1/041
2021/0149158 A1   5/2021 Hsueh et al.
2021/0157104 A1* 5/2021 Jung ....................... G02B 9/64

FOREIGN PATENT DOCUMENTS

| CN | 111025534 | 4/2020 |
| CN | 111624738 | 9/2020 |
| CN | 213091998 | 4/2021 |

(Continued)

OTHER PUBLICATIONS

"Office Action of China Counterpart Application", issued on Mar. 13, 2024, p. 1-p. 11.

(Continued)

*Primary Examiner* — Mariam Qureshi
(74) *Attorney, Agent, or Firm* — JCIPRNET

(57) ABSTRACT

An optical imaging lens, including a first lens element, a second lens element, a third lens element, a fourth lens element, a fifth lens element, a sixth lens element, a seventh lens element, and an eighth lens element sequentially along an optical axis from an object side to an image side, is provided. Each lens element includes an object-side surface facing the object side and allowing imaging rays to pass through and an image-side surface facing the image side and allowing the imaging rays to pass through. The second lens element has negative refracting power. An optical axis region of the object-side surface of the third lens element is concave. An optical axis region of the image-side surface of the fourth lens element is concave. An optical axis region of the object-side surface of the fifth lens element is concave. The seventh lens element has positive refracting power.

20 Claims, 44 Drawing Sheets

(56) References Cited

FOREIGN PATENT DOCUMENTS

| | | |
|---|---|---|
| CN | 112987258 | 6/2021 |
| CN | 113156618 | 7/2021 |
| CN | 113534407 | 10/2021 |
| CN | 113741004 | 12/2021 |
| JP | 2021128188 | 9/2021 |

OTHER PUBLICATIONS

"Office Action of Taiwan Counterpart Application", issued on Sep. 6, 2023, p. 1-p. 10.

* cited by examiner

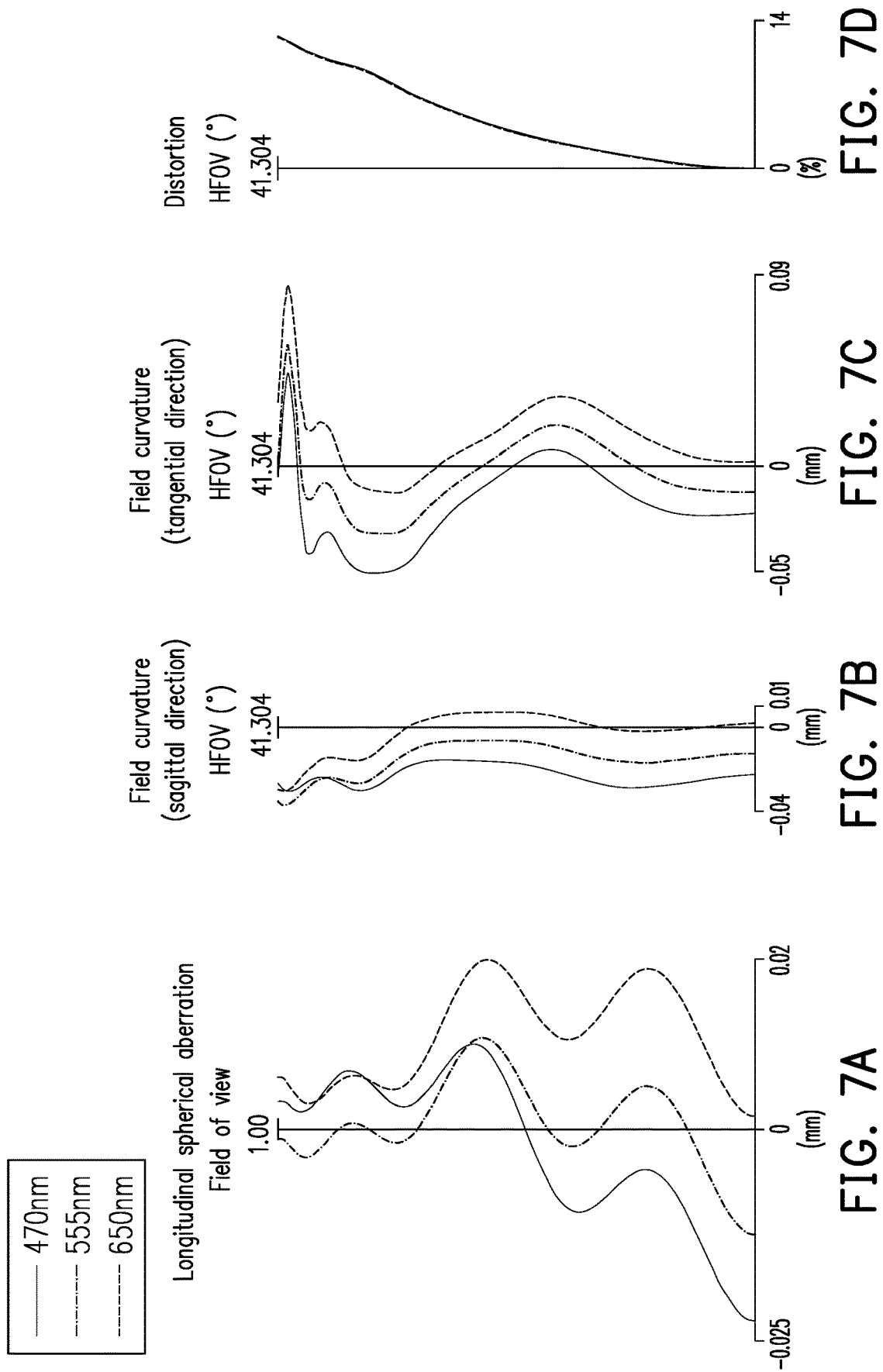

| First Embodiment |||||||
| --- |
| EFL=7.269 mm, HFOV=41.304°, TTL=9.096 mm, Fno=1.700, ImgH=7.200 mm |||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.803 | | | |
| First lens element 1 | Object-side surface 11 | 3.165 | 1.132 | 1.545 | 55.987 | 6.987 |
| | Image-side surface 12 | 16.207 | 0.143 | | | |
| Second lens element 2 | Object-side surface 21 | 10.019 | 0.274 | 1.671 | 19.243 | -18.043 |
| | Image-side surface 22 | 5.446 | 0.835 | | | |
| Third lens element 3 | Object-side surface 31 | -62.154 | 0.423 | 1.545 | 55.987 | 32.128 |
| | Image-side surface 32 | -13.719 | 0.108 | | | |
| Fourth lens element 4 | Object-side surface 41 | 10.013 | 0.248 | 1.671 | 19.243 | -25.186 |
| | Image-side surface 42 | 6.247 | 0.191 | | | |
| Fifth lens element 5 | Object-side surface 51 | -29.293 | 0.410 | 1.585 | 29.907 | 23.606 |
| | Image-side surface 52 | -9.478 | 0.472 | | | |
| Sixth lens element 6 | Object-side surface 61 | -13.430 | 0.509 | 1.567 | 37.490 | 581.160 |
| | Image-side surface 62 | -13.085 | 0.666 | | | |
| Seventh lens element 7 | Object-side surface 71 | 4.664 | 0.952 | 1.545 | 55.987 | 19.025 |
| | Image-side surface 72 | 7.851 | 1.429 | | | |
| Eighth lens element 8 | Object-side surface 81 | -1176.705 | 0.554 | 1.545 | 55.987 | -7.270 |
| | Image-side surface 82 | 3.986 | 0.300 | | | |
| Filter F | Object-side surface F1 | Infinity | 0.210 | 1.560 | 51.700 | |
| | Image-side surface F2 | Infinity | 0.239 | | | |
| | Image plane 99 | Infinity | | | | |

FIG. 8

| Surface | K | $a_4$ | $a_6$ | $a_8$ | $a_{10}$ |
|---|---|---|---|---|---|
| 11 | 2.135124E-01 | -1.366727E-03 | 2.352692E-03 | -2.995948E-03 | 2.139778E-03 |
| 12 | 1.183485E+01 | -4.660087E-03 | 1.830129E-03 | 2.483164E-04 | -8.331792E-04 |
| 21 | 9.120024E+00 | -7.835189E-03 | 6.229042E-03 | -3.023429E-03 | 1.496602E-03 |
| 22 | 2.132843E+00 | 2.551151E-04 | -4.093592E-03 | 1.316290E-02 | -1.371039E-02 |
| 31 | -1.037968E+04 | -5.601852E-03 | 5.774904E-04 | -4.085286E-03 | 4.530964E-03 |
| 32 | 1.667362E+01 | 1.978370E-02 | -3.814969E-02 | 3.160484E-02 | -1.717047E-02 |
| 41 | -1.179839E+02 | 6.331898E-03 | -3.967538E-02 | 3.128531E-02 | -1.539670E-02 |
| 42 | -8.820927E+01 | 1.206031E-02 | -3.505563E-02 | 2.312762E-02 | -1.011391E-02 |
| 51 | 9.523964E+01 | -9.869078E-03 | 7.846286E-03 | -8.342665E-03 | 4.673790E-03 |
| 52 | -1.455488E+01 | 8.926741E-04 | 1.769353E-03 | -2.890976E-03 | 1.479243E-03 |
| 61 | -9.122406E-01 | 1.462682E-02 | -4.538368E-03 | 9.744021E-04 | -1.515049E-04 |
| 62 | -1.985630E+00 | 3.587559E-03 | -4.633776E-03 | 2.263567E-03 | -6.387344E-04 |
| 71 | -1.473382E+00 | -1.626851E-03 | -3.353618E-03 | 7.687585E-04 | -1.325436E-04 |
| 72 | -5.652665E+00 | 1.082812E-02 | -4.238915E-03 | 6.751361E-04 | -7.800407E-05 |
| 81 | 9.547503E+01 | -2.456884E-02 | 3.202091E-03 | -2.263885E-04 | 6.872952E-06 |
| 82 | -9.166045E+00 | -9.599479E-03 | 6.596440E-04 | 1.772884E-05 | -8.577295E-06 |
| Surface | $a_{12}$ | $a_{14}$ | $a_{16}$ | $a_{18}$ | $a_{20}$ |
| 11 | -9.494251E-04 | 2.628765E-04 | -4.449707E-05 | 4.213311E-06 | -1.720710E-07 |
| 12 | 5.232049E-04 | -1.736257E-04 | 3.283674E-05 | -3.332250E-06 | 1.396416E-07 |
| 21 | -5.249102E-04 | 1.138060E-04 | -1.265173E-05 | 4.220208E-07 | 1.727287E-08 |
| 22 | 8.319084E-03 | -3.059227E-03 | 6.717883E-04 | -8.044602E-05 | 4.020324E-06 |
| 31 | -2.711786E-03 | 9.765774E-04 | -2.119792E-04 | 2.601116E-05 | -1.379533E-06 |
| 32 | 6.117455E-03 | -1.418100E-03 | 2.050375E-04 | -1.655008E-05 | 5.650305E-07 |
| 41 | 4.789526E-03 | -9.572441E-04 | 1.191754E-04 | -8.347190E-06 | 2.450817E-07 |
| 42 | 2.950621E-03 | -5.679712E-04 | 6.918533E-05 | -4.800165E-06 | 1.449054E-07 |
| 51 | -1.444819E-03 | 2.596599E-04 | -2.709721E-05 | 1.524291E-06 | -3.573633E-08 |
| 52 | -4.037314E-04 | 6.182763E-05 | -5.367115E-06 | 2.446954E-07 | -4.496515E-09 |
| 61 | 6.903963E-06 | 2.293425E-06 | -4.914283E-07 | 3.791212E-08 | -1.025334E-09 |
| 62 | 1.145702E-04 | -1.302180E-05 | 9.023774E-07 | -3.471414E-08 | 5.683610E-10 |
| 71 | 1.560982E-05 | -1.215019E-06 | 5.751705E-08 | -1.372916E-09 | 1.051300E-11 |
| 72 | 6.686965E-06 | -4.189561E-07 | 1.776953E-08 | -4.396600E-10 | 4.671000E-12 |
| 81 | 1.615828E-07 | -2.064372E-08 | 6.971600E-10 | -1.078400E-11 | 6.600000E-14 |
| 82 | 8.003568E-07 | -3.762335E-08 | 9.731620E-10 | -1.318200E-11 | 7.300000E-14 |

FIG. 9

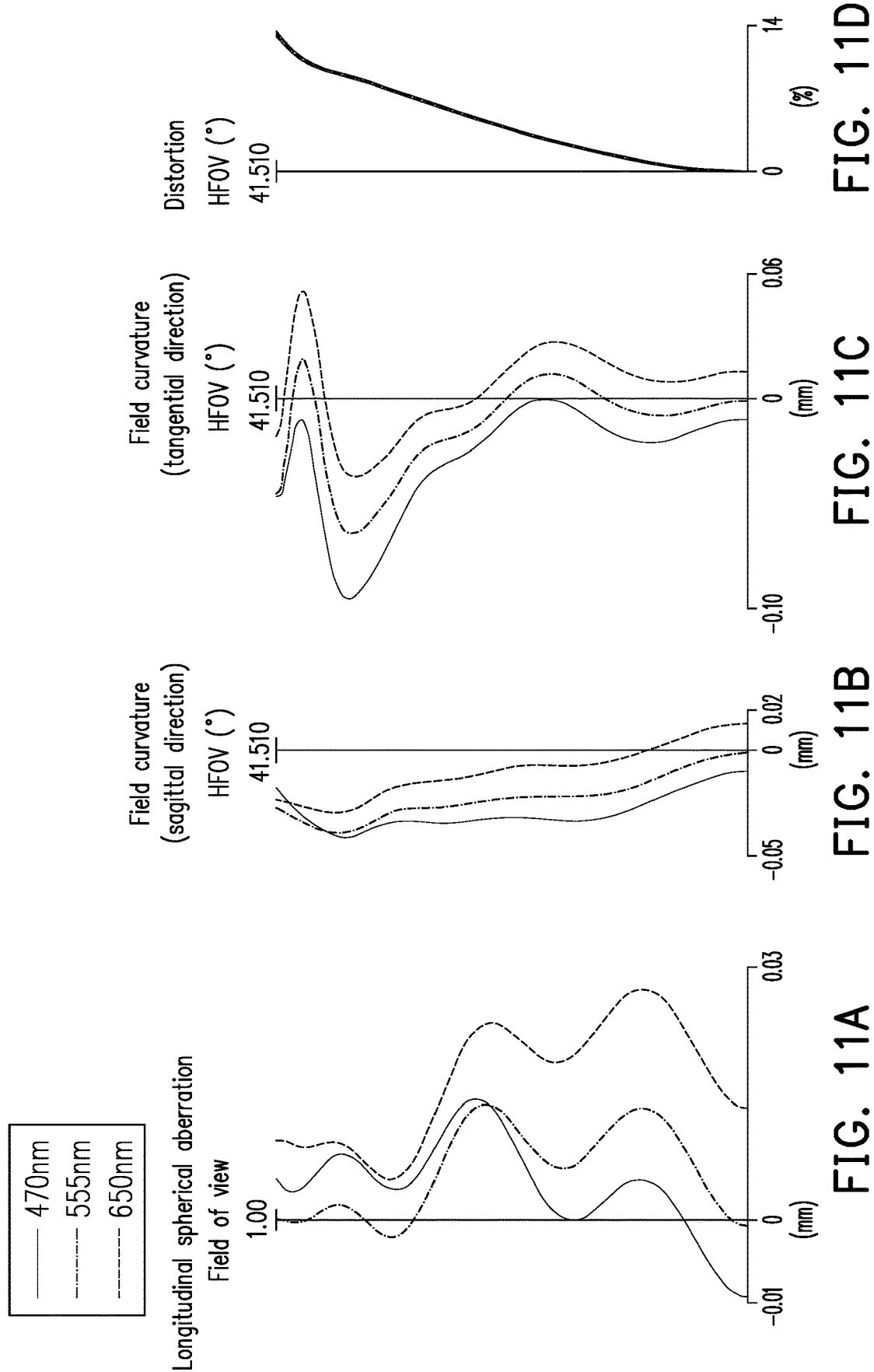

| Second Embodiment |||||||
|---|---|---|---|---|---|---|
| EFL=7.189 mm, HFOV=41.510°, TTL=9.102 mm, Fno=1.700, ImgH=7.200 mm |||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.813 | | | |
| First lens element 1 | Object-side surface 11 | 3.227 | 1.177 | 1.545 | 55.987 | 7.420 |
| | Image-side surface 12 | 13.798 | 0.106 | | | |
| Second lens element 2 | Object-side surface 21 | 10.212 | 0.301 | 1.681 | 18.154 | -20.160 |
| | Image-side surface 22 | 5.810 | 0.767 | | | |
| Third lens element 3 | Object-side surface 31 | -13.031 | 0.620 | 1.545 | 55.987 | 21.051 |
| | Image-side surface 32 | -6.212 | 0.060 | | | |
| Fourth lens element 4 | Object-side surface 41 | 10.638 | 0.250 | 1.681 | 18.154 | -34.316 |
| | Image-side surface 42 | 7.262 | 0.248 | | | |
| Fifth lens element 5 | Object-side surface 51 | -26.240 | 0.351 | 1.544 | 49.922 | 59.959 |
| | Image-side surface 52 | -14.640 | 1.103 | | | |
| Sixth lens element 6 | Object-side surface 61 | -5.065 | 0.505 | 1.544 | 49.922 | 20.671 |
| | Image-side surface 62 | -3.620 | 0.275 | | | |
| Seventh lens element 7 | Object-side surface 71 | 6.132 | 0.793 | 1.545 | 55.987 | 17.911 |
| | Image-side surface 72 | 15.677 | 1.089 | | | |
| Eighth lens element 8 | Object-side surface 81 | -71.057 | 0.292 | 1.545 | 55.987 | -5.871 |
| | Image-side surface 82 | 3.364 | 0.400 | | | |
| Filter F | Object-side surface F1 | Infinity | 0.210 | 1.560 | 51.700 | |
| | Image-side surface F2 | Infinity | 0.556 | | | |
| | Image plane 99 | Infinity | | | | |

FIG. 12

| Surface | K | $a_4$ | $a_6$ | $a_8$ | $a_{10}$ |
|---|---|---|---|---|---|
| 11 | 2.769026E-01 | -1.069093E-03 | 2.487773E-03 | -2.992298E-03 | 2.146553E-03 |
| 12 | 1.135381E+01 | -4.563970E-03 | 2.260769E-03 | 2.481159E-04 | -8.342794E-04 |
| 21 | 4.856741E+00 | -1.012589E-02 | 6.225132E-03 | -3.018089E-03 | 1.491787E-03 |
| 22 | 1.507494E-01 | -1.334059E-03 | -4.585089E-03 | 1.314457E-02 | -1.368905E-02 |
| 31 | 3.982749E+01 | -1.722235E-03 | 1.437441E-04 | -4.122165E-03 | 4.532705E-03 |
| 32 | 4.297612E+00 | 1.889218E-02 | -3.717643E-02 | 3.146005E-02 | -1.718591E-02 |
| 41 | -1.277954E+02 | 5.473167E-03 | -4.041545E-02 | 3.131034E-02 | -1.538866E-02 |
| 42 | -1.370648E+02 | 1.206692E-02 | -3.550106E-02 | 2.310759E-02 | -1.011457E-02 |
| 51 | 4.514153E+01 | -1.312111E-02 | 7.735604E-03 | -8.324967E-03 | 4.676033E-03 |
| 52 | 1.920751E+01 | -3.902820E-03 | 2.464937E-03 | -2.878860E-03 | 1.477536E-03 |
| 61 | 1.866849E+00 | 1.954906E-02 | -4.442047E-03 | 9.336597E-04 | -1.487515E-04 |
| 62 | -3.990228E+00 | 3.516120E-03 | -5.022835E-03 | 2.265937E-03 | -6.385991E-04 |
| 71 | -2.947673E-01 | -9.264500E-04 | -3.312662E-03 | 7.936343E-04 | -1.362150E-04 |
| 72 | 4.164662E+00 | 1.244851E-02 | -4.345825E-03 | 6.772096E-04 | -7.794965E-05 |
| 81 | -4.607834E+00 | -2.418305E-02 | 3.156063E-03 | -2.258789E-04 | 6.896782E-06 |
| 82 | -9.010905E+00 | -1.028465E-02 | 7.144110E-04 | 1.674048E-05 | -8.622097E-06 |
| Surface | $a_{12}$ | $a_{14}$ | $a_{16}$ | $a_{18}$ | $a_{20}$ |
| 11 | -9.481265E-04 | 2.629072E-04 | -4.453307E-05 | 4.212102E-06 | -1.691439E-07 |
| 12 | 5.246451E-04 | -1.731145E-04 | 3.290332E-05 | -3.334098E-06 | 1.353089E-07 |
| 21 | -5.233653E-04 | 1.143611E-04 | -1.265271E-05 | 3.919954E-07 | 1.305269E-08 |
| 22 | 8.315601E-03 | -3.061201E-03 | 6.720336E-04 | -8.031273E-05 | 3.989464E-06 |
| 31 | -2.708499E-03 | 9.773288E-04 | -2.119229E-04 | 2.589830E-05 | -1.346255E-06 |
| 32 | 6.120604E-03 | -1.417333E-03 | 2.052145E-04 | -1.654841E-05 | 5.487904E-07 |
| 41 | 4.789186E-03 | -9.573184E-04 | 1.192083E-04 | -8.335280E-06 | 2.451440E-07 |
| 42 | 2.950723E-03 | -5.679394E-04 | 6.917840E-05 | -4.798931E-06 | 1.455534E-07 |
| 51 | -1.444766E-03 | 2.596369E-04 | -2.709735E-05 | 1.524714E-06 | -3.569083E-08 |
| 52 | -4.037624E-04 | 6.183709E-05 | -5.366690E-06 | 2.445462E-07 | -4.472658E-09 |
| 61 | 7.271793E-06 | 2.291329E-06 | -4.911115E-07 | 3.783501E-08 | -1.065414E-09 |
| 62 | 1.146188E-04 | -1.301694E-05 | 9.026183E-07 | -3.471810E-08 | 5.649340E-10 |
| 71 | 1.576830E-05 | -1.193078E-06 | 5.656979E-08 | -1.512243E-09 | 1.727600E-11 |
| 72 | 6.683254E-06 | -4.191292E-07 | 1.776661E-08 | -4.394950E-10 | 4.686000E-12 |
| 81 | 1.620954E-07 | -2.063701E-08 | 6.971150E-10 | -1.079100E-11 | 6.500000E-14 |
| 82 | 8.002677E-07 | -3.759580E-08 | 9.740570E-10 | -1.317800E-11 | 7.300000E-14 |

FIG. 13

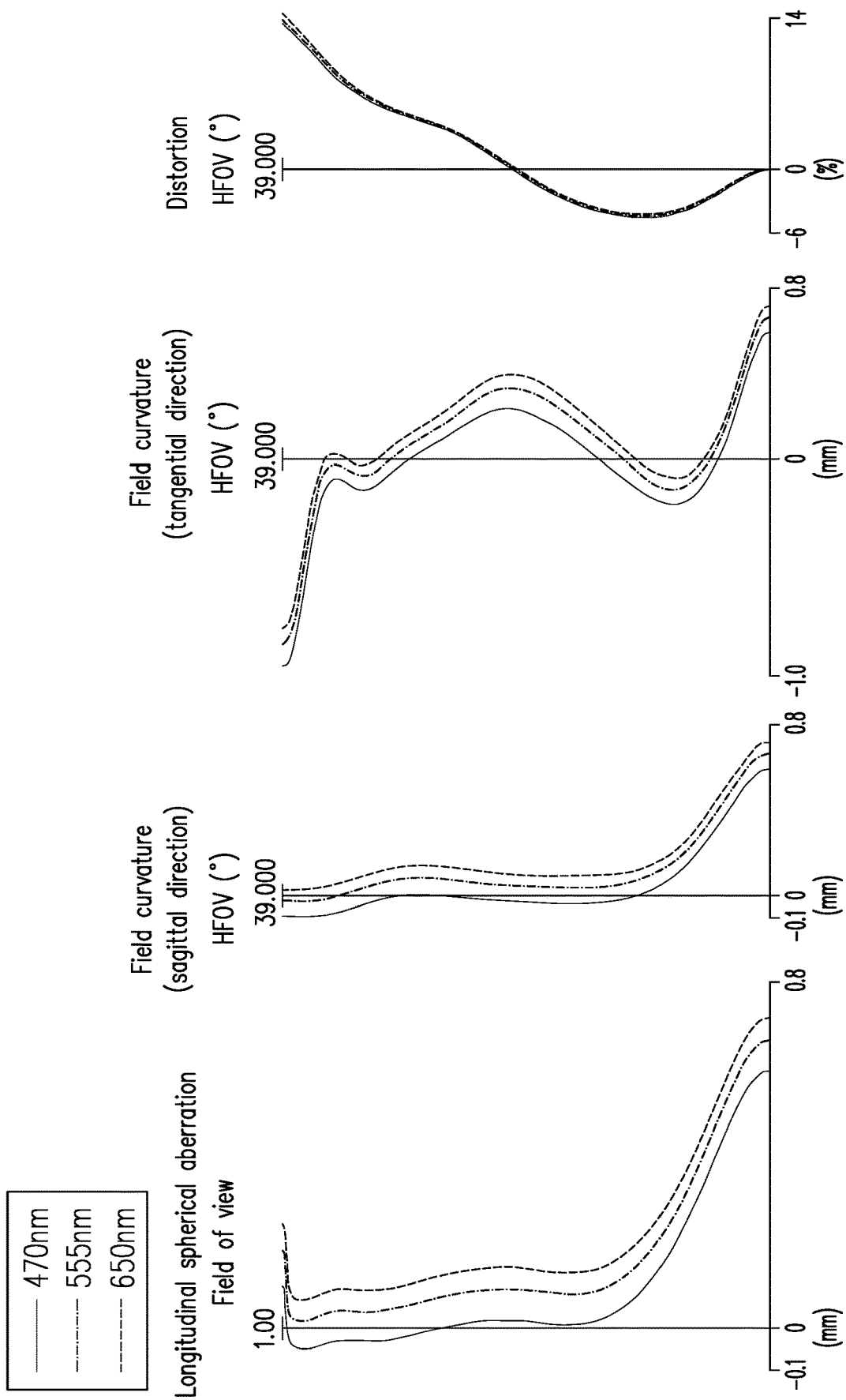

| Third Embodiment | | | | | | |
|---|---|---|---|---|---|---|
| EFL=8.720 mm, HFOV=39.000°, TTL=8.537 mm, Fno=1.750, ImgH=7.060 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.260 | | | |
| First lens element 1 | Object-side surface 11 | 3.163 | 1.224 | 1.545 | 55.987 | 7.990 |
| | Image-side surface 12 | 9.917 | 0.649 | | | |
| Second lens element 2 | Object-side surface 21 | 16.776 | 0.356 | 1.661 | 20.382 | -55.956 |
| | Image-side surface 22 | 11.476 | 0.861 | | | |
| Third lens element 3 | Object-side surface 31 | -67.729 | 0.225 | 1.545 | 55.987 | 45.465 |
| | Image-side surface 32 | -18.194 | 0.047 | | | |
| Fourth lens element 4 | Object-side surface 41 | 9.064 | 0.278 | 1.661 | 20.382 | -27.499 |
| | Image-side surface 42 | 5.992 | 0.380 | | | |
| Fifth lens element 5 | Object-side surface 51 | -24.052 | 0.347 | 1.636 | 23.972 | 57.240 |
| | Image-side surface 52 | -14.603 | 0.454 | | | |
| Sixth lens element 6 | Object-side surface 61 | -12.235 | 0.212 | 1.671 | 19.276 | 118.069 |
| | Image-side surface 62 | -10.687 | 0.058 | | | |
| Seventh lens element 7 | Object-side surface 71 | 7.299 | 0.273 | 1.544 | 49.922 | 10.371 |
| | Image-side surface 72 | -25.020 | 0.966 | | | |
| Eighth lens element 8 | Object-side surface 81 | -4.047 | 0.984 | 1.544 | 49.922 | -5.396 |
| | Image-side surface 82 | 11.802 | 0.803 | | | |
| Filter F | Object-side surface F1 | Infinity | 0.210 | 1.563 | 51.700 | |
| | Image-side surface F2 | Infinity | 0.212 | | | |
| | Image plane 99 | Infinity | | | | |

FIG. 16

| Surface | K | $a_4$ | $a_6$ | $a_8$ | $a_{10}$ |
|---|---|---|---|---|---|
| 11 | 2.064198E-01 | -2.757650E-03 | 2.233640E-03 | -2.969700E-03 | 2.141805E-03 |
| 12 | 1.851137E+00 | -5.311145E-03 | 1.770991E-03 | 2.514126E-04 | -8.364547E-04 |
| 21 | 3.722354E+01 | -1.017506E-02 | 6.171139E-03 | -2.909807E-03 | 1.484864E-03 |
| 22 | 7.121779E-01 | -3.810122E-03 | -2.309419E-03 | 1.289855E-02 | -1.367228E-02 |
| 31 | -5.219279E+02 | -1.601686E-03 | -6.855650E-04 | -4.084706E-03 | 4.549230E-03 |
| 32 | -2.521575E+02 | 2.509301E-02 | -3.959546E-02 | 3.143015E-02 | -1.716699E-02 |
| 41 | -2.084921E+02 | 1.709167E-02 | -3.947093E-02 | 3.132995E-02 | -1.537572E-02 |
| 42 | -3.460081E+02 | 1.395043E-02 | -3.413743E-02 | 2.312362E-02 | -1.012791E-02 |
| 51 | 5.536723E+01 | -5.145077E-03 | 7.126148E-03 | -8.388808E-03 | 4.673467E-03 |
| 52 | 1.521506E+01 | -2.878023E-03 | 2.280044E-03 | -2.855876E-03 | 1.482102E-03 |
| 61 | 1.481972E+01 | 1.166146E-02 | -5.125796E-03 | 9.443727E-04 | -1.499525E-04 |
| 62 | 1.222044E+00 | 3.512334E-03 | -5.276627E-03 | 2.275838E-03 | -6.378378E-04 |
| 71 | -2.859404E+00 | -1.612034E-03 | -3.521371E-03 | 8.063305E-04 | -1.369318E-04 |
| 72 | -5.280947E+02 | 1.528288E-02 | -4.647012E-03 | 6.815605E-04 | -7.759093E-05 |
| 81 | -2.589362E+01 | -2.335153E-02 | 3.178027E-03 | -2.253825E-04 | 6.901043E-06 |
| 82 | 4.736659E+00 | -7.018248E-03 | 4.198844E-04 | 1.385286E-05 | -8.241275E-06 |
| Surface | $a_{12}$ | $a_{14}$ | $a_{16}$ | $a_{18}$ | $a_{20}$ |
| 11 | -9.490092E-04 | 2.628341E-04 | -4.452596E-05 | 4.210280E-06 | -1.702008E-07 |
| 12 | 5.225384E-04 | -1.736400E-04 | 3.289578E-05 | -3.315018E-06 | 1.362654E-07 |
| 21 | -5.286678E-04 | 1.137422E-04 | -1.255972E-05 | 4.260030E-07 | 1.231501E-08 |
| 22 | 8.325927E-03 | -3.061859E-03 | 6.712630E-04 | -8.041493E-05 | 4.039223E-06 |
| 31 | -2.709846E-03 | 9.758870E-04 | -2.122859E-04 | 2.595361E-05 | -1.371349E-06 |
| 32 | 6.122551E-03 | -1.417118E-03 | 2.050722E-04 | -1.659635E-05 | 5.466533E-07 |
| 41 | 4.792619E-03 | -9.571585E-04 | 1.191123E-04 | -8.361411E-06 | 2.445302E-07 |
| 42 | 2.949283E-03 | -5.679520E-04 | 6.920471E-05 | -4.797102E-06 | 1.444036E-07 |
| 51 | -1.444284E-03 | 2.597258E-04 | -2.708890E-05 | 1.525071E-06 | -3.579779E-08 |
| 52 | -4.032482E-04 | 6.189301E-05 | -5.359908E-06 | 2.447889E-07 | -4.585637E-09 |
| 61 | 7.411595E-06 | 2.318887E-06 | -4.903281E-07 | 3.788852E-08 | -1.030489E-09 |
| 62 | 1.145785E-04 | -1.302329E-05 | 9.022435E-07 | -3.472108E-08 | 5.680330E-10 |
| 71 | 1.576225E-05 | -1.194191E-06 | 5.439073E-08 | -1.531286E-09 | 2.691000E-12 |
| 72 | 6.684907E-06 | -4.192927E-07 | 1.775611E-08 | -4.390130E-10 | 4.681000E-12 |
| 81 | 1.618783E-07 | -2.063386E-08 | 6.963710E-10 | -1.084800E-11 | 6.100000E-14 |
| 82 | 7.853614E-07 | -3.724741E-08 | 9.714160E-10 | -1.333900E-11 | 6.900000E-14 |

FIG. 17

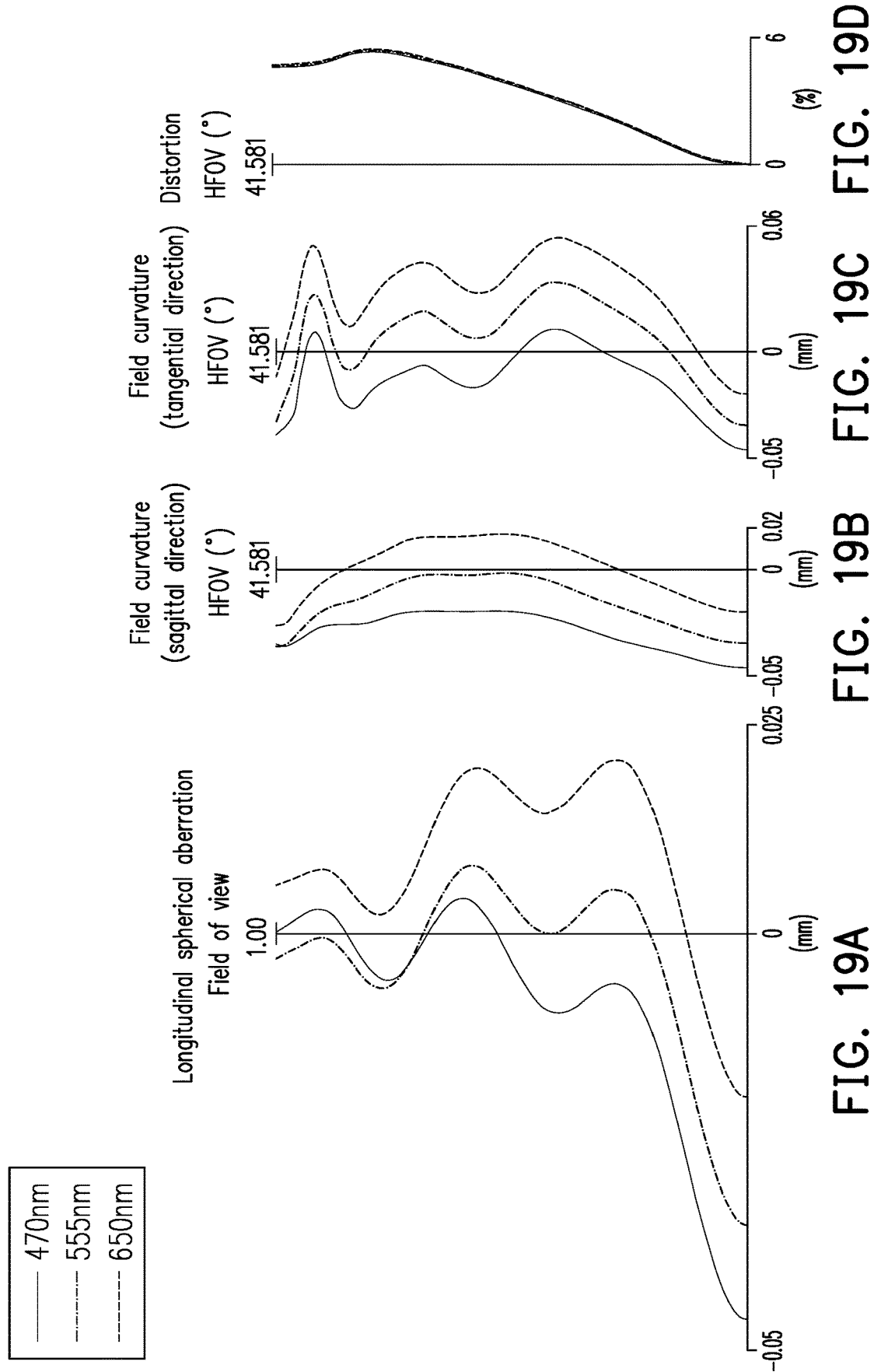

| Fourth Embodiment | | | | | | |
|---|---|---|---|---|---|---|
| EFL=7.715 mm, HFOV=41.581°, TTL=9.464 mm, Fno=1.900, ImgH=7.218 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.697 | | | |
| First lens element 1 | Object-side surface 11 | 3.282 | 1.119 | 1.545 | 55.987 | 7.675 |
| | Image-side surface 12 | 13.283 | 0.199 | | | |
| Second lens element 2 | Object-side surface 21 | 9.088 | 0.291 | 1.671 | 19.243 | -20.110 |
| | Image-side surface 22 | 5.381 | 0.646 | | | |
| Third lens element 3 | Object-side surface 31 | -22.202 | 0.681 | 1.545 | 55.987 | 24.992 |
| | Image-side surface 32 | -8.546 | 0.148 | | | |
| Fourth lens element 4 | Object-side surface 41 | 9.101 | 0.250 | 1.671 | 19.243 | -27.410 |
| | Image-side surface 42 | 6.040 | 0.217 | | | |
| Fifth lens element 5 | Object-side surface 51 | -31.223 | 0.336 | 1.567 | 37.533 | 51.926 |
| | Image-side surface 52 | -15.251 | 0.815 | | | |
| Sixth lens element 6 | Object-side surface 61 | -11.743 | 0.539 | 1.567 | 37.533 | 71.479 |
| | Image-side surface 62 | -9.267 | 0.418 | | | |
| Seventh lens element 7 | Object-side surface 71 | 4.383 | 0.702 | 1.545 | 55.987 | 17.225 |
| | Image-side surface 72 | 7.741 | 2.044 | | | |
| Eighth lens element 8 | Object-side surface 81 | -7.677 | 0.213 | 1.545 | 55.987 | -7.176 |
| | Image-side surface 82 | 8.089 | 0.562 | | | |
| Filter F | Object-side surface F1 | Infinity | 0.210 | 1.560 | 51.700 | |
| | Image-side surface F2 | Infinity | 0.074 | | | |
| | Image plane 99 | Infinity | | | | |

FIG. 20

| Surface | K | $a_4$ | $a_6$ | $a_8$ | $a_{10}$ |
|---|---|---|---|---|---|
| 11 | 2.931632E-01 | -1.547032E-03 | 2.461490E-03 | -2.987108E-03 | 2.137536E-03 |
| 12 | -1.653200E-02 | -5.622402E-03 | 1.906233E-03 | 2.863529E-04 | -8.355867E-04 |
| 21 | -1.234108E+01 | -1.174995E-02 | 6.537517E-03 | -2.969521E-03 | 1.485082E-03 |
| 22 | -1.219141E+00 | -4.071481E-03 | -3.462057E-03 | 1.289764E-02 | -1.367218E-02 |
| 31 | 1.887367E+01 | 1.094904E-03 | -4.846899E-04 | -4.145038E-03 | 4.533829E-03 |
| 32 | -2.851148E+00 | 2.787349E-02 | -3.897944E-02 | 3.149766E-02 | -1.716900E-02 |
| 41 | -6.223760E+01 | 1.124426E-02 | -3.967106E-02 | 3.131590E-02 | -1.538105E-02 |
| 42 | -7.164925E+01 | 1.498593E-02 | -3.455017E-02 | 2.312416E-02 | -1.012193E-02 |
| 51 | 5.042300E+01 | -5.886262E-03 | 7.690485E-03 | -8.347847E-03 | 4.674995E-03 |
| 52 | -7.102041E+00 | 1.180266E-03 | 2.176441E-03 | -2.861576E-03 | 1.481961E-03 |
| 61 | 7.325042E+00 | 1.280525E-02 | -4.560092E-03 | 9.665908E-04 | -1.506665E-04 |
| 62 | -8.280464E+00 | 2.880929E-03 | -5.244259E-03 | 2.282697E-03 | -6.373647E-04 |
| 71 | -6.939832E-01 | -2.267394E-03 | -3.388597E-03 | 8.005784E-04 | -1.360787E-04 |
| 72 | -8.371779E+00 | 1.154959E-02 | -4.342312E-03 | 6.780866E-04 | -7.787419E-05 |
| 81 | -3.061940E+01 | -2.384708E-02 | 3.154601E-03 | -2.259829E-04 | 6.891931E-06 |
| 82 | -1.993018E+00 | -1.218299E-02 | 7.625574E-04 | 1.670785E-05 | -8.638014E-06 |
| Surface | $a_{12}$ | $a_{14}$ | $a_{16}$ | $a_{18}$ | $a_{20}$ |
| 11 | -9.488562E-04 | 2.629992E-04 | -4.449323E-05 | 4.212168E-06 | -1.716300E-07 |
| 12 | 5.219282E-04 | -1.735421E-04 | 3.296102E-05 | -3.310286E-06 | 1.315590E-07 |
| 21 | -5.251107E-04 | 1.143321E-04 | -1.259300E-05 | 4.018347E-07 | 1.339561E-08 |
| 22 | 8.326343E-03 | -3.061484E-03 | 6.715393E-04 | -8.039596E-05 | 4.025927E-06 |
| 31 | -2.710082E-03 | 9.766109E-04 | -2.120757E-04 | 2.598083E-05 | -1.380461E-06 |
| 32 | 6.121479E-03 | -1.417315E-03 | 2.050868E-04 | -1.658214E-05 | 5.530813E-07 |
| 41 | 4.791853E-03 | -9.570453E-04 | 1.191782E-04 | -8.346761E-06 | 2.470840E-07 |
| 42 | 2.950063E-03 | -5.679055E-04 | 6.919640E-05 | -4.799480E-06 | 1.442910E-07 |
| 51 | -1.444561E-03 | 2.596942E-04 | -2.709022E-05 | 1.524745E-06 | -3.593681E-08 |
| 52 | -4.032601E-04 | 6.188912E-05 | -5.360525E-06 | 2.446968E-07 | -4.597155E-09 |
| 61 | 7.211342E-06 | 2.300800E-06 | -4.919754E-07 | 3.779310E-08 | -1.036230E-09 |
| 62 | 1.146164E-04 | -1.302121E-05 | 9.023074E-07 | -3.472880E-08 | 5.665150E-10 |
| 71 | 1.576831E-05 | -1.193206E-06 | 5.655758E-08 | -1.512702E-09 | 1.725800E-11 |
| 72 | 6.685202E-06 | -4.190979E-07 | 1.776622E-08 | -4.395940E-10 | 4.681000E-12 |
| 81 | 1.619329E-07 | -2.064079E-08 | 6.970720E-10 | -1.078900E-11 | 6.500000E-14 |
| 82 | 8.000947E-07 | -3.759368E-08 | 9.741360E-10 | -1.317800E-11 | 7.200000E-14 |

FIG. 21

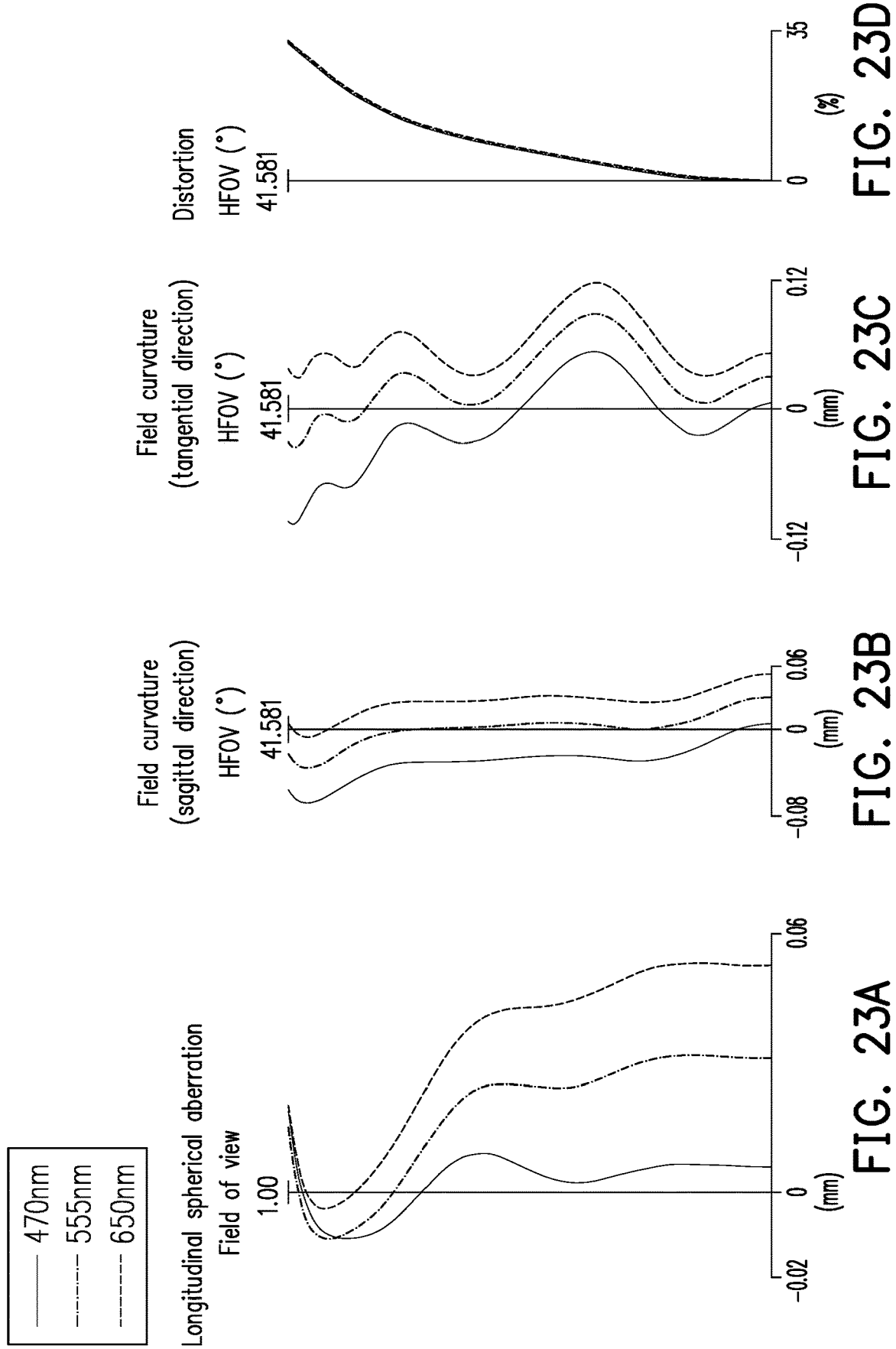

| Fifth Embodiment ||||||
|---|---|---|---|---|---|
| EFL=6.205 mm, HFOV=41.581°, TTL=7.737 mm, Fno=1.700, ImgH=7.223 mm ||||||
| Element | Surface | Radius of curvature (mm) | Thickness (mm) | Refractive index | Abbe number | Focal length (mm) |
| Object | | Infinity | Infinity | | | |
| Aperture 0 | | Infinity | 0.063 | | | |
| First lens element 1 | Object-side surface 11 | 3.095 | 0.935 | 1.545 | 55.987 | 7.128 |
| | Image-side surface 12 | 13.481 | 0.058 | | | |
| Second lens element 2 | Object-side surface 21 | 8.183 | 0.234 | 1.671 | 19.243 | -23.251 |
| | Image-side surface 22 | 5.324 | 0.715 | | | |
| Third lens element 3 | Object-side surface 31 | -25.469 | 0.590 | 1.545 | 55.987 | 23.587 |
| | Image-side surface 32 | -8.626 | 0.0003 | | | |
| Fourth lens element 4 | Object-side surface 41 | 5.865 | 0.294 | 1.671 | 19.243 | -33.014 |
| | Image-side surface 42 | 4.552 | 0.177 | | | |
| Fifth lens element 5 | Object-side surface 51 | -29.989 | 0.296 | 1.567 | 37.490 | 57.509 |
| | Image-side surface 52 | -15.717 | 0.463 | | | |
| Sixth lens element 6 | Object-side surface 61 | -11.880 | 0.266 | 1.567 | 37.490 | 45.972 |
| | Image-side surface 62 | -8.240 | 0.422 | | | |
| Seventh lens element 7 | Object-side surface 71 | 4.670 | 0.493 | 1.545 | 55.987 | 12.085 |
| | Image-side surface 72 | 15.366 | 1.624 | | | |
| Eighth lens element 8 | Object-side surface 81 | -6.346 | 0.234 | 1.545 | 55.987 | -6.654 |
| | Image-side surface 82 | 8.619 | 0.585 | | | |
| Filter F | Object-side surface F1 | Infinity | 0.210 | 1.560 | 51.700 | |
| | Image-side surface F2 | Infinity | 0.140 | | | |
| | Image plane 99 | Infinity | | | | |

FIG. 24

| Surface | K | $a_4$ | $a_6$ | $a_8$ | $a_{10}$ |
|---|---|---|---|---|---|
| 11 | 3.593595E-01 | -1.082605E-03 | 2.401398E-03 | -2.985887E-03 | 2.138753E-03 |
| 12 | -1.199748E+01 | -5.696092E-03 | 2.008395E-03 | 2.762804E-04 | -8.268178E-04 |
| 21 | -1.201446E+01 | -1.225327E-02 | 6.402331E-03 | -2.935165E-03 | 1.481850E-03 |
| 22 | -1.858846E-01 | -3.337239E-03 | -3.212149E-03 | 1.297226E-02 | -1.363830E-02 |
| 31 | -3.201879E+00 | 2.401619E-03 | -8.870667E-04 | -4.138823E-03 | 4.548392E-03 |
| 32 | 4.182458E+00 | 2.798898E-02 | -3.981364E-02 | 3.142328E-02 | -1.718406E-02 |
| 41 | -8.378065E+01 | 1.543843E-02 | -3.957022E-02 | 3.131335E-02 | -1.537784E-02 |
| 42 | -7.081157E+01 | 1.673863E-02 | -3.449589E-02 | 2.313426E-02 | -1.012346E-02 |
| 51 | -1.654009E+01 | -4.336670E-03 | 7.739151E-03 | -8.340875E-03 | 4.678160E-03 |
| 52 | 1.178763E+01 | -6.348991E-04 | 2.481389E-03 | -2.828069E-03 | 1.484476E-03 |
| 61 | 2.458659E+01 | 1.290339E-02 | -5.172896E-03 | 9.427009E-04 | -1.525448E-04 |
| 62 | -1.042564E+00 | 3.932136E-03 | -4.955934E-03 | 2.287896E-03 | -6.377455E-04 |
| 71 | -2.781672E+00 | -2.498819E-03 | -3.263675E-03 | 7.881165E-04 | -1.401271E-04 |
| 72 | 1.072210E+00 | 1.146115E-02 | -4.493243E-03 | 6.774459E-04 | -7.751121E-05 |
| 81 | -3.009275E-02 | -2.539199E-02 | 3.174176E-03 | -2.223576E-04 | 7.010264E-06 |
| 82 | -7.890265E-01 | -1.202334E-02 | 7.356187E-04 | 1.432236E-05 | -8.632453E-06 |
| Surface | $a_{12}$ | $a_{14}$ | $a_{16}$ | $a_{18}$ | $a_{20}$ |
| 11 | -9.483291E-04 | 2.630429E-04 | -4.445941E-05 | 4.234883E-06 | -1.499913E-07 |
| 12 | 5.210065E-04 | -1.737599E-04 | 3.398130E-05 | -3.248605E-06 | 1.633808E-07 |
| 21 | -5.271712E-04 | 1.143381E-04 | -1.242084E-05 | 4.610360E-07 | 8.107780E-10 |
| 22 | 8.340791E-03 | -3.063462E-03 | 6.702659E-04 | -8.059831E-05 | 4.084098E-06 |
| 31 | -2.706081E-03 | 9.766683E-04 | -2.123456E-04 | 2.592234E-05 | -1.362470E-06 |
| 32 | 6.119475E-03 | -1.417492E-03 | 2.050776E-04 | -1.657835E-05 | 5.538318E-07 |
| 41 | 4.792654E-03 | -9.570012E-04 | 1.191665E-04 | -8.348348E-06 | 2.463543E-07 |
| 42 | 2.949720E-03 | -5.680047E-04 | 6.918892E-05 | -4.799151E-06 | 1.452305E-07 |
| 51 | -1.444355E-03 | 2.597268E-04 | -2.706015E-05 | 1.524559E-06 | -3.614437E-08 |
| 52 | -4.032616E-04 | 6.186121E-05 | -5.363912E-06 | 2.523057E-07 | -4.240879E-09 |
| 61 | 7.083185E-06 | 2.275029E-06 | -4.990491E-07 | 3.583602E-08 | -1.475901E-09 |
| 62 | 1.145870E-04 | -1.304225E-05 | 9.027950E-07 | -3.491385E-08 | 6.005100E-10 |
| 71 | 1.555354E-05 | -1.171297E-06 | 6.016747E-08 | -1.728971E-09 | -3.542800E-11 |
| 72 | 6.690266E-06 | -4.332287E-07 | 1.868945E-08 | -4.304210E-10 | 2.784000E-12 |
| 81 | 1.652223E-07 | -2.055493E-08 | 7.024050E-10 | -1.024400E-11 | 1.240000E-13 |
| 82 | 8.034274E-07 | -3.759787E-08 | 9.734770E-10 | -1.321700E-11 | 7.200000E-14 |

FIG. 25

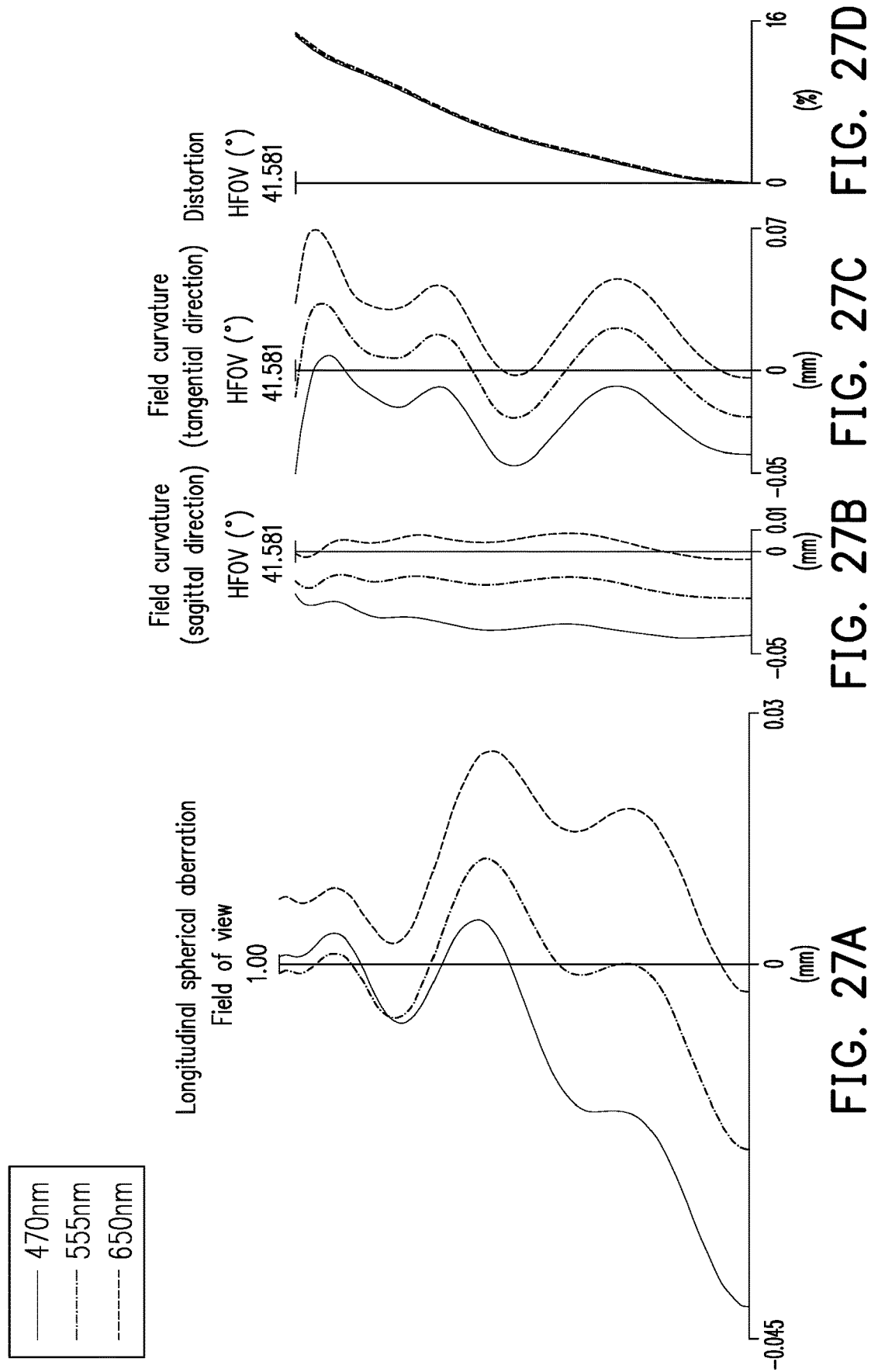

| Sixth Embodiment |||||||
|---|---|---|---|---|---|---|
| | EFL=7.111 mm, HFOV=41.581°, TTL=8.933 mm, Fno=1.700, ImgH=7.263 mm |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.348 | | | |
| First lens element 1 | Object-side surface 11 | 3.253 | 0.934 | 1.545 | 55.987 | 7.618 |
| | Image-side surface 12 | 13.378 | 0.184 | | | |
| Second lens element 2 | Object-side surface 21 | 8.538 | 0.359 | 1.671 | 19.243 | -20.362 |
| | Image-side surface 22 | 5.185 | 0.750 | | | |
| Third lens element 3 | Object-side surface 31 | -19.430 | 0.666 | 1.545 | 55.987 | 24.604 |
| | Image-side surface 32 | -8.041 | 0.060 | | | |
| Fourth lens element 4 | Object-side surface 41 | 7.761 | 0.303 | 1.671 | 19.243 | -31.669 |
| | Image-side surface 42 | 5.610 | 0.222 | | | |
| Fifth lens element 5 | Object-side surface 51 | -28.447 | 0.352 | 1.567 | 37.490 | 45.215 |
| | Image-side surface 52 | -13.582 | 0.881 | | | |
| Sixth lens element 6 | Object-side surface 61 | -14.149 | 0.442 | 1.567 | 37.490 | 35.552 |
| | Image-side surface 62 | -8.426 | 0.487 | | | |
| Seventh lens element 7 | Object-side surface 71 | 4.100 | 0.523 | 1.545 | 55.987 | 15.382 |
| | Image-side surface 72 | 7.647 | 1.664 | | | |
| Eighth lens element 8 | Object-side surface 81 | -6.037 | 0.233 | 1.545 | 55.987 | -6.152 |
| | Image-side surface 82 | 7.684 | 0.585 | | | |
| Filter F | Object-side surface F1 | Infinity | 0.210 | 1.560 | 51.700 | |
| | Image-side surface F2 | Infinity | 0.080 | | | |
| | Image plane 99 | Infinity | | | | |

FIG. 28

| Surface | K | $a_4$ | $a_6$ | $a_8$ | $a_{10}$ |
|---|---|---|---|---|---|
| 11 | 2.969391E-01 | -1.391537E-03 | 2.421353E-03 | -2.979538E-03 | 2.138470E-03 |
| 12 | -1.387821E+01 | -6.025367E-03 | 2.081135E-03 | 2.890991E-04 | -8.360300E-04 |
| 21 | -1.070369E+01 | -1.201039E-02 | 6.489095E-03 | -2.915796E-03 | 1.484371E-03 |
| 22 | -6.169165E-01 | -3.510112E-03 | -3.397223E-03 | 1.289198E-02 | -1.365571E-02 |
| 31 | 2.150493E+01 | 1.824419E-03 | -9.131728E-04 | -4.155948E-03 | 4.542952E-03 |
| 32 | 1.602552E-01 | 2.691388E-02 | -3.912602E-02 | 3.143659E-02 | -1.717570E-02 |
| 41 | -7.783172E+01 | 1.295037E-02 | -3.974448E-02 | 3.129162E-02 | -1.538030E-02 |
| 42 | -7.363306E+01 | 1.539407E-02 | -3.441611E-02 | 2.312169E-02 | -1.012437E-02 |
| 51 | 5.342044E+01 | -5.492601E-03 | 7.687814E-03 | -8.347125E-03 | 4.674964E-03 |
| 52 | -2.680236E+00 | 1.037593E-03 | 2.238905E-03 | -2.862451E-03 | 1.481527E-03 |
| 61 | 9.962005E+00 | 1.344788E-02 | -4.794558E-03 | 9.760662E-04 | -1.504320E-04 |
| 62 | -1.244947E+01 | 3.451378E-03 | -5.242136E-03 | 2.281612E-03 | -6.374665E-04 |
| 71 | -6.375915E-01 | -1.714000E-03 | -3.423965E-03 | 7.965858E-04 | -1.361391E-04 |
| 72 | -2.645839E+00 | 1.121296E-02 | -4.374288E-03 | 6.778847E-04 | -7.785231E-05 |
| 81 | -1.998042E+01 | -2.365037E-02 | 3.151868E-03 | -2.261551E-04 | 6.886917E-06 |
| 82 | -1.102924E-01 | -1.166958E-02 | 7.467224E-04 | 1.484450E-05 | -8.615661E-06 |
| Surface | $a_{12}$ | $a_{14}$ | $a_{16}$ | $a_{18}$ | $a_{20}$ |
| 11 | -9.491438E-04 | 2.628743E-04 | -4.451348E-05 | 4.213199E-06 | -1.695560E-07 |
| 12 | 5.219253E-04 | -1.736203E-04 | 3.292584E-05 | -3.310859E-06 | 1.356009E-07 |
| 21 | -5.274191E-04 | 1.140235E-04 | -1.255686E-05 | 4.193059E-07 | 1.338658E-08 |
| 22 | 8.328106E-03 | -3.061904E-03 | 6.712381E-04 | -8.040071E-05 | 4.037746E-06 |
| 31 | -2.709854E-03 | 9.759736E-04 | -2.122841E-04 | 2.596663E-05 | -1.360259E-06 |
| 32 | 6.120931E-03 | -1.417234E-03 | 2.051172E-04 | -1.657437E-05 | 5.532971E-07 |
| 41 | 4.792228E-03 | -9.570781E-04 | 1.191555E-04 | -8.348958E-06 | 2.472062E-07 |
| 42 | 2.949649E-03 | -5.679512E-04 | 6.919398E-05 | -4.799743E-06 | 1.441228E-07 |
| 51 | -1.444586E-03 | 2.596920E-04 | -2.709035E-05 | 1.524811E-06 | -3.591734E-08 |
| 52 | -4.032956E-04 | 6.188792E-05 | -5.360258E-06 | 2.447614E-07 | -4.589514E-09 |
| 61 | 7.148775E-06 | 2.295606E-06 | -4.921715E-07 | 3.775614E-08 | -1.039533E-09 |
| 62 | 1.146041E-04 | -1.302172E-05 | 9.023139E-07 | -3.472351E-08 | 5.671940E-10 |
| 71 | 1.576593E-05 | -1.193294E-06 | 5.655533E-08 | -1.512705E-09 | 1.726000E-11 |
| 72 | 6.686305E-06 | -4.190809E-07 | 1.776605E-08 | -4.396190E-10 | 4.679000E-12 |
| 81 | 1.618124E-07 | -2.064281E-08 | 6.970860E-10 | -1.078500E-11 | 6.600000E-14 |
| 82 | 8.015651E-07 | -3.759483E-08 | 9.733380E-10 | -1.319400E-11 | 7.300000E-14 |

FIG. 29

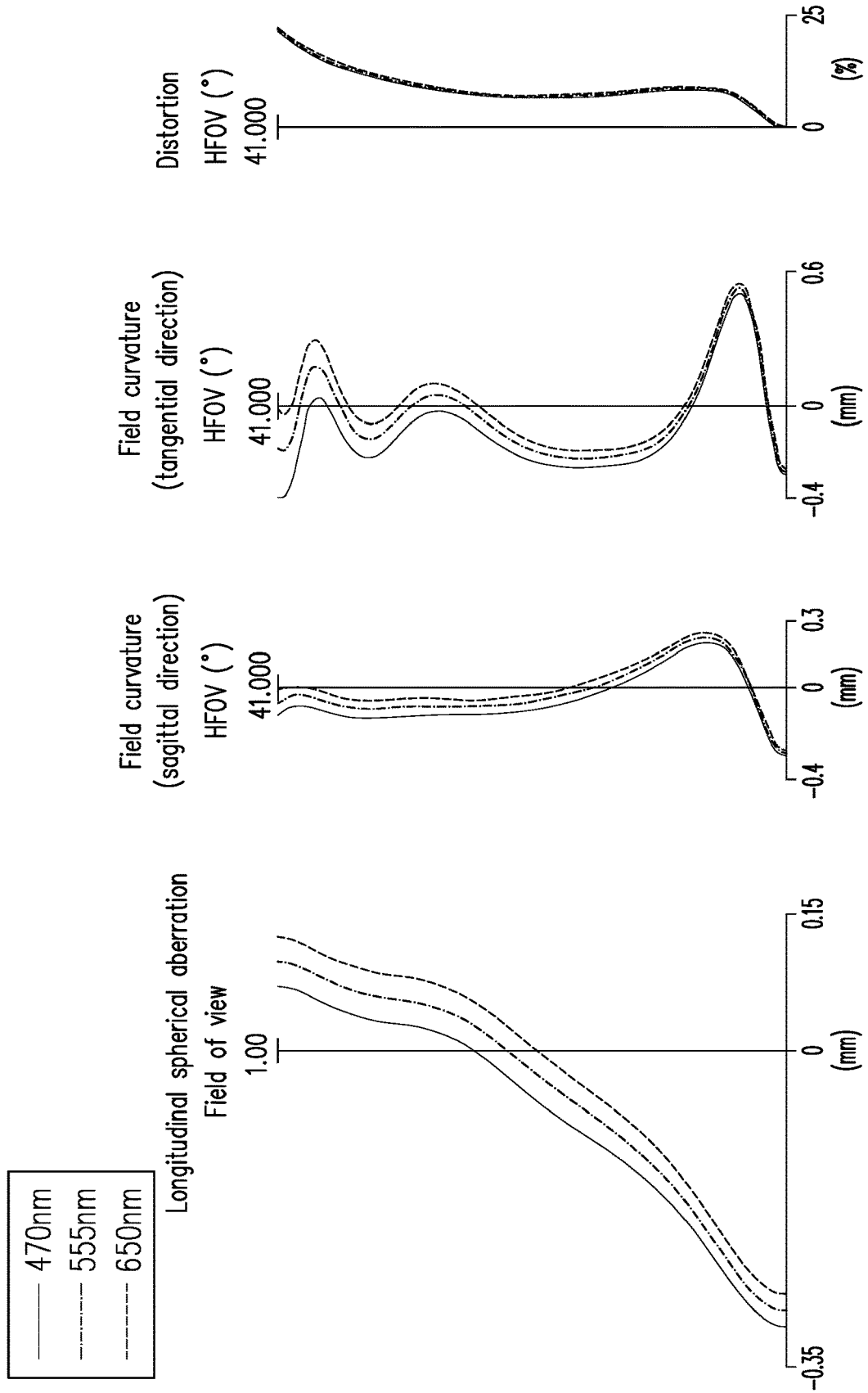

| Seventh Embodiment ||||||
|---|---|---|---|---|---|
| EFL=6.602 mm, HFOV=41.000°, TTL=9.123 mm, Fno=1.780, ImgH=7.498 mm ||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.109 | | | |
| First lens element 1 | Object-side surface 11 | 3.323 | 1.118 | 1.545 | 55.987 | 7.701 |
| | Image-side surface 12 | 13.939 | 0.165 | | | |
| Second lens element 2 | Object-side surface 21 | 7.429 | 0.349 | 1.671 | 19.243 | -43.067 |
| | Image-side surface 22 | 5.809 | 0.742 | | | |
| Third lens element 3 | Object-side surface 31 | -12.883 | 0.573 | 1.545 | 55.987 | -520.746 |
| | Image-side surface 32 | -13.706 | 0.138 | | | |
| Fourth lens element 4 | Object-side surface 41 | 8.574 | 0.237 | 1.671 | 19.243 | -8.999 |
| | Image-side surface 42 | 3.523 | 0.140 | | | |
| Fifth lens element 5 | Object-side surface 51 | -1211.085 | 0.411 | 1.567 | 37.533 | 15.875 |
| | Image-side surface 52 | -8.980 | 0.590 | | | |
| Sixth lens element 6 | Object-side surface 61 | -41.521 | 0.521 | 1.567 | 37.533 | 8.172 |
| | Image-side surface 62 | -4.206 | 0.427 | | | |
| Seventh lens element 7 | Object-side surface 71 | 4.507 | 0.685 | 1.545 | 55.987 | 46.968 |
| | Image-side surface 72 | 5.174 | 2.083 | | | |
| Eighth lens element 8 | Object-side surface 81 | -3.962 | 0.180 | 1.545 | 55.987 | -5.109 |
| | Image-side surface 82 | 9.595 | 0.518 | | | |
| Filter F | Object-side surface F1 | Infinity | 0.210 | 1.563 | 51.700 | |
| | Image-side surface F2 | Infinity | 0.037 | | | |
| | Image plane 99 | Infinity | | | | |

FIG. 32

| Surface | K | $a_4$ | $a_6$ | $a_8$ | $a_{10}$ |
|---|---|---|---|---|---|
| 11 | 2.691604E-01 | -1.634241E-03 | 2.369394E-03 | -2.971557E-03 | 2.139172E-03 |
| 12 | -2.665243E+01 | -6.368660E-03 | 2.041327E-03 | 2.820603E-04 | -8.413623E-04 |
| 21 | -1.125219E+01 | -1.190309E-02 | 6.431956E-03 | -2.912926E-03 | 1.479886E-03 |
| 22 | -2.744797E+00 | -4.876585E-03 | -3.620510E-03 | 1.283496E-02 | -1.366260E-02 |
| 31 | 2.592347E+01 | -9.110145E-04 | -4.497363E-04 | -4.079288E-03 | 4.549926E-03 |
| 32 | -2.618224E+01 | 2.891851E-02 | -3.917894E-02 | 3.146000E-02 | -1.717052E-02 |
| 41 | -5.045400E+02 | 1.228437E-02 | -3.982765E-02 | 3.126010E-02 | -1.538560E-02 |
| 42 | -9.554362E+01 | 1.531733E-02 | -3.438544E-02 | 2.313326E-02 | -1.012265E-02 |
| 51 | 2.509706E+02 | -6.171235E-03 | 7.627385E-03 | -8.355361E-03 | 4.674203E-03 |
| 52 | 1.295407E+00 | 9.020924E-04 | 2.223170E-03 | -2.855488E-03 | 1.482400E-03 |
| 61 | 1.574769E+02 | 1.236938E-02 | -4.649052E-03 | 9.655215E-04 | -1.500951E-04 |
| 62 | -2.326988E+02 | 2.704094E-03 | -5.253643E-03 | 2.282813E-03 | -6.373481E-04 |
| 71 | -6.973130E-01 | -2.084764E-03 | -3.406170E-03 | 8.005781E-04 | -1.360712E-04 |
| 72 | -4.794598E+01 | 1.200441E-02 | -4.353691E-03 | 6.778248E-04 | -7.786234E-05 |
| 81 | -2.115048E+01 | -2.390539E-02 | 3.155425E-03 | -2.259450E-04 | 6.893279E-06 |
| 82 | -1.858126E+00 | -1.214126E-02 | 7.603540E-04 | 1.656004E-05 | -8.642529E-06 |
| Surface | $a_{12}$ | $a_{14}$ | $a_{16}$ | $a_{18}$ | $a_{20}$ |
| 11 | -9.494338E-04 | 2.627784E-04 | -4.453685E-05 | 4.205926E-06 | -1.722052E-07 |
| 12 | 5.199184E-04 | -1.741946E-04 | 3.280921E-05 | -3.319980E-06 | 1.408701E-07 |
| 21 | -5.290970E-04 | 1.138557E-04 | -1.251032E-05 | 4.402965E-07 | 1.688674E-08 |
| 22 | 8.327455E-03 | -3.061961E-03 | 6.712535E-04 | -8.039896E-05 | 4.044148E-06 |
| 31 | -2.708870E-03 | 9.761507E-04 | -2.123151E-04 | 2.590858E-05 | -1.398060E-06 |
| 32 | 6.120694E-03 | -1.417616E-03 | 2.049968E-04 | -1.659577E-05 | 5.521266E-07 |
| 41 | 4.791778E-03 | -9.570736E-04 | 1.191625E-04 | -8.349863E-06 | 2.459862E-07 |
| 42 | 2.949833E-03 | -5.679347E-04 | 6.919580E-05 | -4.799400E-06 | 1.442413E-07 |
| 51 | -1.444658E-03 | 2.596831E-04 | -2.709193E-05 | 1.524502E-06 | -3.597620E-08 |
| 52 | -4.032309E-04 | 6.189163E-05 | -5.360189E-06 | 2.447692E-07 | -4.585512E-09 |
| 61 | 7.266834E-06 | 2.301869E-06 | -4.921573E-07 | 3.775713E-08 | -1.040320E-09 |
| 62 | 1.146119E-04 | -1.302139E-05 | 9.023048E-07 | -3.472606E-08 | 5.667960E-10 |
| 71 | 1.576847E-05 | -1.193196E-06 | 5.655786E-08 | -1.512694E-09 | 1.726000E-11 |
| 72 | 6.685865E-06 | -4.190941E-07 | 1.776578E-08 | -4.396230E-10 | 4.679000E-12 |
| 81 | 1.619669E-07 | -2.064012E-08 | 6.970830E-10 | -1.078900E-11 | 6.500000E-14 |
| 82 | 7.999944E-07 | -3.759403E-08 | 9.741780E-10 | -1.317600E-11 | 7.300000E-14 |

FIG. 33

| Eighth Embodiment | | | | | | |
|---|---|---|---|---|---|---|
| EFL=5.713 mm, HFOV=42.000°, TTL=9.243 mm, Fno=1.700, ImgH=7.393 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.358 | | | |
| First lens element 1 | Object-side surface 11 | 3.922 | 1.427 | 1.545 | 55.987 | 8.560 |
| | Image-side surface 12 | 21.213 | 0.167 | | | |
| Second lens element 2 | Object-side surface 21 | 17.287 | 0.341 | 1.671 | 19.243 | -15.046 |
| | Image-side surface 22 | 6.362 | 0.768 | | | |
| Third lens element 3 | Object-side surface 31 | -14.902 | 0.594 | 1.545 | 55.987 | 15.766 |
| | Image-side surface 32 | -5.535 | 0.038 | | | |
| Fourth lens element 4 | Object-side surface 41 | 4.827 | 0.180 | 1.671 | 19.243 | 463972260.172 |
| | Image-side surface 42 | 4.755 | 0.177 | | | |
| Fifth lens element 5 | Object-side surface 51 | -64.180 | 0.299 | 1.567 | 37.533 | 17.797 |
| | Image-side surface 52 | -8.772 | 0.861 | | | |
| Sixth lens element 6 | Object-side surface 61 | -23.994 | 0.568 | 1.567 | 37.533 | 13.327 |
| | Image-side surface 62 | -5.818 | 0.346 | | | |
| Seventh lens element 7 | Object-side surface 71 | 13.978 | 0.351 | 1.545 | 55.987 | 51.260 |
| | Image-side surface 72 | 27.661 | 1.522 | | | |
| Eighth lens element 8 | Object-side surface 81 | -3.723 | 0.179 | 1.545 | 55.987 | -4.567 |
| | Image-side surface 82 | 7.688 | 0.917 | | | |
| Filter F | Object-side surface F1 | Infinity | 0.210 | 1.563 | 51.700 | |
| | Image-side surface F2 | Infinity | 0.299 | | | |
| | Image plane 99 | Infinity | | | | |

FIG. 36

| Surface | K | $a_4$ | $a_6$ | $a_8$ | $a_{10}$ |
|---|---|---|---|---|---|
| 11 | 4.460382E-01 | -3.770074E-04 | 2.402932E-03 | -2.967405E-03 | 2.141714E-03 |
| 12 | -8.927344E+00 | -5.714435E-03 | 2.594031E-03 | 4.375519E-04 | -8.174367E-04 |
| 21 | -2.510702E+01 | -1.317238E-02 | 5.862553E-03 | -3.101509E-03 | 1.441813E-03 |
| 22 | -2.232401E+00 | -4.747582E-03 | -3.602839E-03 | 1.279254E-02 | -1.368508E-02 |
| 31 | 4.055175E+00 | 3.313493E-03 | -6.160291E-04 | -4.151027E-03 | 4.541111E-03 |
| 32 | 2.208832E+00 | 2.599310E-02 | -3.933302E-02 | 3.143449E-02 | -1.717525E-02 |
| 41 | -4.384772E+02 | 1.324058E-02 | -3.962832E-02 | 3.130384E-02 | -1.537935E-02 |
| 42 | -1.450072E+02 | 1.552264E-02 | -3.453426E-02 | 2.310806E-02 | -1.012572E-02 |
| 51 | 3.252772E+02 | -6.821088E-03 | 7.630008E-03 | -8.352755E-03 | 4.674269E-03 |
| 52 | -1.786608E+00 | 1.592750E-03 | 2.212797E-03 | -2.858506E-03 | 1.482106E-03 |
| 61 | 3.300402E+01 | 1.224921E-02 | -4.662864E-03 | 9.608098E-04 | -1.504820E-04 |
| 62 | -1.358690E+01 | 3.360339E-03 | -5.239867E-03 | 2.280890E-03 | -6.375123E-04 |
| 71 | 3.858814E-01 | -1.713753E-03 | -3.410330E-03 | 8.004564E-04 | -1.360602E-04 |
| 72 | -5.613346E+00 | 1.116845E-02 | -4.348611E-03 | 6.781262E-04 | -7.785526E-05 |
| 81 | -3.260119E+01 | -2.396907E-02 | 3.154510E-03 | -2.259707E-04 | 6.893012E-06 |
| 82 | -1.779423E+00 | -1.211036E-02 | 7.644627E-04 | 1.667936E-05 | -8.639645E-06 |
| Surface | $a_{12}$ | $a_{14}$ | $a_{16}$ | $a_{18}$ | $a_{20}$ |
| 11 | -9.485981E-04 | 2.629957E-04 | -4.447372E-05 | 4.229823E-06 | -1.604116E-07 |
| 12 | 5.180819E-04 | -1.773639E-04 | 3.145716E-05 | -3.573578E-06 | 2.651963E-07 |
| 21 | -5.338645E-04 | 1.139971E-04 | -1.219797E-05 | 4.931396E-07 | -4.164331E-08 |
| 22 | 8.318674E-03 | -3.064926E-03 | 6.705115E-04 | -8.040687E-05 | 4.195883E-06 |
| 31 | -2.708928E-03 | 9.764887E-04 | -2.121679E-04 | 2.596233E-05 | -1.378125E-06 |
| 32 | 6.120876E-03 | -1.417344E-03 | 2.050858E-04 | -1.657544E-05 | 5.558762E-07 |
| 41 | 4.792405E-03 | -9.570322E-04 | 1.191651E-04 | -8.348506E-06 | 2.467582E-07 |
| 42 | 2.949584E-03 | -5.679484E-04 | 6.919564E-05 | -4.799457E-06 | 1.441757E-07 |
| 51 | -1.444690E-03 | 2.596756E-04 | -2.709296E-05 | 1.524441E-06 | -3.597234E-08 |
| 52 | -4.032532E-04 | 6.188901E-05 | -5.360692E-06 | 2.446551E-07 | -4.606833E-09 |
| 61 | 7.248391E-06 | 2.301850E-06 | -4.920225E-07 | 3.777986E-08 | -1.037471E-09 |
| 62 | 1.146024E-04 | -1.302253E-05 | 9.022046E-07 | -3.473524E-08 | 5.659730E-10 |
| 71 | 1.577029E-05 | -1.193067E-06 | 5.656579E-08 | -1.512237E-09 | 1.728500E-11 |
| 72 | 6.685954E-06 | -4.190953E-07 | 1.776565E-08 | -4.396360E-10 | 4.678000E-12 |
| 81 | 1.619781E-07 | -2.063893E-08 | 6.971550E-10 | -1.078500E-11 | 6.600000E-14 |
| 82 | 8.000716E-07 | -3.759182E-08 | 9.742460E-10 | -1.317300E-11 | 7.300000E-14 |

FIG. 37

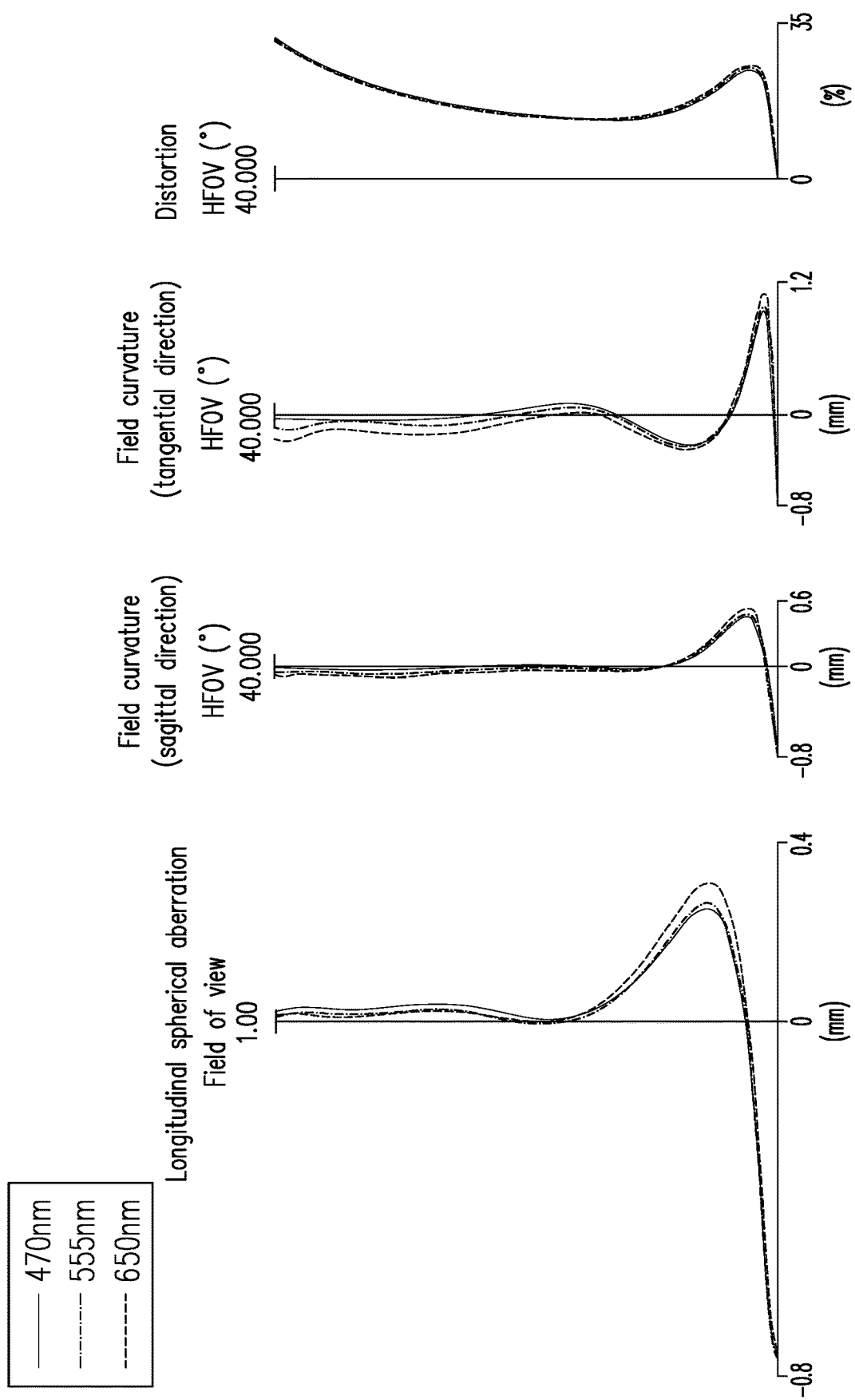

| Ninth Embodiment ||||||
|---|---|---|---|---|---|---|
| | EFL=6.361 mm, HFOV=40.000°, TTL=8.819 mm, Fno=1.700, ImgH=7.002 mm |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.087 | | | |
| First lens element 1 | Object-side surface 11 | 3.267 | 1.201 | 1.545 | 55.987 | 7.479 |
| | Image-side surface 12 | 14.192 | 0.133 | | | |
| Second lens element 2 | Object-side surface 21 | 8.690 | 0.302 | 1.671 | 19.243 | -30.779 |
| | Image-side surface 22 | 6.048 | 0.843 | | | |
| Third lens element 3 | Object-side surface 31 | -14.102 | 0.668 | 1.545 | 55.987 | 8.324 |
| | Image-side surface 32 | -3.496 | 0.116 | | | |
| Fourth lens element 4 | Object-side surface 41 | 91.096 | 0.221 | 1.671 | 19.243 | -6.170 |
| | Image-side surface 42 | 3.993 | 0.187 | | | |
| Fifth lens element 5 | Object-side surface 51 | -19.867 | 0.342 | 1.567 | 37.533 | -377.060 |
| | Image-side surface 52 | -22.028 | 0.555 | | | |
| Sixth lens element 6 | Object-side surface 61 | 27.407 | 0.504 | 1.567 | 37.533 | 6.840 |
| | Image-side surface 62 | -4.513 | 0.342 | | | |
| Seventh lens element 7 | Object-side surface 71 | 4.943 | 0.721 | 1.545 | 55.987 | 29.315 |
| | Image-side surface 72 | 6.782 | 1.700 | | | |
| Eighth lens element 8 | Object-side surface 81 | -1.537 | 0.180 | 1.545 | 55.987 | -2.388 |
| | Image-side surface 82 | 8.977 | 0.585 | | | |
| Filter F | Object-side surface F1 | Infinity | 0.210 | 1.563 | 51.300 | |
| | Image-side surface F2 | Infinity | 0.010 | | | |
| | Image plane 99 | Infinity | | | | |

FIG. 40

| Surface | K | $a_4$ | $a_6$ | $a_8$ | $a_{10}$ |
|---|---|---|---|---|---|
| 11 | 3.053825E-01 | -1.281895E-03 | 2.355504E-03 | -2.972189E-03 | 2.139636E-03 |
| 12 | -1.455652E+01 | -6.165407E-03 | 2.044641E-03 | 2.543178E-04 | -8.447597E-04 |
| 21 | -1.391992E+01 | -1.259308E-02 | 6.367984E-03 | -2.933176E-03 | 1.480339E-03 |
| 22 | -2.472176E+00 | -4.532657E-03 | -3.450521E-03 | 1.287250E-02 | -1.365513E-02 |
| 31 | 6.524287E+00 | 8.912355E-04 | -7.842163E-04 | -4.163541E-03 | 4.542403E-03 |
| 32 | -3.244919E+01 | 2.398842E-02 | -3.912382E-02 | 3.148697E-02 | -1.717098E-02 |
| 41 | 9.573546E+01 | 1.574801E-02 | -4.013138E-02 | 3.122857E-02 | -1.538422E-02 |
| 42 | -1.431142E+02 | 1.369912E-02 | -3.443519E-02 | 2.312402E-02 | -1.012387E-02 |
| 51 | 4.135839E+01 | -5.280781E-03 | 7.645619E-03 | -8.351272E-03 | 4.674863E-03 |
| 52 | 2.741883E+01 | 2.244466E-05 | 2.203610E-03 | -2.858119E-03 | 1.482078E-03 |
| 61 | 6.654524E+01 | 9.914312E-03 | -4.760831E-03 | 9.671966E-04 | -1.508735E-04 |
| 62 | -2.839843E+04 | 1.464136E-03 | -5.295749E-03 | 2.280744E-03 | -6.373991E-04 |
| 71 | -1.143760E+00 | -6.558780E-04 | -3.343852E-03 | 7.994780E-04 | -1.362534E-04 |
| 72 | -1.101442E+21 | 1.712419E-02 | -4.614726E-03 | 6.797985E-04 | -7.775702E-05 |
| 81 | -1.360804E+01 | -2.369295E-02 | 3.157558E-03 | -2.259484E-04 | 6.891815E-06 |
| 82 | -7.097756E-01 | -1.210697E-02 | 7.527544E-04 | 1.640603E-05 | -8.644201E-06 |
| Surface | $a_{12}$ | $a_{14}$ | $a_{16}$ | $a_{18}$ | $a_{20}$ |
| 11 | -9.493607E-04 | 2.627895E-04 | -4.453135E-05 | 4.210952E-06 | -1.699770E-07 |
| 12 | 5.207808E-04 | -1.737243E-04 | 3.292268E-05 | -3.308285E-06 | 1.368287E-07 |
| 21 | -5.280853E-04 | 1.140642E-04 | -1.250677E-05 | 4.332462E-07 | 1.357474E-08 |
| 22 | 8.328565E-03 | -3.062010E-03 | 6.711534E-04 | -8.042440E-05 | 4.049779E-06 |
| 31 | -2.708890E-03 | 9.764615E-04 | -2.122401E-04 | 2.593581E-05 | -1.385254E-06 |
| 32 | 6.120299E-03 | -1.417617E-03 | 2.050193E-04 | -1.658575E-05 | 5.544077E-07 |
| 41 | 4.792428E-03 | -9.569785E-04 | 1.191729E-04 | -8.348384E-06 | 2.464447E-07 |
| 42 | 2.949775E-03 | -5.679251E-04 | 6.919918E-05 | -4.798812E-06 | 1.443081E-07 |
| 51 | -1.444568E-03 | 2.596952E-04 | -2.709034E-05 | 1.524671E-06 | -3.596624E-08 |
| 52 | -4.032561E-04 | 6.188740E-05 | -5.360929E-06 | 2.446431E-07 | -4.601539E-09 |
| 61 | 7.197616E-06 | 2.298276E-06 | -4.923121E-07 | 3.774726E-08 | -1.041594E-09 |
| 62 | 1.146130E-04 | -1.302126E-05 | 9.023350E-07 | -3.472341E-08 | 5.670790E-10 |
| 71 | 1.575866E-05 | -1.193622E-06 | 5.653813E-08 | -1.513463E-09 | 1.724100E-11 |
| 72 | 6.687131E-06 | -4.192006E-07 | 1.776325E-08 | -4.400190E-10 | 4.644000E-12 |
| 81 | 1.618902E-07 | -2.064305E-08 | 6.969980E-10 | -1.079000E-11 | 6.500000E-14 |
| 82 | 7.999734E-07 | -3.759489E-08 | 9.741370E-10 | -1.317700E-11 | 7.200000E-14 |

FIG. 41

| \multicolumn{7}{|c|}{Tenth Embodiment} |
|---|---|---|---|---|---|---|
| \multicolumn{7}{|c|}{EFL=7.726 mm, HFOV=41.581°, TTL=9.528 mm, Fno=1.700, ImgH=7.148 mm} |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.797 | | | |
| First lens element 1 | Object-side surface 11 | 3.352 | 1.087 | 1.545 | 55.987 | 7.717 |
| | Image-side surface 12 | 14.473 | 0.126 | | | |
| Second lens element 2 | Object-side surface 21 | 9.906 | 0.294 | 1.671 | 19.243 | -24.788 |
| | Image-side surface 22 | 6.157 | 0.922 | | | |
| Third lens element 3 | Object-side surface 31 | -6.898 | 0.761 | 1.545 | 55.987 | 12.752 |
| | Image-side surface 32 | -3.601 | 0.067 | | | |
| Fourth lens element 4 | Object-side surface 41 | 45.971 | 0.195 | 1.671 | 19.243 | -10.159 |
| | Image-side surface 42 | 5.976 | 0.139 | | | |
| Fifth lens element 5 | Object-side surface 51 | -23.538 | 0.505 | 1.567 | 37.533 | 12.357 |
| | Image-side surface 52 | -5.462 | 0.736 | | | |
| Sixth lens element 6 | Object-side surface 61 | -8.857 | 0.482 | 1.567 | 37.533 | -62.344 |
| | Image-side surface 62 | -12.032 | 0.521 | | | |
| Seventh lens element 7 | Object-side surface 71 | 4.618 | 0.653 | 1.545 | 55.987 | 16.080 |
| | Image-side surface 72 | 9.251 | 1.957 | | | |
| Eighth lens element 8 | Object-side surface 81 | -2.973 | 0.238 | 1.545 | 55.987 | -3.754 |
| | Image-side surface 82 | 6.796 | 0.561 | | | |
| Filter F | Object-side surface F1 | Infinity | 0.210 | 1.563 | 51.700 | |
| | Image-side surface F2 | Infinity | 0.073 | | | |
| | Image plane 99 | Infinity | | | | |

FIG. 44

| Surface | K | $a_4$ | $a_6$ | $a_8$ | $a_{10}$ |
|---|---|---|---|---|---|
| 11 | 3.417761E-01 | -8.373463E-04 | 2.449031E-03 | -2.961809E-03 | 2.142465E-03 |
| 12 | -1.575373E+01 | -5.742746E-03 | 2.220172E-03 | 2.835882E-04 | -8.397866E-04 |
| 21 | 2.447349E+00 | -1.105345E-02 | 6.220223E-03 | -2.989040E-03 | 1.470047E-03 |
| 22 | 1.681631E+00 | -1.858536E-03 | -3.675945E-03 | 1.278311E-02 | -1.366633E-02 |
| 31 | 1.066794E+01 | -5.038407E-04 | 2.967434E-04 | -4.068336E-03 | 4.525543E-03 |
| 32 | -1.119954E+01 | 2.135086E-02 | -3.999036E-02 | 3.151837E-02 | -1.714969E-02 |
| 41 | -6.056943E+05 | 1.237597E-02 | -3.995030E-02 | 3.125861E-02 | -1.538058E-02 |
| 42 | -1.300555E+02 | 1.200830E-02 | -3.427856E-02 | 2.311277E-02 | -1.012999E-02 |
| 51 | 6.599747E+01 | -5.732016E-03 | 7.647913E-03 | -8.346075E-03 | 4.674922E-03 |
| 52 | 7.731947E-02 | 3.457123E-03 | 2.378288E-03 | -2.866730E-03 | 1.479608E-03 |
| 61 | 6.404020E+00 | 1.539595E-02 | -4.786118E-03 | 9.634669E-04 | -1.498795E-04 |
| 62 | -3.087423E+01 | 3.228170E-03 | -5.253649E-03 | 2.281672E-03 | -6.374489E-04 |
| 71 | -5.369964E-01 | -1.559833E-03 | -3.393222E-03 | 8.004246E-04 | -1.360864E-04 |
| 72 | -1.503415E+00 | 1.115723E-02 | -4.371708E-03 | 6.781280E-04 | -7.783952E-05 |
| 81 | -3.590061E+01 | -2.389332E-02 | 3.155205E-03 | -2.259519E-04 | 6.893305E-06 |
| 82 | -1.866015E+00 | -1.214634E-02 | 7.626814E-04 | 1.665626E-05 | -8.639885E-06 |
| Surface | $a_{12}$ | $a_{14}$ | $a_{16}$ | $a_{18}$ | $a_{20}$ |
| 11 | -9.484786E-04 | 2.629754E-04 | -4.450597E-05 | 4.210066E-06 | -1.713791E-07 |
| 12 | 5.212289E-04 | -1.737517E-04 | 3.290272E-05 | -3.311871E-06 | 1.371374E-07 |
| 21 | -5.286464E-04 | 1.143181E-04 | -1.239866E-05 | 4.476245E-07 | 1.040106E-08 |
| 22 | 8.327164E-03 | -3.062236E-03 | 6.711731E-04 | -8.037198E-05 | 4.081394E-06 |
| 31 | -2.713665E-03 | 9.762471E-04 | -2.119451E-04 | 2.607264E-05 | -1.341550E-06 |
| 32 | 6.123360E-03 | -1.417466E-03 | 2.049940E-04 | -1.658946E-05 | 5.580867E-07 |
| 41 | 4.792866E-03 | -9.569296E-04 | 1.191801E-04 | -8.346263E-06 | 2.471641E-07 |
| 42 | 2.948860E-03 | -5.679984E-04 | 6.920019E-05 | -4.797263E-06 | 1.446232E-07 |
| 51 | -1.444721E-03 | 2.596631E-04 | -2.709309E-05 | 1.525008E-06 | -3.576114E-08 |
| 52 | -4.034901E-04 | 6.188306E-05 | -5.358639E-06 | 2.450909E-07 | -4.558255E-09 |
| 61 | 7.275882E-06 | 2.301320E-06 | -4.921214E-07 | 3.780278E-08 | -1.028206E-09 |
| 62 | 1.146056E-04 | -1.302162E-05 | 9.023161E-07 | -3.472296E-08 | 5.671790E-10 |
| 71 | 1.576789E-05 | -1.193210E-06 | 5.655791E-08 | -1.512654E-09 | 1.726400E-11 |
| 72 | 6.686750E-06 | -4.190661E-07 | 1.776651E-08 | -4.396130E-10 | 4.679000E-12 |
| 81 | 1.619765E-07 | -2.063960E-08 | 6.971030E-10 | -1.078800E-11 | 6.500000E-14 |
| 82 | 8.000516E-07 | -3.759311E-08 | 9.741830E-10 | -1.317600E-11 | 7.300000E-14 |

FIG. 45

| Conditional Expression | First Embodiment | Second Embodiment | Third Embodiment | Fourth Embodiment | Fifth Embodiment |
|---|---|---|---|---|---|
| D52t81/D41t52 | 4.743 | 4.435 | 1.954 | 5.628 | 4.259 |
| V3+V4+V5 | 105.137 | 124.064 | 100.340 | 112.763 | 112.719 |
| ImgH/Fno | 4.235 | 4.235 | 4.034 | 3.799 | 4.249 |
| (T7+G78+T8)/T4 | 11.811 | 8.696 | 8.000 | 11.845 | 8.000 |
| AAG/ALT | 0.854 | 0.850 | 0.876 | 1.086 | 1.035 |
| (T1+G12+T2+G23+T3)/D41t52 | 3.306 | 3.501 | 3.301 | 3.657 | 3.300 |
| Tmax/BFL | 1.512 | 1.010 | 1.000 | 1.322 | 1.000 |
| V2+V6+V7 | 112.719 | 124.064 | 89.580 | 112.763 | 112.719 |
| (EFL+BFL)/Fno | 4.717 | 4.915 | 5.682 | 4.506 | 4.200 |
| (T2+G23+T3)/T6 | 3.008 | 3.345 | 6.790 | 3.003 | 5.777 |
| EFL/(G45+T5) | 12.100 | 12.008 | 12.000 | 13.952 | 13.106 |
| (G23+G34)/G56 | 1.999 | 0.750 | 2.000 | 0.974 | 1.546 |
| Tmax/Tmin | 4.557 | 4.710 | 5.765 | 5.256 | 4.001 |
| (V6+V7+V8)/V5 | 4.998 | 3.243 | 4.969 | 3.983 | 3.987 |
| TL/Fno | 4.910 | 4.668 | 4.179 | 4.536 | 4.001 |
| (T6+G67+T7)/(T3+G34) | 4.007 | 2.313 | 2.000 | 2.001 | 2.000 |
| TTL/(T4+T6) | 12.007 | 12.064 | 17.418 | 12.000 | 13.809 |
| (ALT+BFL)/AAG | 1.366 | 1.496 | 1.500 | 1.109 | 1.236 |

FIG. 46

| Conditional Expression | Sixth Embodiment | Seventh Embodiment | Eighth Embodiment | Ninth Embodiment | Tenth Embodiment |
|---|---|---|---|---|---|
| D52t81/D41t52 | 4.559 | 5.469 | 5.560 | 5.098 | 5.185 |
| V3+V4+V5 | 112.719 | 112.763 | 112.763 | 112.763 | 112.763 |
| ImgH/Fno | 4.272 | 4.212 | 4.349 | 4.119 | 4.205 |
| (T7+G78+T8)/T4 | 8.000 | 12.432 | 11.420 | 11.755 | 14.618 |
| AAG/ALT | 1.114 | 1.052 | 0.985 | 0.936 | 1.060 |
| (T1+G12+T2+G23+T3)/D41t52 | 3.300 | 3.742 | 5.025 | 4.197 | 3.803 |
| Tmax/BFL | 1.066 | 1.460 | 1.000 | 1.492 | 1.288 |
| V2+V6+V7 | 112.719 | 112.763 | 112.763 | 112.763 | 112.763 |
| (EFL+BFL)/Fno | 4.698 | 4.139 | 4.200 | 4.216 | 5.041 |
| (T2+G23+T3)/T6 | 4.016 | 3.192 | 2.999 | 3.595 | 4.100 |
| EFL/(G45+T5) | 12.392 | 12.000 | 11.995 | 12.036 | 11.997 |
| (G23+G34)/G56 | 0.919 | 1.494 | 0.936 | 1.727 | 1.344 |
| Tmax/Tmin | 4.000 | 6.218 | 7.982 | 6.683 | 5.581 |
| (V6+V7+V8)/V5 | 3.987 | 3.983 | 3.983 | 3.983 | 3.983 |
| TL/Fno | 4.740 | 4.695 | 4.598 | 4.714 | 5.108 |
| (T6+G67+T7)/(T3+G34) | 2.000 | 2.297 | 2.000 | 2.000 | 2.000 |
| TTL/(T4+T6) | 12.000 | 12.031 | 12.366 | 12.158 | 14.075 |
| (ALT+BFL)/AAG | 1.104 | 1.129 | 1.383 | 1.276 | 1.132 |

FIG. 47

OPTICAL IMAGING LENS

CROSS-REFERENCE TO RELATED APPLICATION

This application claims the priority benefit of China application serial no. 202111626486.6, filed on Dec. 28, 2021. The entirety of the above-mentioned patent application is hereby incorporated by reference herein and made a part of this specification.

BACKGROUND

Technical Field

The disclosure relates to an optical element, and particularly to an optical imaging lens.

Description of Related Art

In recent years, optical imaging lenses have continued to evolve and have a wider range of applications. In addition to requiring the lens to be light, thin, short, and small, the design of a small F-number (Fno) is beneficial to increase the luminous flux, and a large field of view has gradually become a trend. In addition, in order to increase the pixels and resolution, the image height of the optical imaging lens must be increased, and a larger image sensor is adopted to receive imaging rays to satisfy the high-resolution requirement. Therefore, how to design a light, thin, short, and small optical imaging lens with a small F-number, a large image height, and good imaging quality has become a challenge and an issue to be solved.

SUMMARY

The disclosure provides an optical imaging lens, which can provide an optical imaging lens with a small F-number, a relatively large image height, and excellent imaging quality.

An embodiment of the disclosure provides an optical imaging lens, which includes a first lens element, a second lens element, a third lens element, a fourth lens element, a fifth lens element, a sixth lens element, a seventh lens element, and an eighth lens element sequentially along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. An optical axis region of the object-side surface of the third lens element is concave. An optical axis region of the image-side surface of the fourth lens element is concave. An optical axis region of the object-side surface of the fifth lens element is concave. The seventh lens element has positive refracting power. Lens elements of the optical imaging lens are only the eight lens elements, and the optical imaging lens satisfies a condition of $D52t81/D41t52 \geq 1.950$, where $D52t81$ is a distance from the image-side surface of the fifth lens element to the object-side surface of the eighth lens element on the optical axis, and $D41t52$ is a distance from the object-side surface of the fourth lens element to the image-side surface of the fifth lens element on the optical axis.

An embodiment of the disclosure provides an optical imaging lens, which includes a first lens element, a second lens element, a third lens element, a fourth lens element, a fifth lens element, a sixth lens element, a seventh lens element, and an eighth lens element sequentially along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. A periphery region of the object-side surface of the third lens element is concave. An optical axis region of the image-side surface of the fourth lens element is concave. An optical axis region of the object-side surface of the fifth lens element is concave. The seventh lens element has positive refracting power. Lens elements of the optical imaging lens are only the eight lens elements, and the optical imaging lens satisfies a condition of $D52t81/D41t52 \geq 3.000$, where $D52t81$ is a distance from the image-side surface of the fifth lens element to the object-side surface of the eighth lens element on the optical axis, and $D41t52$ is a distance from the object-side surface of the fourth lens element to the image-side surface of the fifth lens element on the optical axis.

An embodiment of the disclosure provides an optical imaging lens, which includes a first lens element, a second lens element, a third lens element, a fourth lens element, a fifth lens element, a sixth lens element, a seventh lens element, and an eighth lens element sequentially along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. A periphery region of the image-side surface of the third lens element is convex. An optical axis region of the image-side surface of the fourth lens element is concave. An optical axis region of the object-side surface of the fifth lens element is concave. The seventh lens element has positive refracting power. An optical axis region of the object-side surface of the eighth lens element is concave. Lens elements of the optical imaging lens are only the eight lens elements, and the optical imaging lens satisfies a condition of $D52t81/D41t52 \geq 3.000$, where $D52t81$ is a distance from the image-side surface of the fifth lens element to the object-side surface of the eighth lens element on the optical axis, and $D41t52$ is a distance from the object-side surface of the fourth lens element to the image-side surface of the fifth lens element on the optical axis.

Based on the above, in the optical imaging lens according to the embodiments of the disclosure, by satisfying the concave-convex curved surface arrangement designs of the lens elements, the conditions of the refracting powers, and the designs of the conditional expressions, the optical imaging lens can simultaneously provide a small F-number, a relatively large image height, and conform to the imaging quality.

BRIEF DESCRIPTION OF THE DRAWINGS

FIGS. 7A to 7D are diagrams of longitudinal spherical aberration and various aberrations of the optical imaging lens according to Embodiment 1.

FIG. 8 shows detailed optical data of the optical imaging lens according to Embodiment 1 of the disclosure.

FIG. 9 shows aspheric surface parameters of the optical imaging lens according to Embodiment 1 of the disclosure.

FIGS. 11A to 11D are diagrams of longitudinal spherical aberration and various aberrations of the optical imaging lens according to Embodiment 2.

FIG. 12 shows detailed optical data of the optical imaging lens according to Embodiment 2 of the disclosure.

FIG. 13 shows aspheric surface parameters of the optical imaging lens according to Embodiment 2 of the disclosure.

FIGS. 15A to 15D are diagrams of longitudinal spherical aberration and various aberrations of the optical imaging lens according to Embodiment 3.

FIG. 16 shows detailed optical data of the optical imaging lens according to Embodiment 3 of the disclosure.

FIG. 17 shows aspheric surface parameters of the optical imaging lens according to Embodiment 3 of the disclosure.

FIGS. 19A to 19D are diagrams of longitudinal spherical aberration and various aberrations of the optical imaging lens according to Embodiment 4.

FIG. 20 shows detailed optical data of the optical imaging lens according to Embodiment 4 of the disclosure.

FIG. 21 shows aspheric surface parameters of the optical imaging lens according to Embodiment 4 of the disclosure.

FIGS. 23A to 23D are diagrams of longitudinal spherical aberration and various aberrations of the optical imaging lens according to Embodiment 5.

FIG. 24 shows detailed optical data of the optical imaging lens according to Embodiment 5 of the disclosure.

FIG. 25 shows aspheric surface parameters of the optical imaging lens according to Embodiment 5 of the disclosure.

FIGS. 27A to 27D are diagrams of longitudinal spherical aberration and various aberrations of the optical imaging lens according to Embodiment 6.

FIG. 28 shows detailed optical data of the optical imaging lens according to Embodiment 6 of the disclosure.

FIG. 29 shows aspheric surface parameters of the optical imaging lens according to Embodiment 6 of the disclosure.

FIGS. 31A to 31D are diagrams of longitudinal spherical aberration and various aberrations of the optical imaging lens according to Embodiment 7.

FIG. 32 shows detailed optical data of the optical imaging lens according to Embodiment 7 of the disclosure.

FIG. 33 shows aspheric surface parameters of the optical imaging lens according to Embodiment 7 of the disclosure.

FIG. 36 shows detailed optical data of the optical imaging lens according to Embodiment 8 of the disclosure.

FIG. 37 shows aspheric surface parameters of the optical imaging lens according to Embodiment 8 of the disclosure.

FIGS. 39A to 39D are diagrams of longitudinal spherical aberration and various aberrations of the optical imaging lens according to Embodiment 9.

FIG. 40 shows detailed optical data of the optical imaging lens according to Embodiment 9 of the disclosure.

FIG. 41 shows aspheric surface parameters of the optical imaging lens according to Embodiment 9 of the disclosure.

FIG. 44 shows detailed optical data of the optical imaging lens according to Embodiment 10 of the disclosure.

FIG. 45 shows aspheric surface parameters of the optical imaging lens according to Embodiment 10 of the disclosure.

FIGS. 46 to 47 shows values of important parameters and relational expressions thereof of the optical imaging lenses according to Embodiments 1 to 10 of the disclosure.

DETAILED DESCRIPTION OF DISCLOSED EMBODIMENTS

The terms "optical axis region", "periphery region", "concave", and "convex" used in this specification and claims should be interpreted based on the definition listed in the specification by the principle of lexicographer.

Figure 1:
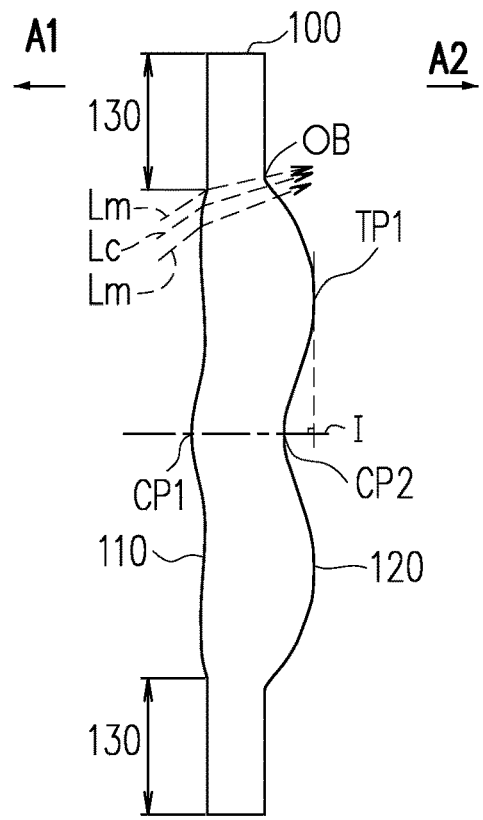
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
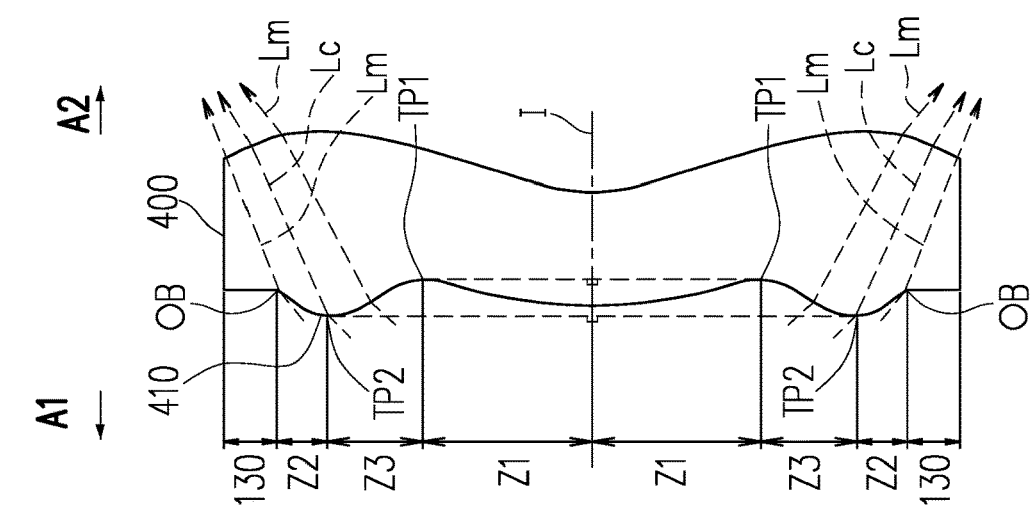
FIG. 4 is a schematic diagram illustrating a surface shape structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
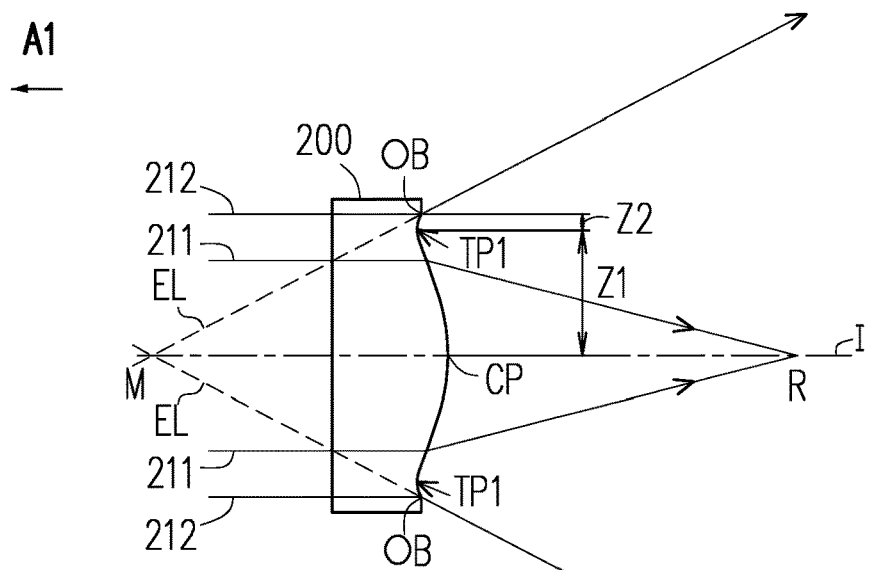
FIG. 2 is a schematic diagram illustrating a surface shape concave-convex structure of a lens element and a focal point of rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
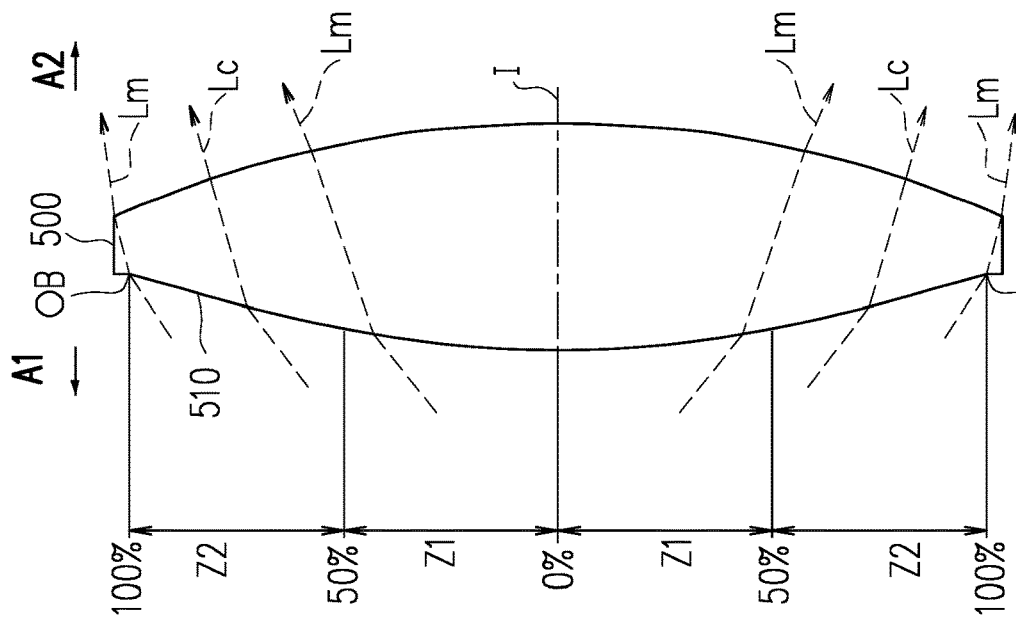
FIG. 5 is a schematic diagram illustrating a surface shape structure of a lens element according to Example 3.
Figure 3:
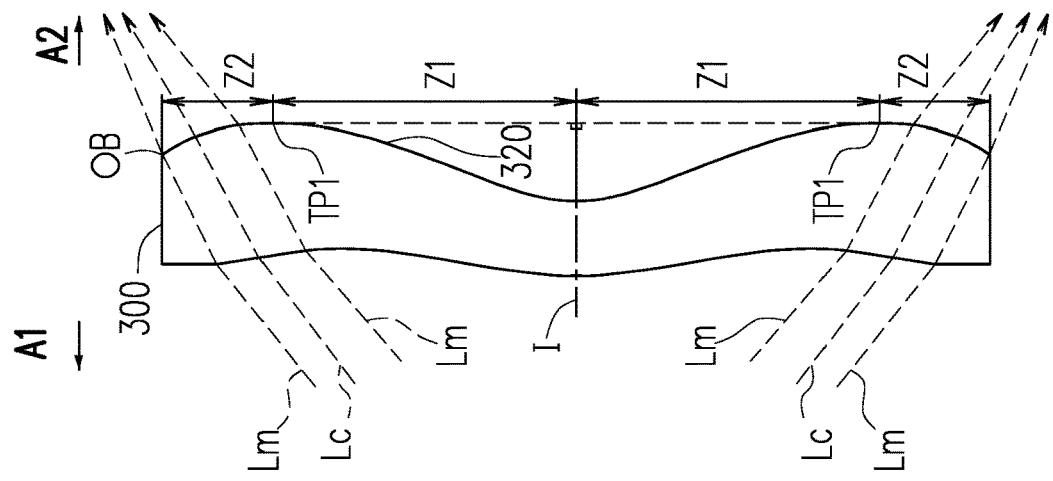
FIG. 3 is a schematic diagram illustrating a surface shape structure of a lens element according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
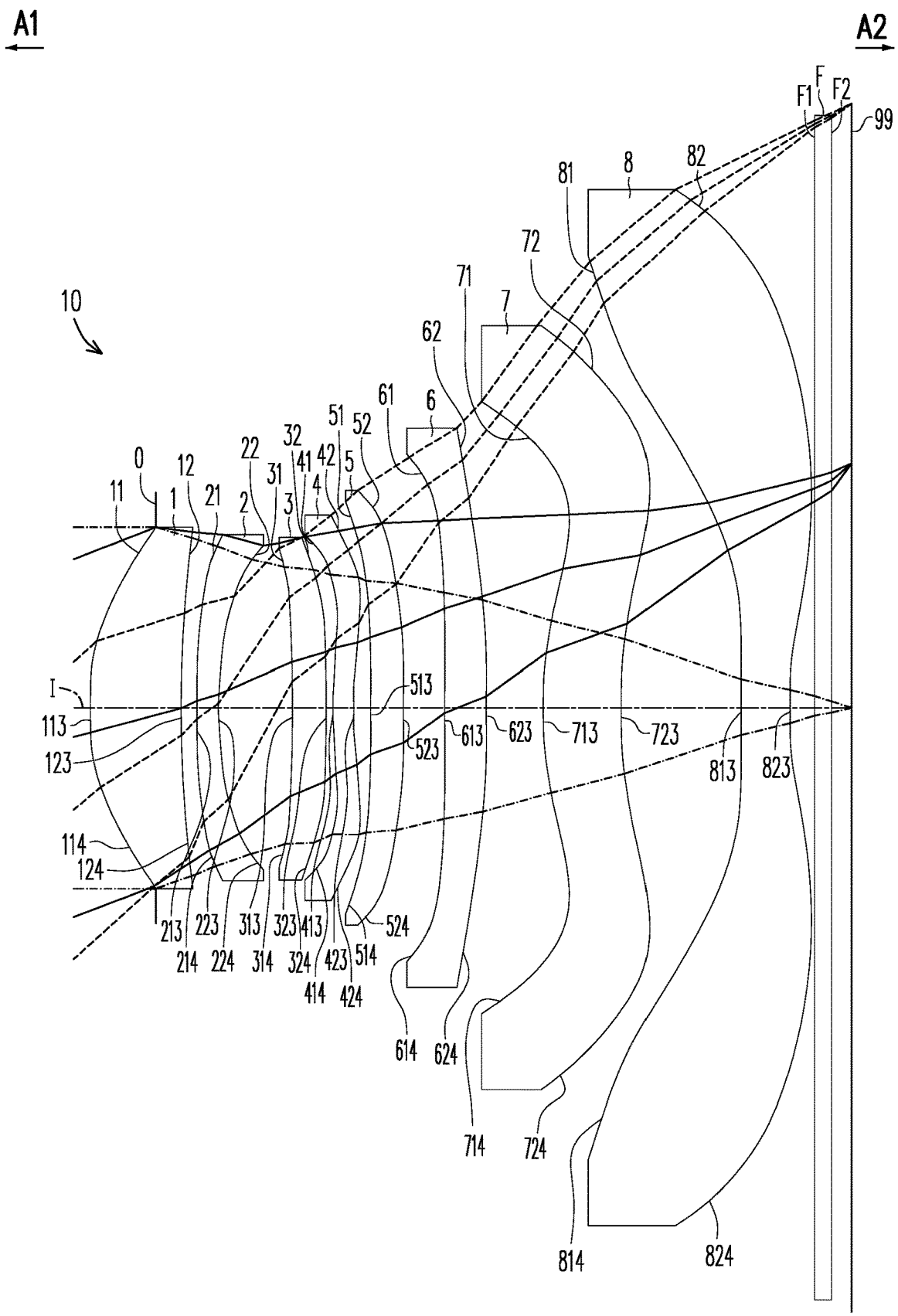
FIG. 6 is a schematic diagram of an optical imaging lens according to Embodiment 1 of the disclosure.

FIG. 6 is a schematic diagram of an optical imaging lens according to Embodiment 1 of the disclosure, and FIGS. 7A to 7D are diagrams of longitudinal spherical aberration and various aberrations of the optical imaging lens according to Embodiment 1. Please refer to FIG. 6 first. An optical imaging lens 10 of Embodiment 1 of the disclosure includes a first lens element 1, a second lens element 2, a third lens element 3, a fourth lens element 4, a fifth lens element 5, a sixth lens element 6, a seventh lens element 7, an eighth lens element 8, and a filter F sequentially along an optical axis I of the optical imaging lens 10 from an object side A1 to an image side A2, wherein an aperture 0 is disposed on an object-side surface 11 of the first lens element 1. After rays emitted by an object to be captured enter the optical imaging lens 10 and pass through the aperture 0, the first lens element 1, the second lens element 2, the third lens element 3, the fourth lens element 4, the fifth lens element 5, the sixth lens element 6, the seventh lens element 7, the eighth lens element 8, and the filter F, a clear image is formed on an image plane 99. The filter F is disposed between an image-side surface 82 of the eighth lens element 8 and the image plane 99. It is supplemented that the object side A1 is a side facing the object to be captured, and the image side A2 is a side facing the image plane 99. In an embodiment, the filter F may be an infrared (IR) cut filter, but the disclosure is not limited thereto.

In the embodiment, the first lens element 1, each of the second lens element 2, the third lens element 3, the fourth lens element 4, the fifth lens element 5, the sixth lens element 6, the seventh lens element 7, the eighth lens element 8, and the filter F of the optical imaging lens 10 has an object-side surface 11, 21, 31, 41, 51, 61, 71, 81, F1 facing the object side A1 and allowing imaging rays to pass through and an image-side surface 12, 22, 32, 42, 52, 62, 72, 82, F2 facing the image side A2 and allowing the imaging rays to pass through.

The first lens element 1 has positive refracting power. The material of the first lens element 1 is plastic, but the disclosure is not limited thereto. An optical axis region 113 of the object-side surface 11 of the first lens element 1 is convex, and a periphery region 114 thereof is convex. An optical axis region 123 of the image-side surface 12 of the first lens element 1 is concave, and a periphery region 124 thereof is concave. In the embodiment, the object-side surface 11 and the image-side surface 12 of the first lens element 1 are both aspheric surfaces, but the disclosure is not limited thereto.

The second lens element 2 has negative refracting power. The material of the second lens element 2 is plastic, but the disclosure is not limited thereto. An optical axis region 213 of the object-side surface 21 of the second lens element 2 is convex, and a periphery region 214 thereof is convex. An optical axis region 223 of the image-side surface 22 of the second lens element 2 is concave, and a periphery region 224 thereof is concave. In the embodiment, the object-side surface 21 and the image-side surface 22 of the second lens element 2 are both aspheric surfaces, but the disclosure is not limited thereto.

The third lens element 3 has positive refracting power. The material of the third lens element 3 is plastic, but the disclosure is not limited thereto. An optical axis region 313 of the object-side surface 31 of the third lens element 3 is concave, and a periphery region 314 thereof is concave. An optical axis region 323 of the image-side surface 32 of the third lens element 3 is convex, and a periphery region 324 thereof is convex. In the embodiment, the object-side surface 31 and the image-side surface 32 of the third lens element 3 are both aspheric surfaces, but the disclosure is not limited thereto.

The fourth lens element 4 has negative refracting power. The material of the fourth lens element 4 is plastic, but the disclosure is not limited thereto. An optical axis region 413 of the object-side surface 41 of the fourth lens element 4 is convex, and a periphery region 414 thereof is concave. An optical axis region 423 of the image-side surface 42 of the fourth lens element 4 is concave, and a periphery region 424 thereof is convex. In the embodiment, the object-side surface 41 and the image-side surface 42 of the fourth lens element 4 are both aspheric surfaces, but the disclosure is not limited thereto.

The fifth lens element 5 has positive refracting power. The material of the fifth lens element 5 is plastic, but the disclosure is not limited thereto. An optical axis region 513 of the object-side surface 51 of the fifth lens element 5 is concave, and a periphery region 514 thereof is concave. An optical axis region 523 of the image-side surface 52 of the fifth lens element 5 is convex, and a periphery region 524 thereof is convex. In the embodiment, the object-side surface 51 and the image-side surface 52 of the fifth lens element 5 are both aspheric surfaces, but the disclosure is not limited thereto.

The sixth lens element 6 has positive refracting power. The material of the sixth lens element 6 is plastic, but the disclosure is not limited thereto. An optical axis region 613 of the object-side surface 61 of the sixth lens element 6 is concave, and a periphery region 614 thereof is concave. An optical axis region 623 of the image-side surface 62 of the sixth lens element 6 is convex, and a periphery region 624 thereof is convex. In the embodiment, the object-side surface 61 and the image-side surface 62 of the sixth lens element 6 are both aspheric surfaces, but the disclosure is not limited thereto.

The seventh lens element 7 has positive refracting power. The material of the seventh lens element 7 is plastic, but the disclosure is not limited thereto. An optical axis region 713 of the object-side surface 71 of the seventh lens element 7 is convex, and a periphery region 714 thereof is concave. An optical axis region 723 of the image-side surface 72 of the seventh lens element 7 is concave, and a periphery region 724 thereof is convex. In the embodiment, the object-side surface 71 and the image-side surface 72 of the seventh lens element 7 are both aspheric surfaces, but the disclosure is not limited thereto.

The eighth lens element 8 has negative refracting power. The material of the eighth lens element 8 is plastic, but the disclosure is not limited thereto. An optical axis region 813 of the object-side surface 81 of the eighth lens element 8 is concave, and a periphery region 814 thereof is concave. An optical axis region 823 of the image-side surface 82 of the eighth lens element 8 is concave, and a periphery region 824 thereof is convex. In the embodiment, the object-side surface 81 and the image-side surface 82 of the eighth lens element 8 are both aspheric surfaces, but the disclosure is not limited thereto.

In the embodiment, lens elements of the optical imaging lens 10 are only the eight lens elements.

Other detailed optical data of Embodiment 1 is shown in FIG. 8, and the effective focal length (EFL) of the optical imaging lens 10 of Embodiment 1 is 7.269 millimeters (mm), the half field of view (HFOV) is 41.304 degrees, the F-number (Fno) is 1.700, the system length is 9.096 mm, and the image height (ImgH) is 7.200 mm, wherein the system length refers to a distance from the object-side surface 11 of the first lens element 1 to the image plane 99 on the optical axis I.

In addition, in the embodiment, a total of sixteen surfaces of the object-side surfaces 11, 21, 31, 41, 51, 61, 71, and 81 and the image-side surfaces 12, 22, 32, 42, 52, 62, 72, and 82 of the first lens element 1, the second lens element 2, the third lens element 3, the fourth lens element 4, the fifth lens element 5, the sixth lens element 6, the seventh lens element 7, and the eighth lens element 8 are all aspheric surfaces, wherein the object-side surfaces 11, 21, 31, 41, 51, 61, 71, and 81 and the image-side surfaces 12, 22, 32, 42, 52, 62, 72, and 82 are general even aspheric surfaces. The aspheric surfaces are defined according to the following equation:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

where
R is a radius of curvature of a lens element surface near the optical axis I;
Z is a depth of an aspheric surface (a vertical distance from a point on the aspheric surface with a distance Y from the optical axis I to a tangent to a vertex on the optical axis I of the aspheric surface);
Y is a distance from a point on an aspheric surface curve to the optical axis I;
K is a conic constant; and
$a_i$ is an i-th order aspheric surface coefficient.

Various aspheric surface coefficients in Equation (1) from the object-side surface 11 of the first lens element 1 to the image-side surface 82 of the eighth lens element 8 are shown in FIG. 9. A field number 11 in FIG. 9 indicates the aspheric surface coefficient of the object-side surface 11 of the first lens element 1, and other fields are deduced accordingly. In the embodiment and the following embodiments, a 2-nd order aspheric surface coefficient $a_2$ is all 0.

In addition, relationships between important parameters in the optical imaging lens 10 of Embodiment 1 are shown in FIG. 46.

where
T1 is a thickness of the first lens element 1 on the optical axis I;
T2 is a thickness of the second lens element 2 on the optical axis I;
T3 is a thickness of the third lens element 3 on the optical axis I;
T4 is a thickness of the fourth lens element 4 on the optical axis I;
T5 is a thickness of the fifth lens element 5 on the optical axis I;
T6 is a thickness of the sixth lens element 6 on the optical axis I;
T7 is a thickness of the seventh lens element 7 on the optical axis I;
T8 is a thickness of the eighth lens element 8 on the optical axis I;
TF is a thickness of the filter F on the optical axis I;
G12 is an air gap between the first lens element 1 and the second lens element 2 on the optical axis I and is also a distance from the image-side surface 12 of the first lens element 1 to the object-side surface 21 of the second lens element 2 on the optical axis I;
G23 is an air gap between the second lens element 2 and the third lens element 3 on the optical axis I and is also a distance from the image-side surface 22 of the second lens element 2 to the object-side surface 31 of the third lens element 3 on the optical axis I;
G34 is an air gap between the third lens element 3 and the fourth lens element 4 on the optical axis I and is also a distance from the image-side surface 32 of the third lens element 3 to the object-side surface 41 of the fourth lens element 4 on the optical axis I;
G45 is an air gap between the fourth lens element 4 and the fifth lens element 5 on the optical axis I and is also a distance from the image-side surface 42 of the fourth lens element 4 to the object-side surface 51 of the fifth lens element 5 on the optical axis I;
G56 is an air gap between the fifth lens element 5 and the sixth lens element 6 on the optical axis I and is also a distance from the image-side surface 52 of the fifth lens element 5 to the object-side surface 61 of the sixth lens element 6 on the optical axis I;
G67 is an air gap between the sixth lens element 6 and the seventh lens element 7 on the optical axis I and is also a distance from the image-side surface 62 of the sixth lens element 6 to the object-side surface 71 of the seventh lens element 7 on the optical axis I;
G78 is an air gap between the seventh lens element 7 and the eighth lens element 8 on the optical axis I and is also a distance from the image-side surface 72 of the seventh lens element 7 to the object-side surface 81 of the eighth lens element 8 on the optical axis I;
G8F is an air gap between the eighth lens element 8 and the filter F on the optical axis I and is also a distance from the image-side surface 82 of the eighth lens element 8 to the object-side surface F1 of the filter F on the optical axis I;

GFP is an air gap between the filter F and the image plane 99 on the optical axis I and is also a distance from the image-side surface F2 of the filter F to the image plane 99 on the optical axis I;

AAG is a sum of the seven air gaps between the first lens element 1 and the eighth lens element 8 on the optical axis I, that is, the sum of the air gaps G12, G23, G34, G45, G56, G67, and G78;

ALT is a sum of the thicknesses of the eight lens elements from the first lens element 1 to the eighth lens element 8 on the optical axis I, that is, the sum of the thicknesses T1, T2, T3, T4, T5, T6, T7, and T8;

Tmax is a maximum value of the thicknesses of the eight lens elements from the first lens element 1 to the eighth lens element 8 on the optical axis I, that is, the maximum value among T1, T2, T3, T4, T5, T6, T7, and T8;

Tmin is a minimum value of the thicknesses of the eight lens elements from the first lens element 1 to the eighth lens element 8 on the optical axis I, that is, the minimum value among T1, T2, T3, T4, T5, T6, T7, and T8;

Tavg is an average value of the thicknesses of the eight lens elements from the first lens element 1 to the eighth lens element 8 on the optical axis I, that is, the average value of T1, T2, T3, T4, T5, T6, T7, and T8;

D41t52 is a distance from the object-side surface 41 of the fourth lens element 4 to the image-side surface 52 of the fifth lens element 5 on the optical axis I, that is, the sum of T4, G45, and T5;

D52t81 is a distance from the image-side surface 52 of the fifth lens element 5 to the object-side surface 81 of the eighth lens element 8 on the optical axis I, that is, the sum of G56, T6, G67, T7, and G78;

TL is a distance from the object-side surface 11 of the first lens element 1 to the image-side surface 82 of the eighth lens element 8 on the optical axis I;

TTL is a distance from the object-side surface 11 of the first lens element 1 to the image plane 99 on the optical axis I;

BFL is a distance from the image-side surface 82 of the eighth lens element 8 to the image plane 99 on the optical axis I, that is, the sum of G8F, TF, and GFP;

EFL is an effective focal length of the optical imaging lens 10;

HFOV is a half field of view of the optical imaging lens 10;

ImgH is an image height of the optical imaging lens 10; and

Fno is an F-number of the optical imaging lens 10.

Also, it is further defined that:

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
n8 is a refractive index of the eighth lens element 8;
V1 is an Abbe number of the first lens element 1, and the Abbe number may also be referred to as the dispersion coefficient;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7; and
V8 is an Abbe number of the eighth lens element 8.

Referring to FIGS. 7A to 7D, the diagram of FIG. 7A illustrates the longitudinal spherical aberration according to Embodiment 1, the diagrams of FIGS. 7B and 7C respectively illustrate the field curvature aberration in the sagittal direction and the field curvature aberration in the tangential direction on the image plane 99 when the wavelengths are 470 nm, 555 nm, and 650 nm according to Embodiment 1, the diagram of FIG. 7D illustrates the distortion aberration on the image plane 99 when the wavelengths are 470 nm, 555 nm, and 650 nm according to Embodiment 1. As shown in the longitudinal spherical aberration of FIG. 7A according to Embodiment 1, the curves formed by each wavelength are very close to the middle, which illustrates that the off-axis rays at different heights of each wavelength are concentrated near an imaging point. It can be seen from the skewness of the curves of each wavelength that the imaging point deviation of the off-axis rays at different heights is controlled within a range of ±0.025 mm. Therefore, Embodiment 1 does significantly improve the spherical aberration of the same wavelength. In addition, the distances between the three representative wavelengths are also considerably close, which indicates that the imaging positions of rays with different wavelengths are already considerably concentrated, so the chromatic aberration is also significantly improved.

In the two field curvature aberration diagrams shown in FIG. 7B and FIG. 7C, the focal length variation of the three representative wavelengths in the entire field of view falls within ±0.09 mm, which illustrates that the optical system of Embodiment 1 can effectively eliminate aberrations. The distortion aberration diagram in FIG. 7D shows that the distortion aberration of Embodiment 1 is maintained within a range of ±14%, which illustrates that the distortion aberration of Embodiment 1 conforms to imaging quality requirements of the optical system. Accordingly, it is illustrated that compared with existing optical lenses, Embodiment 1 can still provide good imaging quality under the condition that the system length is shortened to 9.096 mm, so Embodiment 1 can simultaneously reduce the F-number, increase the image height, and conform to the imaging quality under the condition of maintaining good optical performance.

Figure 10:
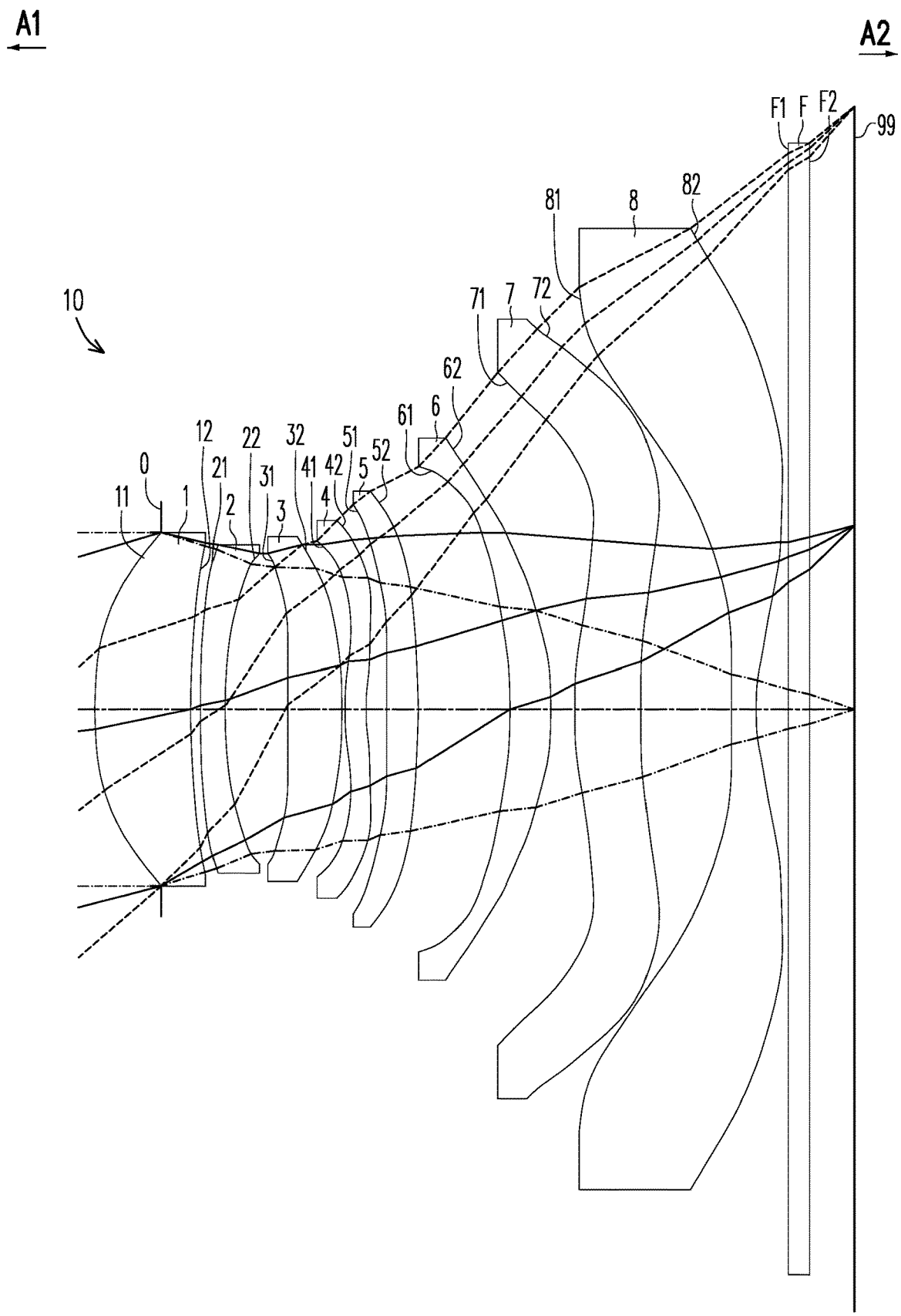
FIG. 10 is a schematic diagram of an optical imaging lens according to Embodiment 2 of the disclosure.

FIG. 10 is a schematic diagram of an optical imaging lens according to Embodiment 2 of the disclosure, and FIGS. 11A to 11D are longitudinal spherical aberration and various aberration diagrams of the optical imaging lens according to Embodiment 2. Please refer to FIG. 10 first. The optical imaging lens 10 of Embodiment 2 of the disclosure is roughly similar to Embodiment 1, and the difference between the two is that optical data, aspheric surface coefficients, and parameters of the lens elements 1, 2, 3, 4, 5, 6, 7, and 8 are more or less different. It should be noted here that in order to clearly display the drawings, some labels of the optical axis regions and the periphery regions similar to Embodiment 1 are omitted in FIG. 10.

Detailed optical data of the optical imaging lens 10 of Embodiment 2 is shown in FIG. 12, and the effective focal length of the optical imaging lens 10 of Embodiment 2 is 7.189 mm, the half field of view (HFOV) is 41.510 degrees, the F-number (Fno) is 1.700, the system length is 9.102 mm, and the image height is 7.200 mm.

FIG. 13 shows various aspheric surface coefficients in Equation (1) from the object-side surface 11 of the first lens element 1 to the image-side surface 82 of the eighth lens element 8 of Embodiment 2.

In addition, relationships between important parameters in the optical imaging lens 10 of Embodiment 2 are shown in FIG. 46.

The longitudinal spherical aberration of Embodiment 2 is shown in FIG. 11A, and the imaging point deviation of off-axis rays at different heights is controlled within a range of ±0.03 mm. In the two field curvature aberration diagrams shown in FIG. 11B and FIG. 11C, the focal length variation of the three representative wavelengths in the entire field of view falls within 0.10 mm. The distortion aberration diagram of FIG. 11D shows that the distortion aberration of Embodiment 2 is maintained within a range of ±14%.

From the above description, it can be known that the half field of view of Embodiment 2 is greater than Embodiment 1, so compared with Embodiment 1, Embodiment 2 has a larger angular range for receiving an image.

Figure 14:
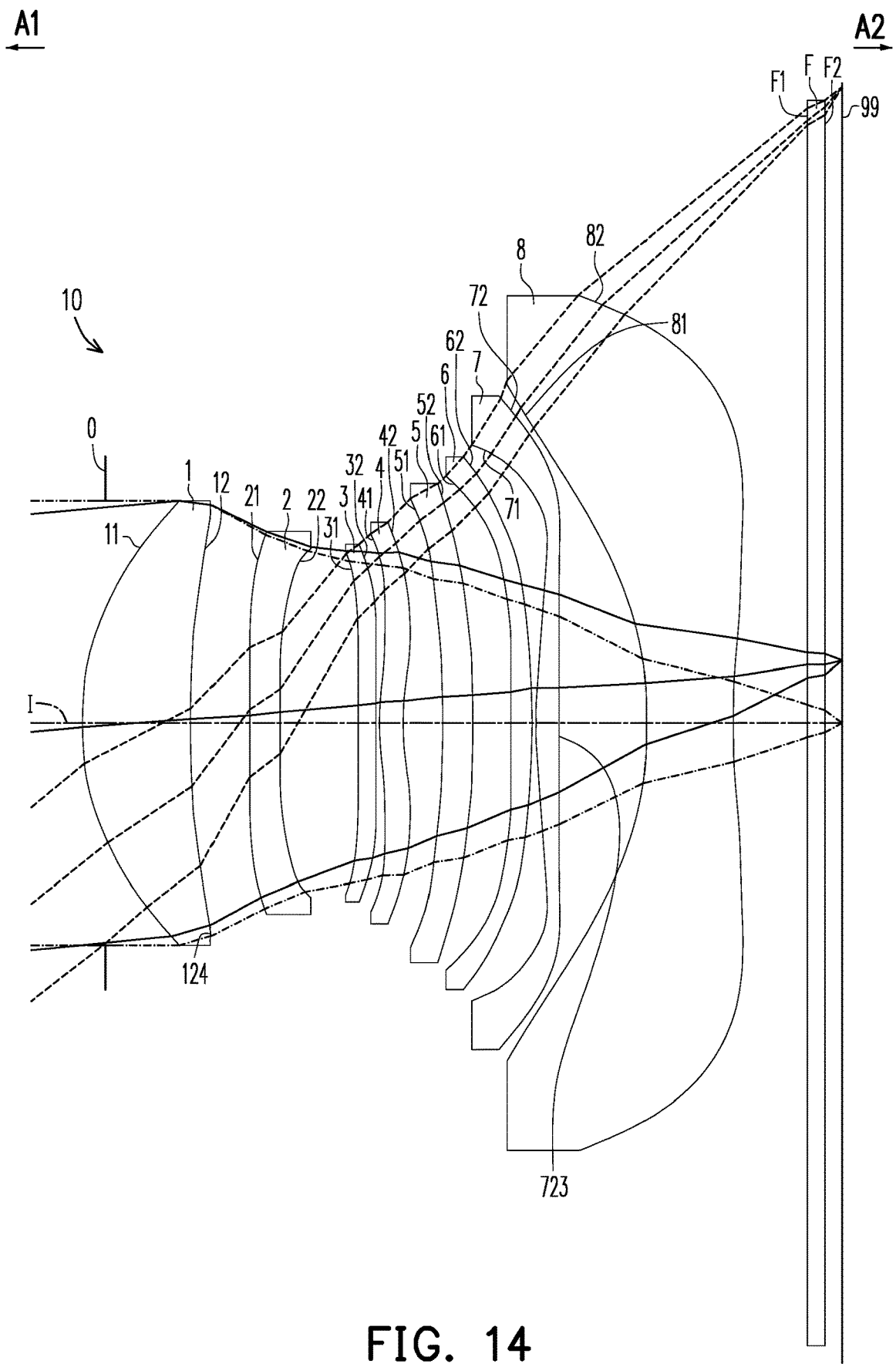
FIG. 14 is a schematic diagram of an optical imaging lens according to Embodiment 3 of the disclosure.

FIG. 14 is a schematic diagram of an optical imaging lens according to Embodiment 3 of the disclosure, and FIGS. 15A to 15D are longitudinal spherical aberration and various aberration diagrams of the optical imaging lens according to Embodiment 3. Please refer to FIG. 14 first. The optical imaging lens 10 of Embodiment 3 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, in the embodiment, the periphery region 124 of the image-side surface 12 of the first lens element 1 is convex. The optical axis region 723 of the image-side surface 72 of the seventh lens element 7 is convex. It should be noted here that in order to clearly display the drawings, some labels of the optical axis regions and the periphery regions similar to Embodiment 1 are omitted in FIG. 14.

Detailed optical data of the optical imaging lens 10 of Embodiment 3 is shown in FIG. 16, and the effective focal length of the optical imaging lens 10 of Embodiment 3 is 8.720 mm, the half field of view (HFOV) is 39.000 degrees, the F-number (Fno) is 1.750, the system length is 8.537 mm, and the image height is 7.060 mm.

Various aspheric surface coefficients in Equation (1) from the object-side surface 11 of the first lens element 1 to the image-side surface 82 of the eighth lens element 8 of Embodiment 3 are shown in FIG. 17.

In addition, relationships between important parameters in the optical imaging lens 10 of Embodiment 3 are shown in FIG. 46.

The longitudinal spherical aberration of Embodiment 3 is shown in FIG. 15A, and the imaging point deviation of off-axis rays at different heights is controlled within a range of ±0.8 mm. In the two field curvature aberration diagrams shown in FIG. 15B and FIG. 15C, the focal length variation of the three representative wavelengths in the entire field of view falls within ±1.0 mm. The distortion aberration diagram of FIG. 15D shows that the distortion aberration of Embodiment 3 is maintained within a range of ±14%.

It can be known from the above description that the system length TTL of Embodiment 3 is shorter than Embodiment 1, so compared with Embodiment 1, Embodiment 3 has a smaller lens volume.

Figure 18:
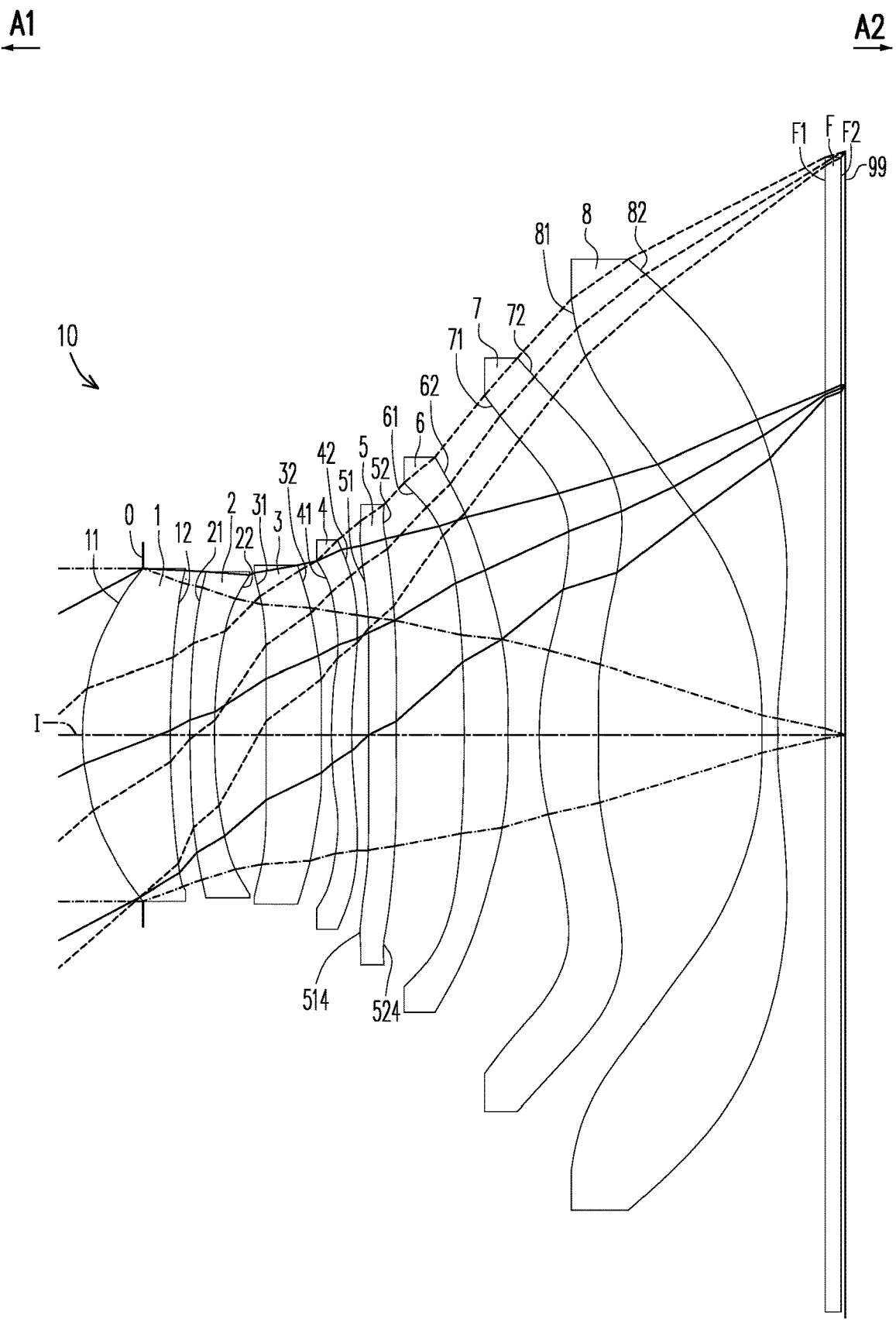
FIG. 18 is a schematic diagram of an optical imaging lens according to Embodiment 4 of the disclosure.

FIG. 18 is a schematic diagram of an optical imaging lens according to Embodiment 4 of the disclosure, and FIGS. 19A to 19D are diagrams of longitudinal spherical aberration and various aberrations of the optical imaging lens according to Embodiment 4. Please refer to FIG. 18 first. The optical imaging lens 10 of Embodiment 4 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, in the embodiment, the periphery region 514 of the object-side surface 51 of the fifth lens element 5 is convex, and the periphery region 524 of the image-side surface 52 is concave. It should be noted here that in order to clearly display the drawings, some labels of the optical axis regions and the periphery regions similar to Embodiment 1 are omitted in FIG. 18.

Detailed optical data of the optical imaging lens 10 of Embodiment 4 is shown in FIG. 20, and the effective focal length of the optical imaging lens 10 of Embodiment 4 is 7.715 mm, the half field of view (HFOV) is 41.581 degrees, the F-number (Fno) is 1.900, the system length is 9.464 mm, and the image height is 7.218 mm.

Various aspheric surface coefficients in Equation (1) from the object-side surface 11 of the first lens element 1 to the image-side surface 82 of the eighth lens element 8 of Embodiment 4 are shown in FIG. 21.

In addition, relationships between important parameters in the optical imaging lens 10 of Embodiment 4 are shown in FIG. 46.

The longitudinal spherical aberration of Embodiment 4 is shown in FIG. 19A, and the imaging point deviation of off-axis rays at different heights is controlled within a range of ±0.05 mm. In the two field curvature aberration diagrams shown in FIG. 19B and FIG. 19C, the focal length variation of the three representative wavelengths in the entire field of view falls within ±0.06 mm. The distortion aberration diagram of FIG. 19D shows that the distortion aberration of Embodiment 4 is maintained within a range of ±6%.

It can be known from the above description that the half field of view and the image height of Embodiment 4 are greater than Embodiment 1. Furthermore, the field curvature and the distortion aberration of Embodiment 4 are better than Embodiment 1.

Figure 22:
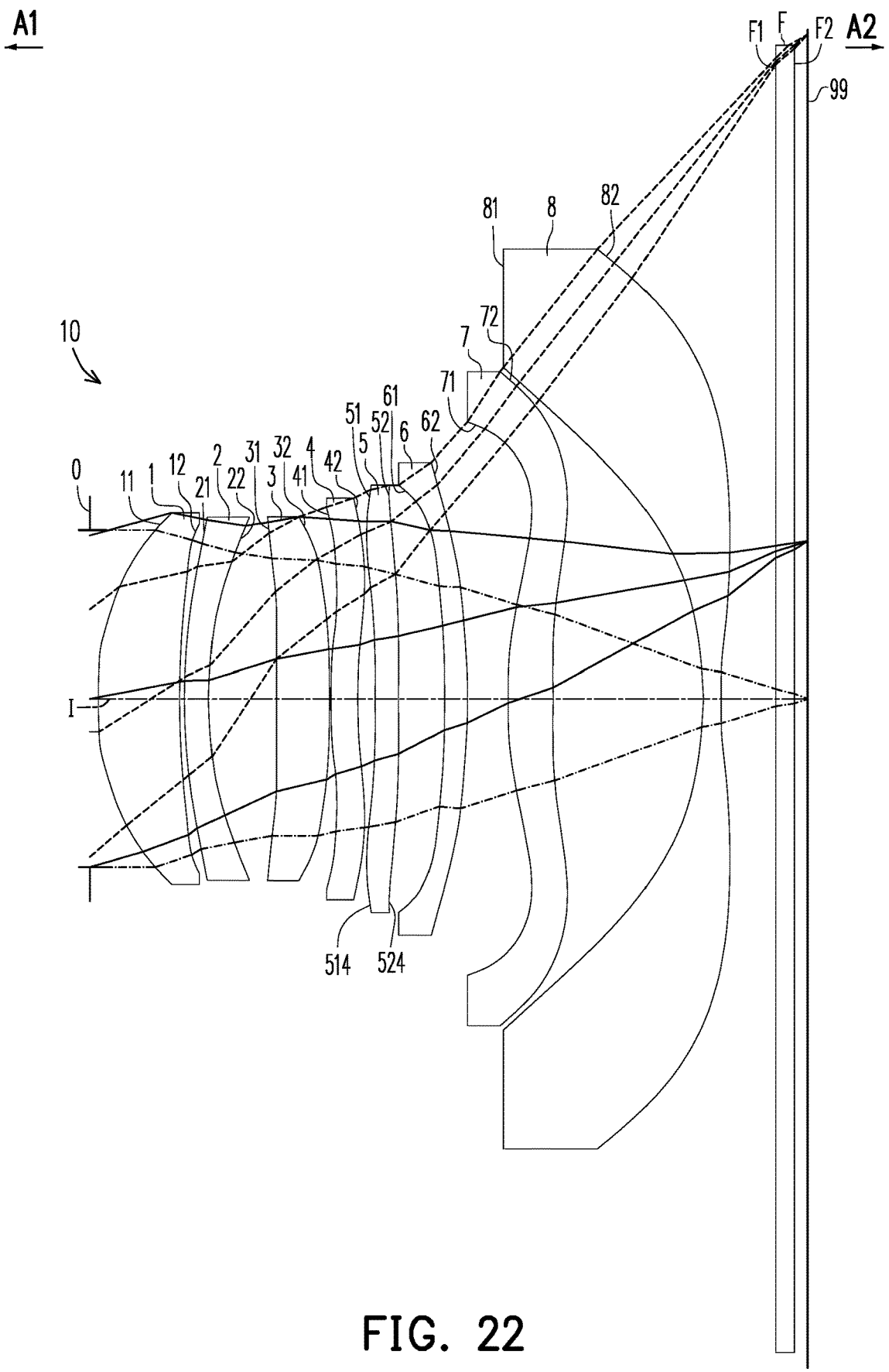
FIG. 22 is a schematic diagram of an optical imaging lens according to Embodiment 5 of the disclosure.

FIG. 22 is a schematic diagram of an optical imaging lens according to Embodiment 5 of the disclosure, and FIGS. 23A to 23D are longitudinal spherical aberration and various aberration diagrams of the optical imaging lens according to Embodiment 5. Please refer to FIG. 22 first. The optical imaging lens 10 of Embodiment 5 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, the periphery region 514 of the object-side surface 51 of the fifth lens element 5 is convex, and the periphery region 524 of the image-side surface 52 is concave. It should be noted here that in order to clearly display the drawings, some labels of the optical axis regions and the periphery regions similar to Embodiment 1 are omitted in FIG. 22.

Detailed optical data of the optical imaging lens 10 of Embodiment 5 is shown in FIG. 24, and the effective focal length of the optical imaging lens 10 of Embodiment 5 is 6.205 mm, the half field of view (HFOV) is 41.581 degrees, the F-number (Fno) is 1.700, the system length is 7.737 mm, and the image height is 7.223 mm.

Various aspheric surface coefficients in Equation (1) from the object-side surface 11 of the first lens element 1 to the image-side surface 82 of the eighth lens element 8 of Embodiment 5 are shown in FIG. 25.

In addition, relationships between the important parameters in the optical imaging lens 10 of Embodiment 5 are shown in FIG. 46.

The longitudinal spherical aberration of Embodiment 5 is shown in FIG. 23A, and the imaging point deviation of off-axis rays at different heights is controlled within a range of ±0.06 mm. In the two field curvature aberration diagrams shown in FIG. 23B and FIG. 23C, the focal length variation of the three representative wavelengths in the entire field of view falls within +0.12 mm. The distortion aberration diagram in FIG. 23D shows that the distortion aberration of Embodiment 5 is maintained within a range of ±35%.

It can be known from the above description that the system length TTL of Embodiment 5 is shorter than Embodiment 1. In addition, the half field of view and the image height of Embodiment 5 are greater than Embodiment 1.

Figure 26:
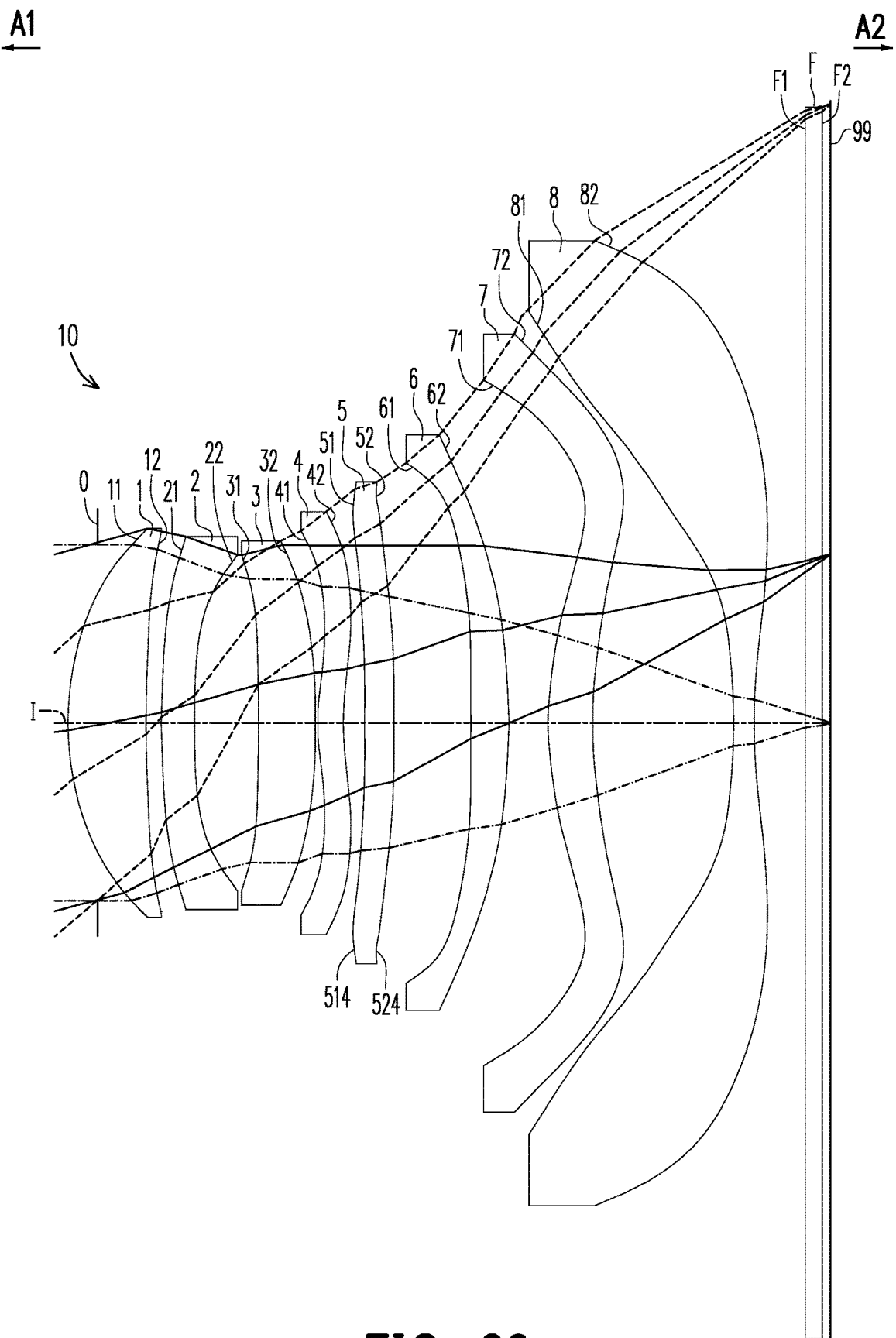
FIG. 26 is a schematic diagram of an optical imaging lens according to Embodiment 6 of the disclosure.

FIG. 26 is a schematic diagram of an optical imaging lens according to Embodiment 6 of the disclosure, and FIGS. 27A to 27D are longitudinal spherical aberration and various aberration diagrams of the optical imaging lens according to Embodiment 6. Please refer to FIG. 26 first. The optical imaging lens 10 of Embodiment 6 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, in the embodiment, the periphery region 514 of the object-side surface 51 of the fifth lens element 5 is convex, and the periphery region 524 of the image-side surface 52 is concave. It should be noted here that in order to clearly display the drawings, some labels of the optical axis regions and the periphery regions similar to Embodiment 1 are omitted in FIG. 26.

Detailed optical data of the optical imaging lens 10 of Embodiment 6 is shown in FIG. 28, and the effective focal length of the optical imaging lens 10 of Embodiment 6 is 7.111 mm, the half field of view (HFOV) is 41.581 degrees, the F-number (Fno) is 1.700, the system length is 8.933 mm, and the image height is 7.263 mm.

Various aspheric surface coefficients in Equation (1) from the object-side surface 11 of the first lens element 1 to the image-side surface 82 of the eighth lens element 8 of Embodiment 6 are shown in FIG. 29.

In addition, relationships between the important parameters in the optical imaging lens 10 of Embodiment 6 are shown in FIG. 47.

The longitudinal spherical aberration of Embodiment 6 is shown in FIG. 27A, and the imaging point deviation of off-axis rays at different heights is controlled within a range of ±0.045 mm. In the two field curvature aberration diagrams shown in FIG. 27B and FIG. 27C, the focal length variation of the three representative wavelengths in the entire field of view falls within ±0.07 mm. The distortion aberration diagram of FIG. 27D shows that the distortion aberration of Embodiment 6 is maintained within a range of ±16%.

It can be known from the above description that the system length TTL of Embodiment 6 is shorter than Embodiment 1. The half field of view and the image height of Embodiment 6 are greater than Embodiment 1. Furthermore, the field curvature aberration of Embodiment 6 is better than Embodiment 1.

Figure 30:
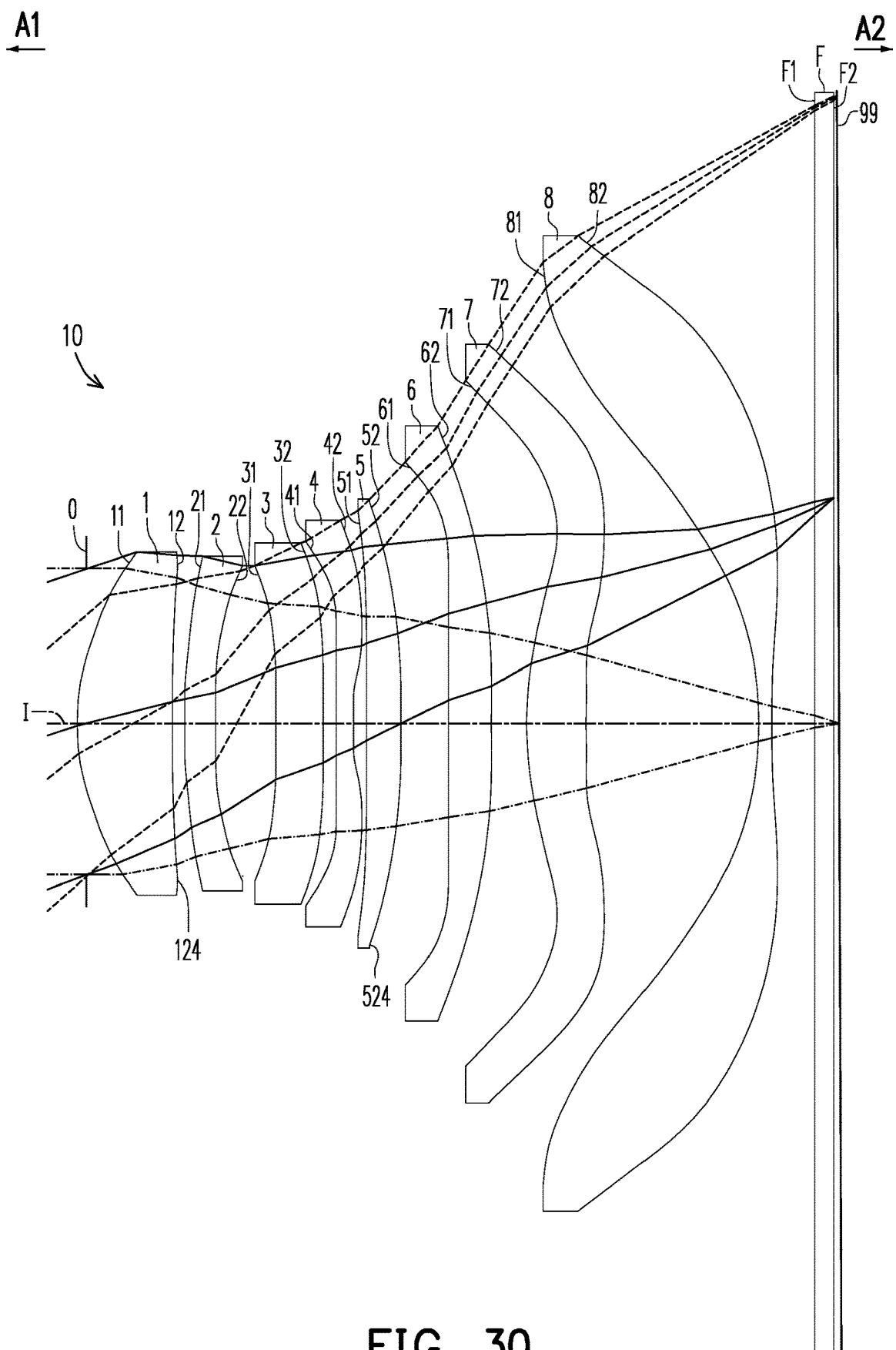
FIG. 30 is a schematic diagram of an optical imaging lens according to Embodiment 7 of the disclosure.

FIG. 30 is a schematic diagram of an optical imaging lens according to Embodiment 7 of the disclosure, and FIGS. 31A to 31D are longitudinal spherical aberration and various aberration diagrams of the optical imaging lens according to Embodiment 7. Please refer to FIG. 30 first. The optical imaging lens 10 of Embodiment 7 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, in the embodiment, the periphery region 124 of the image-side surface 12 of the first lens element 1 is convex. The third lens element 3 has negative refracting power. The periphery region 524 of the image-side surface 52 of the fifth lens element 5 is concave. It should be noted here that in order to clearly display the drawings, some labels of the optical axis regions and the periphery regions similar to Embodiment 1 are omitted in FIG. 30.

Detailed optical data of the optical imaging lens 10 of Embodiment 7 is shown in FIG. 32, and the effective focal length of the optical imaging lens 10 of Embodiment 7 is 6.602 mm, the half field of view (HFOV) is 41.000 degrees, the F-number (Fno) is 1.780, the system length is 9.123 mm, and the image height is 7.498 mm.

Various aspheric surface coefficients in Equation (1) from the object-side surface 11 of the first lens element 1 to the image-side surface 82 of the eighth lens element 8 in Embodiment 7 are shown in FIG. 33.

In addition, relationships between the important parameters in the optical imaging lens 10 of Embodiment 7 are shown in FIG. 47.

The longitudinal spherical aberration of Embodiment 7 is shown in FIG. 31A, and the imaging point deviation of off-axis rays at different heights is controlled within a range of ±0.35 mm. In the two field curvature aberration diagrams shown in FIG. 31B and FIG. 31C, the focal length variation of the three representative wavelengths in the entire field of view falls within ±0.6 mm. The distortion aberration diagram of FIG. 31D shows that the distortion aberration of Embodiment 7 is maintained within a range of ±25%.

From the above description, it can be known that the image height of Embodiment 7 is greater than Embodiment 1, so compared with Embodiment 1, Embodiment 7 has a larger image sensing range to receive the imaging rays to satisfy the high-resolution requirement.

Figure 34:
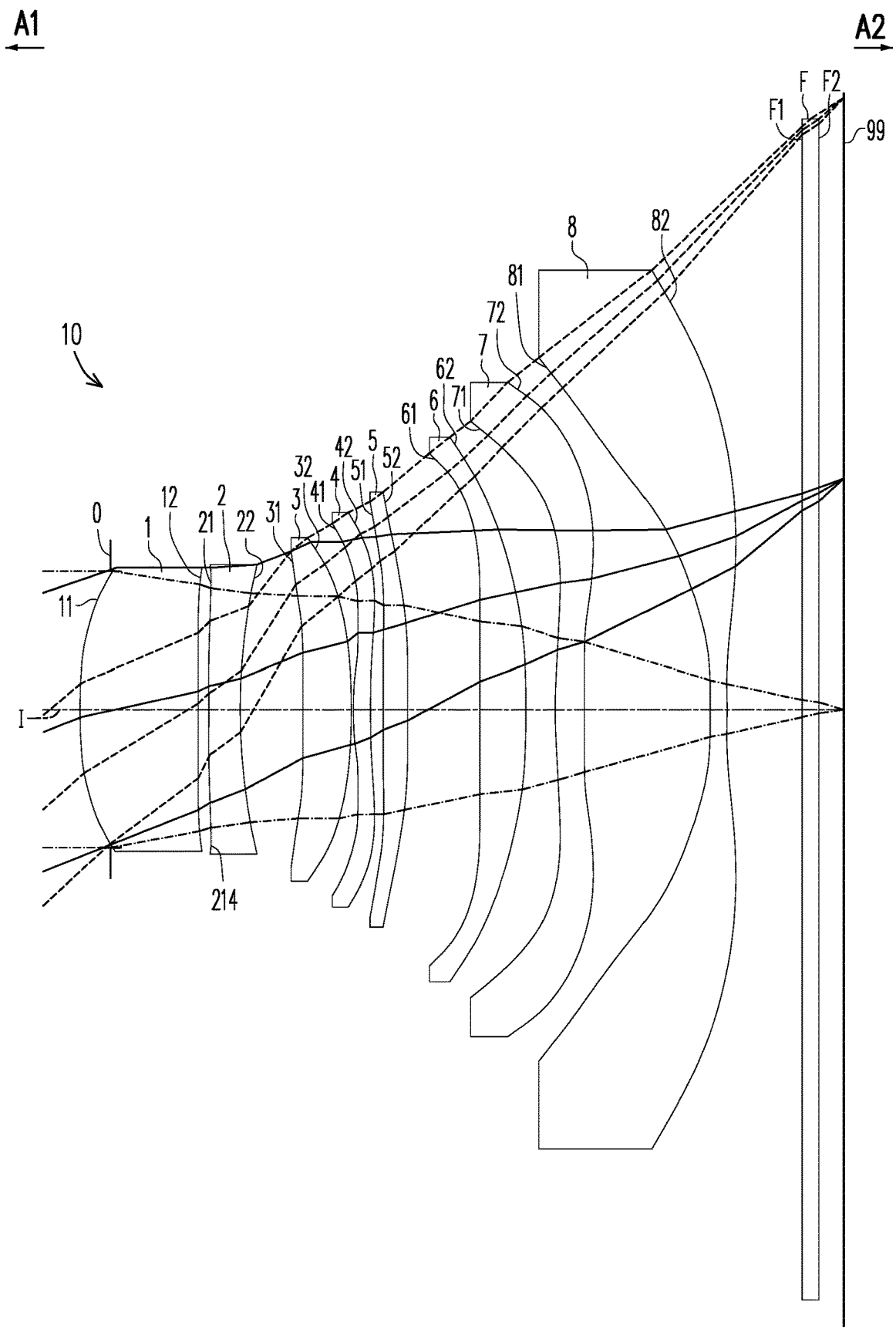
FIG. 34 is a schematic diagram of an optical imaging lens according to Embodiment 8 of the disclosure.

FIG. 34 is a schematic diagram of an optical imaging lens according to Embodiment 8 of the disclosure, and FIGS. 35A to 35D are longitudinal spherical aberration and various aberration diagrams of the optical imaging lens according to Embodiment 8. Please refer to FIG. 34 first. The optical imaging lens 10 of Embodiment 8 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, in the embodiment, the periphery region 214 of the object-side surface 21 of the second lens element 2 is concave. The fourth lens element 4 has positive refracting power. It should be noted here that in order to clearly display the drawings, some labels of the optical axis regions and the periphery regions similar to Embodiment 1 are omitted in FIG. 34.

Detailed optical data of the optical imaging lens 10 of Embodiment 8 is shown in FIG. 36, and the effective focal length of the optical imaging lens 10 of Embodiment 8 is 5.713 mm, the half field of view (HFOV) is 42.000 degrees, the F-number (Fno) is 1.700, the system length is 9.243 mm, and the image height is 7.393 mm.

Various aspheric surface coefficients in Equation (1) from the object-side surface 11 of the first lens element 1 to the image-side surface 82 of the eighth lens element 8 of Embodiment 8 are shown in FIG. 37.

In addition, relationships between the important parameters in the optical imaging lens 10 of Embodiment 8 are shown in FIG. 47.

Figures 35A, 35B, 35C, 35D:
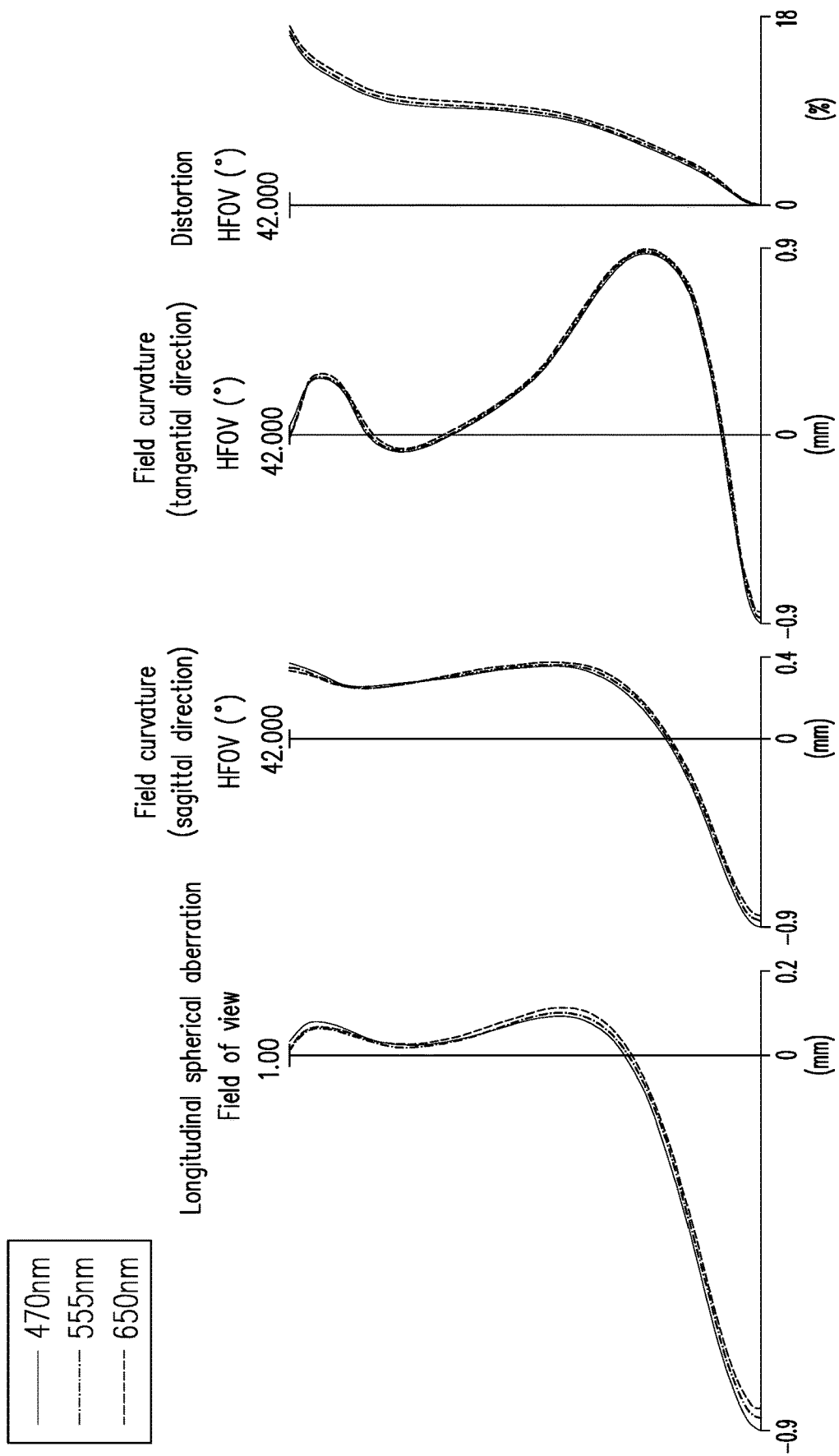
FIGS. 35A to 35D are diagrams of longitudinal spherical aberration and various aberrations of the optical imaging lens according to Embodiment 8.

The longitudinal spherical aberration of Embodiment 8 is shown in FIG. 35A, and the imaging point deviation of off-axis rays at different heights is controlled within a range of ±0.9 mm. In the two field curvature aberration diagrams shown in FIG. 35B and FIG. 35C, the focal length variation of the three representative wavelengths in the entire field of view falls within ±0.9 mm. The distortion aberration diagram of FIG. 35D shows that the distortion aberration of Embodiment 8 is maintained within a range of ±18%.

It can be known from the above description that the half field of view of Embodiment 8 is greater than Embodiment 1, and the image height of Embodiment 8 is greater than Embodiment 1.

Figure 38:
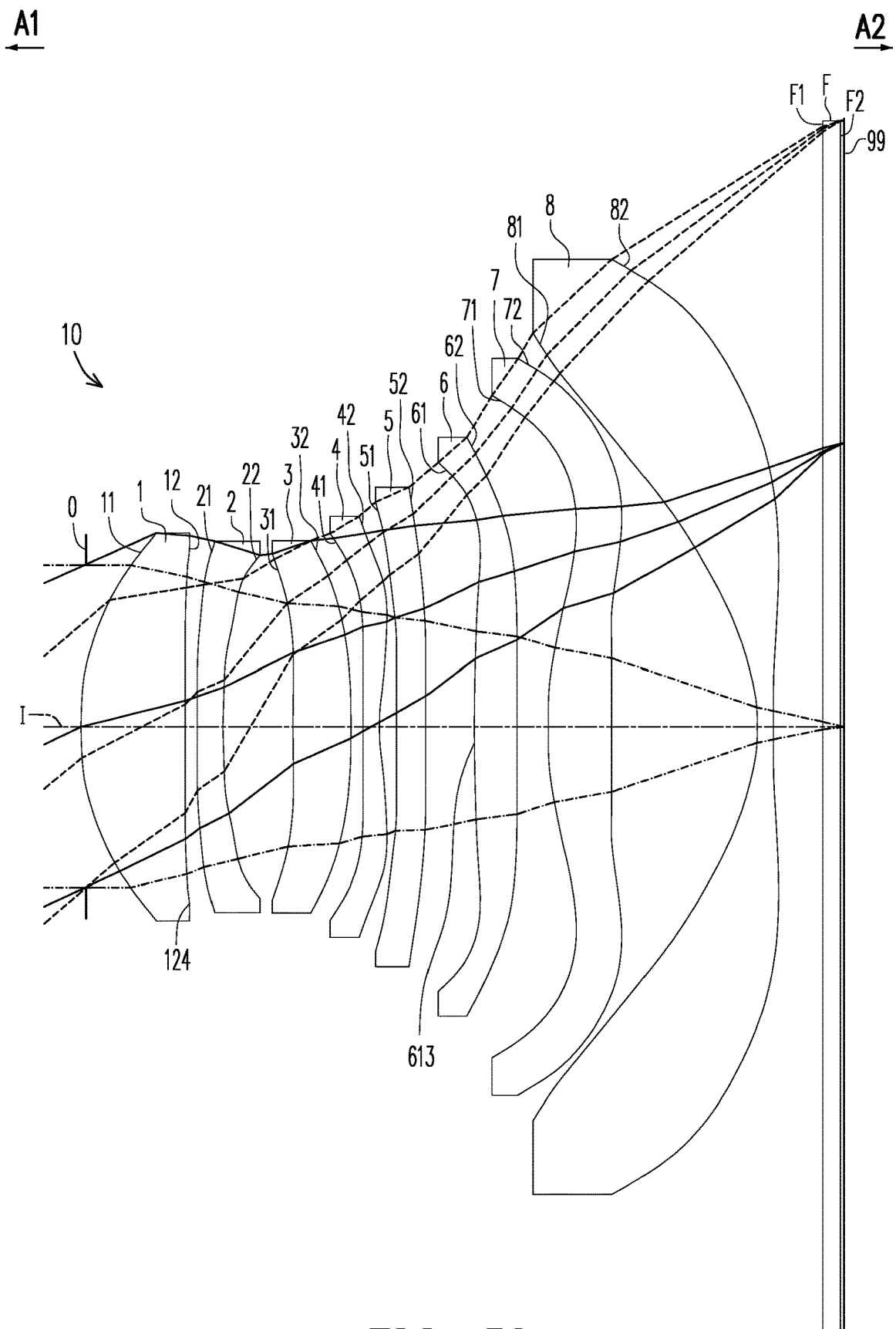
FIG. 38 is a schematic diagram of an optical imaging lens according to Embodiment 9 of the disclosure.

FIG. 38 is a schematic diagram of an optical imaging lens according to Embodiment 9 of the disclosure, and FIGS. 39A to 39D are longitudinal spherical aberration and various aberration diagrams of the optical imaging lens according to Embodiment 9. Please refer to FIG. 38 first. The optical imaging lens 10 of Embodiment 9 of the disclosure is roughly similar to Embodiment 1, and the difference between the two is that optical data, aspheric surface coefficients, and parameters of the lens elements 1, 2, 3, 4, 5, 6, 7, and 8 are more or less different. In addition, in the embodiment, the periphery region 124 of the image-side surface 12 of the first lens element 1 is convex. The fifth lens element 5 has negative refracting power. The optical axis region 613 of the object-side surface 61 of the sixth lens element 6 is convex. It should be noted here that in order to clearly display the drawings, some labels of the optical axis regions and the periphery regions similar to Embodiment 1 are omitted in FIG. 38.

Detailed optical data of the optical imaging lens 10 of Embodiment 9 is shown in FIG. 40, and the effective focal length of the optical imaging lens 10 of Embodiment 9 is 6.361 mm, the half field of view (HFOV) is 40.000 degrees, the F-number (Fno) is 1.700, the system length is 8.819 mm, and the image height is 7.002 mm.

Various aspheric surface coefficients in Equation (1) from the object-side surface 11 of the first lens element 1 to the image-side surface 82 of the eighth lens element 8 of Embodiment 9 are shown in FIG. 41.

In addition, relationships between the important parameters in the optical imaging lens 10 of Embodiment 9 are shown in FIG. 47.

The longitudinal spherical aberration of Embodiment 9 is shown in FIG. 39A, and the imaging point deviation of off-axis rays at different heights is controlled within a range of ±0.8 mm. In the two field curvature aberration diagrams shown in FIG. 39B and FIG. 39C, the focal length variation of the three representative wavelengths in the entire field of view falls within ±1.2 mm. On the other hand, the distortion aberration diagram of FIG. 39D shows that the distortion aberration of Embodiment 9 is maintained within a range of ±35%.

It can be known from the above description that the system length TTL of Embodiment 9 is shorter than Embodiment 1, so compared with Embodiment 1, Embodiment 9 has a smaller lens volume.

Figure 42:
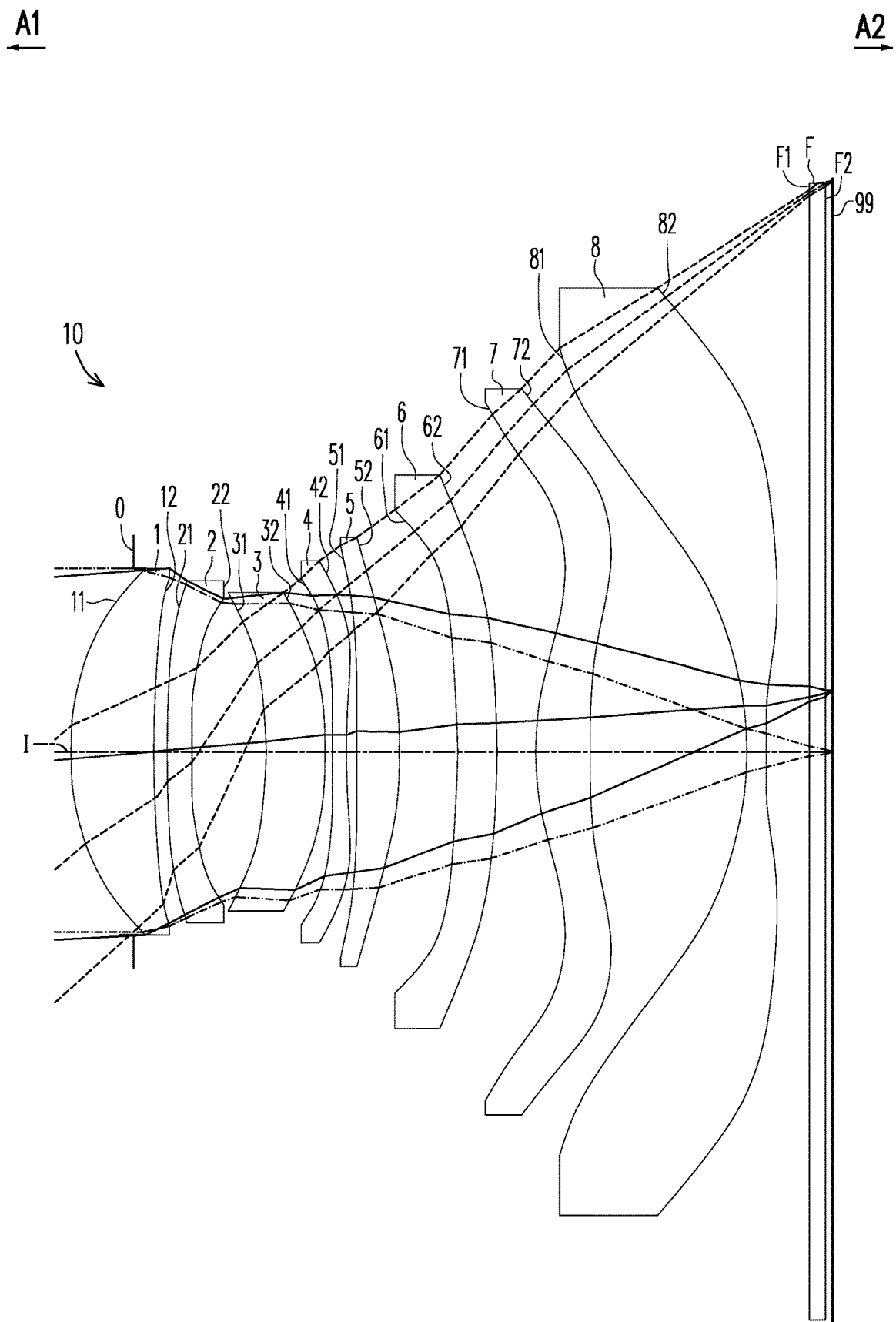
FIG. 42 is a schematic diagram of an optical imaging lens according to Embodiment 10 of the disclosure.

FIG. 42 is a schematic diagram of an optical imaging lens according to Embodiment 10 of the disclosure, and FIGS. 43A to 43D are longitudinal spherical aberration and various aberration diagrams of the optical imaging lens according to Embodiment 10. Please refer to FIG. 42 first. The optical imaging lens 10 of Embodiment 10 of the disclosure is roughly similar to Embodiment 1, and the difference between the two is that optical data, aspheric surface coefficients, and parameters of the lens elements 1, 2, 3, 4, 5, 6, 7, and 8 are more or less different. Furthermore, in the embodiment, the sixth lens element 6 has negative refracting power. It should be noted here that in order to clearly display the drawings, some labels of the optical axis regions and the periphery regions similar to Embodiment 1 are omitted in FIG. 42.

Detailed optical data of the optical imaging lens 10 of Embodiment 10 is shown in FIG. 44, and the effective focal length of the optical imaging lens 10 of Embodiment 10 is 7.726 mm, the half field of view (HFOV) is 41.581 degrees, the F-number (Fno) is 1.700, the system length is 9.528 mm, and the image height is 7.148 mm.

Various aspheric surface coefficients in Equation (1) from the object-side surface 11 of the first lens element 1 to the image-side surface 82 of the eighth lens element 8 of Embodiment 10 are shown in FIG. 45.

In addition, relationships between the important parameters in the optical imaging lens 10 of Embodiment 10 are shown in FIG. 47.

Figures 43A, 43B, 43C, 43D:
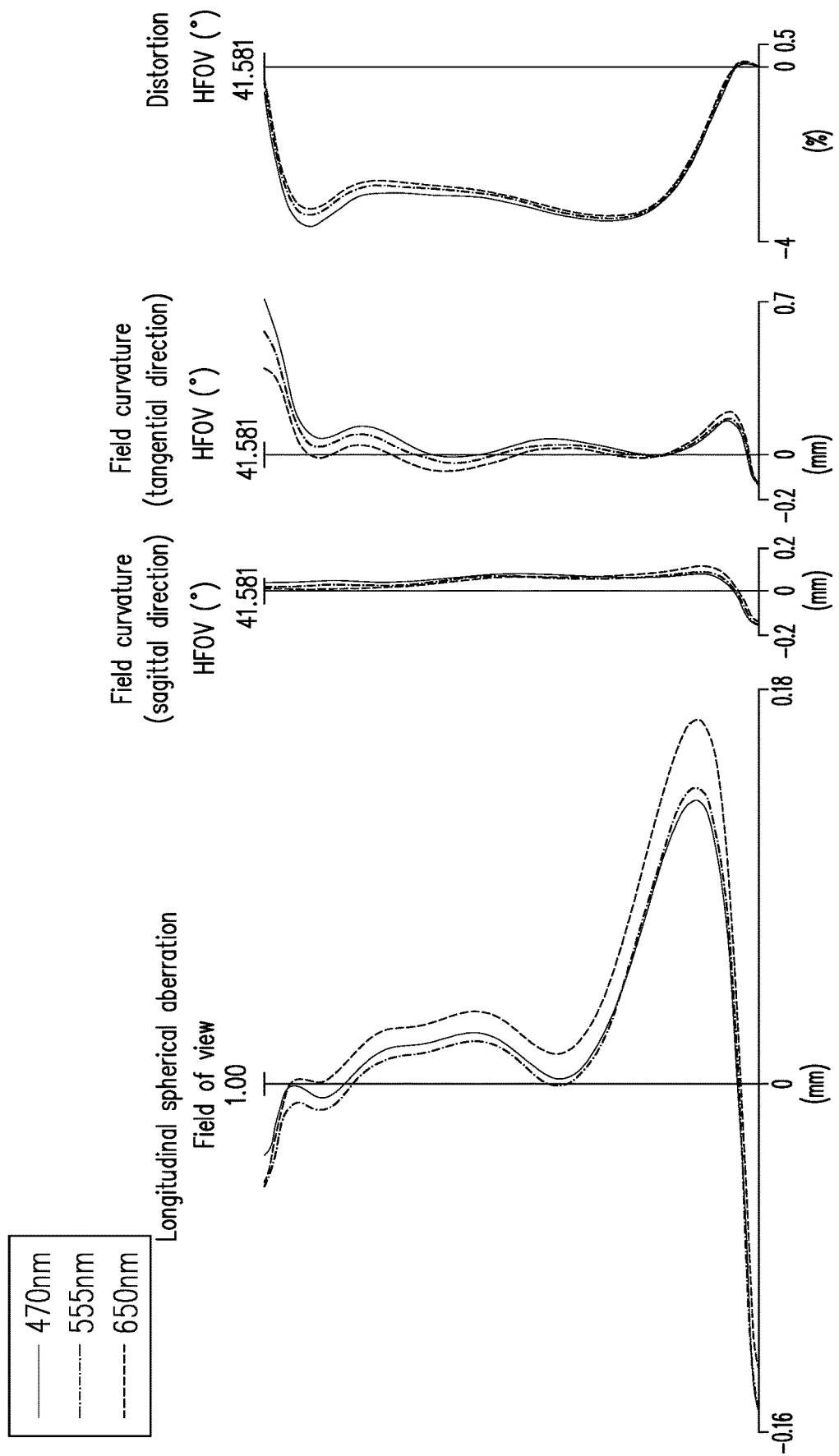
FIGS. 43A to 43D are diagrams of longitudinal spherical aberration and various aberrations of the optical imaging lens according to Embodiment 10.

The longitudinal spherical aberration of Embodiment 10 is shown in FIG. 43A, and the imaging point deviation of off-axis rays at different heights is controlled within a range of ±0.18 mm. In the two field curvature aberration diagrams shown in FIG. 43B and FIG. 43C, the focal length variation of the three representative wavelengths in the entire field of view falls within ±0.7 mm. The distortion aberration diagram of FIG. 43D shows that the distortion aberration of Embodiment 10 is maintained within a range of ±4%.

It can be known from the above description that the half field of view of Embodiment 10 is greater than Embodiment 1. The distortion aberration of Embodiment 10 is better than Embodiment 1.

Referring to FIG. 46 and FIG. 47 together, which are tables of various optical parameters of Embodiment 1 to Embodiment 10.

In addition, when the image height ImgH or the F-number Fno of the optical imaging lens 10 of the embodiment of the disclosure conforms to the following relational expressions, the system image height can be effectively increased, the F-number can be reduced, and the photosensitive effect of the imaging lens can be increased.

The optical imaging lens 10 of the embodiment of the disclosure conforms to a condition of ImgH/Fno≥3.750 mm, wherein a preferred range is 3.750 mm≤ImgH/Fno≤4.700 mm.

The optical imaging lens 10 of the embodiment of the disclosure conforms to a condition of TL/Fno≥24.000 mm, wherein a preferred range is 4.000 mm≤TL/Fno≤5.600 mm.

The optical imaging lens 10 of the embodiment of the disclosure conforms to a condition of (EFL+BFL)/Fno≥4.100 mm, wherein a preferred range is 4.100 mm≤ (EFL+BFL)/Fno≤6.300 mm.

When the material of the lens element conforms to the following configuration relationship, the transmission and the deflection of the imaging rays are facilitated and the chromatic aberration and the imaging resolution are effectively improved.

The optical imaging lens 10 of the embodiment of the disclosure further conforms to a condition of $V3+V4+V5 \leq 125.000$, wherein a preferred range is $90.000 \leq V3+V4+V5 \leq 125.000$.

The optical imaging lens 10 of the embodiment of the disclosure further conforms to a condition of $V2+V6+V7 \leq 125.000$, wherein a preferred range is $80.000 \leq V2+V6+V7 \leq 125.000$.

The optical imaging lens 10 of the embodiment of the disclosure further conforms to a condition of $(V6+V7+V8)/V5 \leq 5.000$, wherein a preferred range is $2.900 \leq (V6+V7+V8)/V5 \leq 5.000$.

In order to shorten the system length of the lens element and ensure the imaging quality, while considering the difficulty of production, the air gap between the lens elements or the thickness of the lens element may be appropriately shortened. If the numerical constraints of the following conditional expressions are satisfied, the embodiment of the disclosure can have a preferred configuration, and when the embodiment conforms to the preferred range, the aberration and the distortion of the optical imaging lens 10 can be improved.

The optical imaging lens 10 of the embodiment of the disclosure further conforms to a condition of $(T7+G78+T8)/T4 \geq 7.950$, wherein a preferred range is $7.950 \leq (T7+G78+T8)/T4 \leq 16.000$.

The optical imaging lens 10 of the embodiment of the disclosure further conforms to a condition of $AAG/ALT \geq 0.850$, wherein a preferred range is $0.850 \leq AAG/ALT \leq 1.200$.

The optical imaging lens 10 of the embodiment of the disclosure further conforms to a condition of $(T1+G12+T2+G23+T3)/D41t52 \geq 3.300$, wherein a preferred range is $3.300 \leq (T1+G12+T2+G23+T3)/D41t52 \leq 5.500$.

The optical imaging lens 10 of the embodiment of the disclosure further conforms to a condition of $Tmax/BFL \geq 1.000$, wherein a preferred range is $1.000 \leq Tmax/BFL \leq 1.700$.

The optical imaging lens 10 of the embodiment of the disclosure further conforms to a condition of $(T2+G23+T3)/T6 \geq 2.950$, wherein a preferred range is $2.950 \leq (T2+G23+T3)/T6 \leq 7.400$.

In the optical imaging lens 10 of the embodiment of the disclosure, the following condition of is more satisfied: $EFL/(G45\ T5) \geq 11.950$, wherein a preferred range is $11.950 \leq EFL/(G45\ T5) \leq 16.500$.

The optical imaging lens 10 of the embodiment of the disclosure further conforms to a condition of $(G23+G34)/G56 \leq 2.000$, wherein a preferred range is $0.700 \leq (G23+G34)/G56 \leq 2.000$.

The optical imaging lens 10 of the embodiment of the disclosure further conforms to a condition of $Tmax/Tmin \geq 4.000$, wherein a preferred range is $4.000 \leq Tmax/Tmin \leq 8.700$.

The optical imaging lens 10 of the embodiment of the disclosure further conforms to a condition of $(T6+G67+T7)/(T3+G34) \geq 1.950$, wherein a preferred range is $1.950 \leq (T6+G67+T7)/(T3+G34) \leq 4.400$.

The optical imaging lens 10 of the embodiment of the disclosure further conforms to a condition of $TTL/(T4+T6) \geq 12.000$, wherein a preferred range is $12.000 \leq TTL/(T4+T6) \leq 19.000$.

The optical imaging lens 10 of the embodiment of the disclosure further conforms to a condition of $(ALT+BFL)/AAG \leq 1.500$, wherein a preferred range is $1.000 \leq (ALT+BFL)/AAG \leq 1.500$.

In addition, any combination of the parameters of the embodiment can be selected to increase the limitation of the lens, so as to facilitate the design of the lens of the same structure of the disclosure.

In view of the unpredictability of optical system design, under the architecture of the disclosure, conforming to the above conditional expressions can preferably enable the disclosure to reduce the F-number, increase the image height, improve the imaging quality, or improve the assembly yield, so as to improve the shortcomings of the prior art. Also, the use of plastic material for the lens element in the embodiment of the disclosure can further reduce the weight of the lens and save the cost.

The numerical ranges containing the maximum and minimum values obtained by the combination ratio relationship of the optical parameters disclosed in the various embodiments of the disclosure can be implemented accordingly.

In summary, the optical imaging lens of the embodiments of the disclosure can obtain the following functions and advantages:

1. The longitudinal spherical aberration, the field curvature aberration, and the distortion of the embodiments of the disclosure all conform to the usage specifications. In addition, the off-axis rays of red, green, and blue representative wavelengths at different heights are all concentrated near the imaging point. From the skewness of each curve, it can be seen that the imaging point deviation of the off-axis rays at different heights is controlled and has good spherical aberration, field curvature aberration, and distortion suppression. Further referring to the imaging quality data, the distances between the red, green, and blue representative wavelengths are also quite close to one another, which indicates that the disclosure has good concentration of light with different wavelengths and excellent dispersion suppression under various states. In summary, the disclosure can produce excellent imaging quality by the design and the matching of the lens elements.

2. When the second lens element is designed to have negative refracting power and the optical axis region of the object-side surface of the third lens element is designed to be concave, rays of a large angle can be collected. When the optical axis region of the image-side surface of the fourth lens element is designed to be concave, the optical axis region of the object-side surface of the fifth lens element is designed to be concave, and the seventh lens element is designed to have positive refracting power, the aberration caused by the first lens element to the third lens element can be corrected and the image height of the optical imaging lens can be expanded, so that the optical imaging lens has good optical quality. When the ratio of the thickness and the air gap of the lens element are further controlled, the optical imaging lens may conform to $D52t81/D41t52 \geq 1.950$, which can improve the distortion and the aberration of the optical imaging lens, wherein a preferred range of $D52t81/D41t52$ is $1.950 \leq D52t81/D41t52 \leq 6.500$.

3. When the second lens element is designed to have negative refracting power and the periphery region of the object-side surface of the third lens element is designed to be concave, rays of a large angle can be collected. When the optical axis region of the image-side surface of the fourth lens element is designed to be concave, the optical axis region of the object-side surface of the fifth lens element is designed to be concave, and the seventh lens element is designed to have positive refracting power, the aberration caused by the first lens element to the third lens element can be corrected and the image height of the optical imaging lens can be expanded, so that the optical imaging lens has good optical quality. When the ratio of the thickness and the air gap of the lens element are further controlled, the optical imaging lens may conform to D52t81/D41t52≥3.000, which can further control the volume of the lens in addition to effectively improving the distortion and the aberration of the optical imaging lens to achieve the effect of light weight, wherein a preferred range of D52t81/D41t52 is 3.000≤D52t81/D41t52≤6.500.

4. When the second lens element is designed to have negative refracting power and the periphery region of the image-side surface of the third lens element is designed to be convex, rays of a large angle can be collected. When the optical axis region of the image-side surface of the fourth lens element is designed to be concave, the optical axis region of the object-side surface of the fifth lens element is designed to be concave, the seventh lens element is designed to have positive refracting power, and the optical axis region of the object-side surface of the eighth lens element is designed to be concave, the aberration caused by the first lens element to the third lens element can be corrected and the image height of the optical imaging lens can be expanded, so that the optical imaging lens has good optical quality. When the ratio of the thickness and the air gap of the lens element are further controlled, the optical imaging lens may conform to D52t81/D41t52≥3.000, which can further control the volume of the lens in addition to effectively improving the chromatic aberration, wherein a preferred range of D52t81/D41t52 is 3.000≤D52t81/D41t52≤6.500.

5. As mentioned above from the second to the fourth point, if the first lens element is further designed to have positive refracting power or the eighth lens element is further designed to have negative refracting power, the spherical aberration of the optical imaging lens can be effectively improved.

6. When the optical imaging lens of the embodiments of the disclosure satisfies one of the following combinations (a) to (d), the spherical aberration and the field curvature aberration can be effectively improved, so that the optical imaging lens has good imaging quality. (a) At least one of the first lens element or the third lens element has positive refracting power; (b) at least one of the first lens element or the fifth lens element has positive refracting power; (c) at least one of the fourth lens element or the eighth lens element has negative refracting power; (d) at least one of the sixth lens element or the eighth lens element has negative refracting power.

7. The lens element of the embodiments of the disclosure adopts an aspheric surface design, which is more conducive to optimizing the imaging quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An optical imaging lens, comprising a first lens element, a second lens element, a third lens element, a fourth lens element, a fifth lens element, a sixth lens element, a seventh lens element, and an eighth lens element sequentially along an optical axis from an object side to an image side, wherein each of the first lens element to the eighth lens element comprises an object-side surface facing the object side and allowing imaging rays to pass through and an image-side surface facing the image side and allowing the imaging rays to pass through;
   the second lens element has negative refracting power;
   a periphery region of the object-side surface of the third lens element is concave;
   an optical axis region of the image-side surface of the fourth lens element is concave;
   an optical axis region of the object-side surface of the fifth lens element is concave;
   the seventh lens element has positive refracting power, wherein lens elements of the optical imaging lens are only the eight lens elements, and the optical imaging lens satisfies a condition of D52t81/D41t52≥3.000 and a condition of V3+V4+V5≤125.000, where D52t81 is a distance from the image-side surface of the fifth lens element to the object-side surface of the eighth lens element on the optical axis, D41t52 is a distance from the object-side surface of the fourth lens element to the image-side surface of the fifth lens element on the optical axis, V3 is an Abbe number of the third lens element, V4 is an Abbe number of the fourth lens element, and V5 is an Abbe number of the fifth lens element.

2. The optical imaging lens according to claim 1, wherein the optical imaging lens further satisfies a condition of V2+V6+V7≤125.000, where V2 is an Abbe number of the second lens element, V6 is an Abbe number of the sixth lens element, and V7 is an Abbe number of the seventh lens element.

3. The optical imaging lens according to claim 1, wherein the optical imaging lens further satisfies a condition of (EFL+BFL)/Fno≥4.200 mm, where EFL is an effective focal length of the optical imaging lens, BFL is a distance from the image-side surface of the eighth lens element to an image plane on the optical axis, and Fno is an F-number of the optical imaging lens.

4. The optical imaging lens according to claim 1, wherein the optical imaging lens further satisfies a condition of (T2+G23+T3)/T6≥2.950, where T2 is a thickness of the second lens element on the optical axis, T3 is a thickness of the third lens element on the optical axis, T6 is a thickness of the sixth lens element on the optical axis, and G23 is an air gap between the second lens element and the third lens element on the optical axis.

5. The optical imaging lens according to claim 1, wherein the optical imaging lens further satisfies a condition of EFL/(G45+T5)≥11.950, where EFL is an effective focal length of the optical imaging lens, G45 is an air gap between the fourth lens element and the fifth lens element on the optical axis, and T5 is a thickness of the fifth lens element on the optical axis.

6. The optical imaging lens according to claim 1, wherein the optical imaging lens further satisfies a condition of (G23+G34)/G56≤2.000, where G23 is an air gap between the second lens element and the third lens element on the optical axis, G34 is an air gap between the third lens element and the fourth lens element on the optical axis, and G56 is an air gap between the fifth lens element and the sixth lens element on the optical axis.

7. The optical imaging lens according to claim 1, wherein the optical imaging lens further satisfies a condition of Tmax/Tmin≥4.000, where Tmax is a maximum value of thicknesses of the eight lens elements from the first lens element to the eighth lens element on the optical axis, and Tmin is a minimum value of the thicknesses of the eight lens elements from the first lens element to the eighth lens element on the optical axis.

8. The optical imaging lens according to claim 1, wherein an optical axis region of the object-side surface of the third lens element is concave.

9. The optical imaging lens according to claim 8, wherein the optical imaging lens further satisfies a condition of V3+V4+V5≤125.000, where V3 is an Abbe number of the third lens element, V4 is an Abbe number of the fourth lens element, and V5 is an Abbe number of the fifth lens element.

10. The optical imaging lens according to claim 1, wherein the optical imaging lens further satisfies a condition of ImgH/Fno≥3.750 mm, where ImgH is an image height of the optical imaging lens, and Fno is an F-number of the optical imaging lens.

11. The optical imaging lens according to claim 1, wherein the optical imaging lens further satisfies a condition of (T7+G78+T8)/T4≥7.950, where T4 is a thickness of the fourth lens element on the optical axis, T7 is a thickness of the seventh lens element on the optical axis, T8 is a thickness of the eighth lens element on the optical axis, and G78 is an air gap between the seventh lens element and the eighth lens element on the optical axis.

12. The optical imaging lens according to claim 1, wherein the optical imaging lens further satisfies a condition of AAG/ALT≥0.850, where AAG is a sum of seven air gaps between the first lens element and the eighth lens element on the optical axis, and ALT is a sum of thicknesses of the eight lens elements from the first lens element to the eighth lens element on the optical axis.

13. The optical imaging lens according to claim 1, wherein the optical imaging lens further satisfies a condition of (T1+G12+T2+G23+T3)/D41t52≥3.300, where T1 is a thickness of the first lens element on the optical axis G12 is an air gap between the first lens element and the second lens element on the optical axis, T2 is a thickness of the second lens element on the optical axis, T3 is a thickness of the third lens element on the optical axis, and G23 is an air gap between the second lens element and the third lens element on the optical axis.

14. The optical imaging lens according to claim 1, wherein the optical imaging lens further satisfies a condition of Tmax/BFL≥1.000, where Tmax is a maximum value of thicknesses of the eight lens elements from the first lens element to the eighth lens element on the optical axis, and BFL is a distance from the image-side surface of the eighth lens element to an image plane on the optical axis.

15. The optical imaging lens according to claim 1, wherein
a periphery region of the image-side surface of the third lens element is convex; and
an optical axis region of the object-side surface of the eighth lens element is concave.

16. The optical imaging lens according to claim 1, wherein the optical imaging lens further satisfies a condition of (V6+V7+V8)/V5≤5.000, where V6 is an Abbe number of the sixth lens element, V7 is an Abbe number of the seventh lens element, and V8 is an Abbe number of the eighth lens element.

17. The optical imaging lens according to claim 1, wherein the optical imaging lens further satisfies a condition of TL/Fno≥4.000 mm, where TL is a distance from the object-side surface of the first lens element to the image-side surface of the eighth lens element on the optical axis, and Fno is an F-number of the optical imaging lens.

18. The optical imaging lens according to claim 1, wherein the optical imaging lens further satisfies a condition of (T6+G67+T7)/(T3+G34)≥1.950, where T3 is a thickness of the third lens element on the optical axis, T6 is a thickness of the sixth lens element on the optical axis, G34 is an air gap between the third lens element and the fourth lens element on the optical axis, G67 is an air gap between the sixth lens element and the seventh lens element on the optical axis and T7 is a thickness of the seventh lens element on the optical axis.

19. The optical imaging lens according to claim 1, wherein the optical imaging lens further satisfies a condition of TTL/(T4+T6)≥12.000, where TTL is a distance from the object-side surface of the first lens element to an image plane on the optical axis, T4 is a thickness of the fourth lens element on the optical axis and T6 is a thickness of the sixth lens element on the optical axis.

20. The optical imaging lens according to claim 1, wherein the optical imaging lens further satisfies a condition of $(ALT+BFL)/AAG \leq 1.500$, where ALT is a sum of thicknesses of the eight lens elements from the first lens element to the eighth lens element on the optical axis, BFL is a distance from the image-side surface of the eighth lens element to an image plane on the optical axis, and AAG is a sum of seven air gaps between the first lens element and the eighth lens element on the optical axis.

* * * * *